US009430140B2

(12) United States Patent
Reuschel et al.

(10) Patent No.: US 9,430,140 B2
(45) Date of Patent: Aug. 30, 2016

(54) DIGITAL WHITEBOARD COLLABORATION APPARATUSES, METHODS AND SYSTEMS

(75) Inventors: Jeffrey Jon Reuschel, Hamilton, MI (US); Steve Mason, San Francisco, CA (US); Clarkson Sheppard Thorp, Byron Center, MI (US); Ammon Haggerty, Oakland, CA (US)

(73) Assignee: HAWORTH, INC., Holland, MI (US)

( * ) Notice: Subject to any disclaimer, the term of this patent is extended or adjusted under 35 U.S.C. 154(b) by 12 days.

(21) Appl. No.: 13/478,994

(22) Filed: May 23, 2012

(65) Prior Publication Data

US 2013/0047093 A1 Feb. 21, 2013

Related U.S. Application Data

(60) Provisional application No. 61/489,238, filed on May 23, 2011.

(51) Int. Cl.
*G06F 3/048* (2013.01)
*G06F 3/14* (2006.01)
(Continued)

(52) U.S. Cl.
CPC ......... *G06F 3/04883* (2013.01); *G06F 3/1423* (2013.01); *G06F 3/1454* (2013.01);
(Continued)

(58) Field of Classification Search
CPC .............................................. G06F 2203/0383
USPC ....................................................... 715/753
See application file for complete search history.

(56) References Cited

U.S. PATENT DOCUMENTS

| 4,686,332 A | 8/1987 | Greanias et al. |
| 5,008,853 A | 4/1991 | Bly et al. |

(Continued)

FOREIGN PATENT DOCUMENTS

| CN | 101630240 A | 1/2010 |
| JP | 2010079834 A | 4/2010 |

(Continued)

OTHER PUBLICATIONS

International Search Report and Written Opinion mailed on Sep. 24, 2012 corresponding to PCT/US12/39176.

(Continued)

*Primary Examiner* — Andrea Long
(74) *Attorney, Agent, or Firm* — Haynes Beffel & Wolfeld LLP

(57) ABSTRACT

The DIGITAL WHITEBOARD COLLABORATION APPARATUSES, METHODS AND SYSTEMS ("DWC") transform user multi-element touchscreen gestures via DWC components into updated digital collaboration whiteboard objects. In one embodiment, the DWC obtains user whiteboard input from a client device participating in a digital collaborative whiteboarding session. The DWC parses the user whiteboard input to determine user instructions, and modifies a tile object included in the digital collaborative whiteboarding session according to the determined user instructions. The DWC generates updated client viewport content for the client device. Also, the DWC determines that client viewport content of a second client device should be modified because of modifying the tile object included in the digital whiteboard. The DWC generates updated client viewport content for the second client device after determining that the content of the second client device should be modified, and provides the updated client viewport content to the second client device.

10 Claims, 40 Drawing Sheets

Example. Digital Whiteboard Collaboration ("DWC") – Collaborative Whiteboarding

(51) Int. Cl.
*G09B 5/02* (2006.01)
*G06F 3/0488* (2013.01)
*G09B 19/00* (2006.01)
*G06F 9/44* (2006.01)
*G06F 1/16* (2006.01)

(52) U.S. Cl.
CPC ............... *G09B 5/02* (2013.01); *G09B 19/00* (2013.01); *G06F 1/1626* (2013.01); *G06F 9/4443* (2013.01); *G06F 2203/0383* (2013.01); *G09G 2360/122* (2013.01); *G09G 2370/025* (2013.01); *G09G 2370/027* (2013.01); *G09G 2370/10* (2013.01)

(56) References Cited

U.S. PATENT DOCUMENTS

| | | |
|---|---|---|
| 5,220,657 A | 6/1993 | Bly et al. |
| 5,309,555 A | 5/1994 | Akins et al. |
| 5,446,842 A | 8/1995 | Schaeffer et al. |
| 5,537,526 A | 7/1996 | Anderson et al. |
| 5,563,996 A | 10/1996 | Tchao |
| 5,727,002 A | 3/1998 | Miller et al. |
| 5,781,732 A | 7/1998 | Adams et al. |
| 5,818,425 A | 10/1998 | Want et al. |
| 5,835,713 A | 11/1998 | Fitzpatrick et al. |
| 5,872,924 A | 2/1999 | Nakayama et al. |
| 5,938,724 A | 8/1999 | Pommier et al. |
| 5,940,082 A | 8/1999 | Brinegar et al. |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Leperen et al. |
| 6,342,906 B1 | 1/2002 | Kumar et al. |
| 6,343,313 B1 | 1/2002 | Salesky et al. |
| 6,518,957 B1 | 2/2003 | Lehtinen et al. |
| 6,564,246 B1 | 5/2003 | Varma et al. |
| 6,911,987 B1 | 6/2005 | Mairs et al. |
| 6,930,673 B2 | 8/2005 | Kaye et al. |
| 7,003,728 B2 | 2/2006 | Berque et al. |
| 7,043,529 B1 | 5/2006 | Simonoff |
| 7,129,934 B2 | 10/2006 | Luman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 8,209,308 B2 | 6/2012 | Rueben et al. |
| D664,562 S | 7/2012 | McCain et al. |
| 8,402,391 B1 | 3/2013 | Doray et al. |
| 8,898,590 B2 | 11/2014 | Okada et al. |
| 2003/0020671 A1 | 1/2003 | Santoro et al. |
| 2003/0058227 A1 | 3/2003 | Hara et al. |
| 2004/0060037 A1* | 3/2004 | Damm et al. ................ 717/104 |
| 2004/0150627 A1 | 8/2004 | Luman et al. |
| 2004/0155871 A1 | 8/2004 | Perski et al. |
| 2004/0174398 A1* | 9/2004 | Luke et al. .................. 345/856 |
| 2005/0060656 A1 | 3/2005 | Martinez et al. |
| 2005/0195216 A1 | 9/2005 | Kramer et al. |
| 2005/0237380 A1 | 10/2005 | Kakii et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0195507 A1 | 8/2006 | Baek et al. |
| 2006/0211404 A1 | 9/2006 | Cromp et al. |
| 2006/0220982 A1* | 10/2006 | Ueda .............................. 345/1.1 |
| 2006/0224427 A1 | 10/2006 | Salmon |
| 2007/0262964 A1 | 11/2007 | Zotov et al. |
| 2008/0143818 A1 | 6/2008 | Ferren et al. |
| 2008/0163053 A1 | 7/2008 | Hwang et al. |
| 2008/0177771 A1 | 7/2008 | Vaughn |
| 2008/0207188 A1 | 8/2008 | Ahn et al. |
| 2009/0049381 A1* | 2/2009 | Robertson et al. ............ 715/700 |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0251457 A1 | 10/2009 | Walker et al. |
| 2009/0278806 A1 | 11/2009 | Duarte et al. |
| 2009/0282359 A1* | 11/2009 | Saul et al. .................... 715/784 |
| 2009/0309846 A1 | 12/2009 | Trachtenberg et al. |
| 2009/0309853 A1 | 12/2009 | Hildebrandt et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1* | 12/2010 | Groth et al. ................... 715/800 |
| 2010/0309148 A1 | 12/2010 | Fleizach et al. |
| 2010/0315481 A1 | 12/2010 | Wijngaarden et al. |
| 2010/0318470 A1 | 12/2010 | Meinel et al. |
| 2010/0318921 A1 | 12/2010 | Trachtenberg et al. |
| 2010/0328306 A1 | 12/2010 | Chau et al. |
| 2011/0069184 A1 | 3/2011 | Go |
| 2011/0109526 A1 | 5/2011 | Bauza et al. |
| 2011/0148926 A1 | 6/2011 | Koo et al. |
| 2011/0154192 A1* | 6/2011 | Yang et al. .................... 715/256 |
| 2011/0183654 A1 | 7/2011 | Lanier et al. |
| 2011/0197147 A1 | 8/2011 | Fai |
| 2011/0197157 A1 | 8/2011 | Hoffman et al. |
| 2011/0202424 A1 | 8/2011 | Chun et al. |
| 2011/0208807 A1* | 8/2011 | Shaffer ......................... 709/203 |
| 2011/0214063 A1* | 9/2011 | Saul ............................... 715/740 |
| 2011/0216064 A1 | 9/2011 | Dahl et al. |
| 2011/0225494 A1 | 9/2011 | Shmuylovich et al. |
| 2011/0246875 A1* | 10/2011 | Parker et al. .................. 715/702 |
| 2011/0264785 A1 | 10/2011 | Newman et al. |
| 2011/0271229 A1 | 11/2011 | Yu |
| 2012/0011465 A1 | 1/2012 | Rezende |
| 2012/0019452 A1 | 1/2012 | Westerman |
| 2012/0026200 A1 | 2/2012 | Okada et al. |
| 2012/0030193 A1 | 2/2012 | Richberg et al. |
| 2012/0038572 A1 | 2/2012 | Kim et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0176328 A1 | 7/2012 | Brown et al. |
| 2012/0179994 A1 | 7/2012 | Knowlton et al. |
| 2012/0229425 A1 | 9/2012 | Barrus et al. |
| 2012/0254858 A1 | 10/2012 | Moyers et al. |
| 2012/0260176 A1* | 10/2012 | Sehrer ........................... 715/727 |
| 2012/0274583 A1 | 11/2012 | Haggerty |
| 2012/0275683 A1 | 11/2012 | Adler et al. |
| 2012/0278738 A1* | 11/2012 | Kruse et al. .................. 715/754 |
| 2012/0320073 A1 | 12/2012 | Mason |
| 2013/0004069 A1 | 1/2013 | Hawkins et al. |
| 2013/0047093 A1 | 2/2013 | Reuschel et al. |
| 2013/0218998 A1 | 8/2013 | Fischer et al. |
| 2013/0320073 A1 | 12/2013 | Yokoo et al. |
| 2013/0346878 A1 | 12/2013 | Mason |
| 2013/0346910 A1 | 12/2013 | Mason |
| 2014/0022334 A1 | 1/2014 | Lockhart et al. |
| 2014/0033067 A1 | 1/2014 | Pittenger et al. |
| 2014/0062957 A1 | 3/2014 | Perski et al. |
| 2014/0222916 A1 | 8/2014 | Foley et al. |
| 2014/0223334 A1 | 8/2014 | Jensen et al. |
| 2014/0223335 A1 | 8/2014 | Pearson |
| 2015/0084055 A1 | 3/2015 | Nagata et al. |

FOREIGN PATENT DOCUMENTS

| | | |
|---|---|---|
| JP | 2012043251 A | 3/2012 |
| WO | 0161633 A2 | 8/2001 |
| WO | 2009018314 A2 | 2/2009 |
| WO | 2011/029067 A2 | 3/2011 |
| WO | 2011/048901 A1 | 4/2011 |
| WO | 2012/162411 A1 | 11/2012 |

(56) References Cited

OTHER PUBLICATIONS

PCT/US2012/39176—International Search Report and Written Opinion mailed Sep. 24, 2012, 21 pages.
Anacore, "Anacore Presents Synthesis", InfoComm 2012: Las Vegas, NV, USA, Jun. 9-15, 2012, 2 pages, screen shots taken from http://www.youtube.com/watch?v=FbQ9PIc5aHk (visited Nov. 1, 2013).
PCT/US2014/014494—International Search Report and Written Opinion dated May 30, 2014, 10 pages.
PCT/US2014/014489—International Search Report and Written Opinion dated May 30, 2014, 13 pages.
PCT/US2013/058249—International Search Report and Written Opinion mailed Dec. 18, 2013, 14 pages.
PCT/US2013/058040—International Search Report and Written Opinion mailed Dec. 18, 2013, 10 pages.
PCT/US2013/058261—International Search Report and Written Opinion mailed Dec. 30, 2013, 14 pages.
PCT/US2013/058030—International Search Report and Written Opinion mailed Dec. 27, 2013, 11 pages.
PCT/US2014/018375—International Search Report and Written Opinion mailed Jul. 1, 2014, 16 pages.
EP12789695.9—Supplemental European Search Report dated Nov. 19, 2014, 9 pages.
Masters Thesis: "The ANA Project, Development of the ANA-Core Software" Ariane Keller, Sep. 21, 2007, ETH Zurich, 92 pages.
Office Action from U.S. Appl. No. 13/759,017 dated Nov. 6, 2014, 19 pages.
U.S. Appl. No. 13/758,984, filed Feb. 4, 2013, entitled "Region Dynamics for Digital Whiteboard," Inventor Steve Mason, 28 pages.
U.S. Appl. No. 13/758,989, filed Feb. 4, 2013, entitled "Toolbar Dynamics for Digital Whiteboard," Inventor Steve Mason, 26 pages.
U.S. Appl. No. 13/759,017, filed Feb. 4, 2013, entitled "Collaboration System with Whiteboard Access to Global Collaboration Data," Inventor Aaron M. Jensen, 49 pages.
U.S. Appl. No. 13/758,984—Office Action dated Oct. 8, 2014, 45 pages.
U.S. Appl. No. 13/758,989—Office Action dated Oct. 7, 2014, 36 pages.
U.S. Appl. No. 13/759,017—Office Action dated Nov. 6, 2014, 19 pages.
PCT/US2014/014475—International Search Report and Written Opinion dated Nov. 28, 2014, 10 pgs.
U.S. Appl. No. 13/758,993—Office Action dated Feb. 3, 2015, 22 pgs.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2012.
U.S. Appl. No. 13/758,993, filed Feb. 4, 2013, entitled "Line Drawing Behavior for Digital Whiteboard," Inventor Steve Mason, 29 pgs.
U.S. Appl. No. 14/018,370—Office Action dated May 21, 2015, 51 pages.
Albin, T., "Comfortable Portable Computing: the Ergonomic Equation," Copyright 2008 Ergotron, Inc., 19 pgs.
"Ergonomics Data and Mounting Heights," Ergonomic Ground Rules, last revised Sep. 22, 2010, 2 pgs.
U.S. Appl. No. 13/758,984—Office Action dated Jun. 19, 2015, 25 pgs.
U.S. Appl. No. 13/758,989—Office Action dated Jun. 19, 2015, 9 pgs.
U.S. Appl. No. 13/758,989—Office Action dated Feb. 12, 2015, 9 pgs.
U.S. Appl. No. 13/759,017—Office Action dated Jun. 19, 2015, 27 pgs.
U.S. Appl. No. 13/758,993—Office Action dated Jul. 30, 2015, 43 pgs.
U.S. Appl. No. 13/759,018—Office Action dated Oct. 22, 2014, 16 pgs.
U.S. Appl. No. 13/759,018—Office Action dated Apr. 23, 2015, 24 pgs.
U.S. Appl. No. 13/759,018—Office Action dated Aug. 27, 2015, 22 pgs.

\* cited by examiner

Example: Digital Whiteboard Collaboration ("DWC") – Digital Whiteboard File System Example: Digital Whiteboard Collaboration ("DWC") – Tile Objects

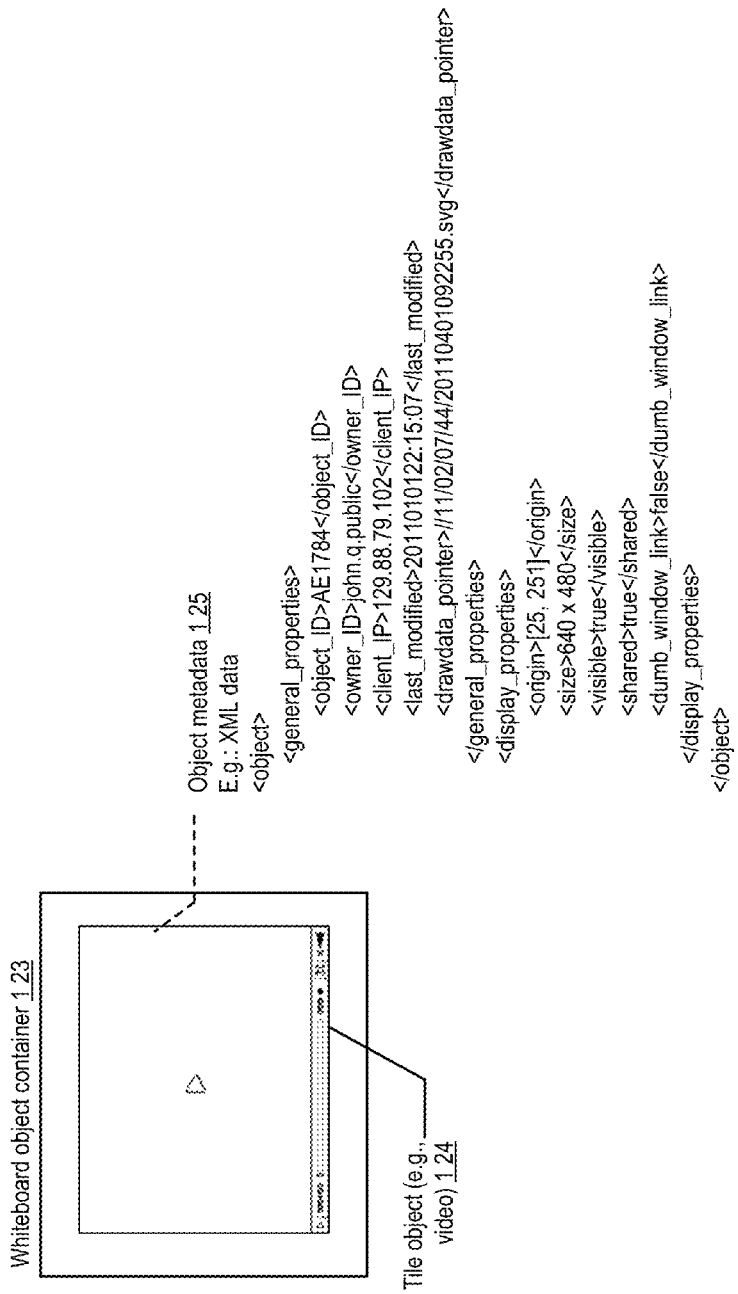
FIGURE 1H    Example: Digital Whiteboard Collaboration ("DWC") – Tile Object Metadata

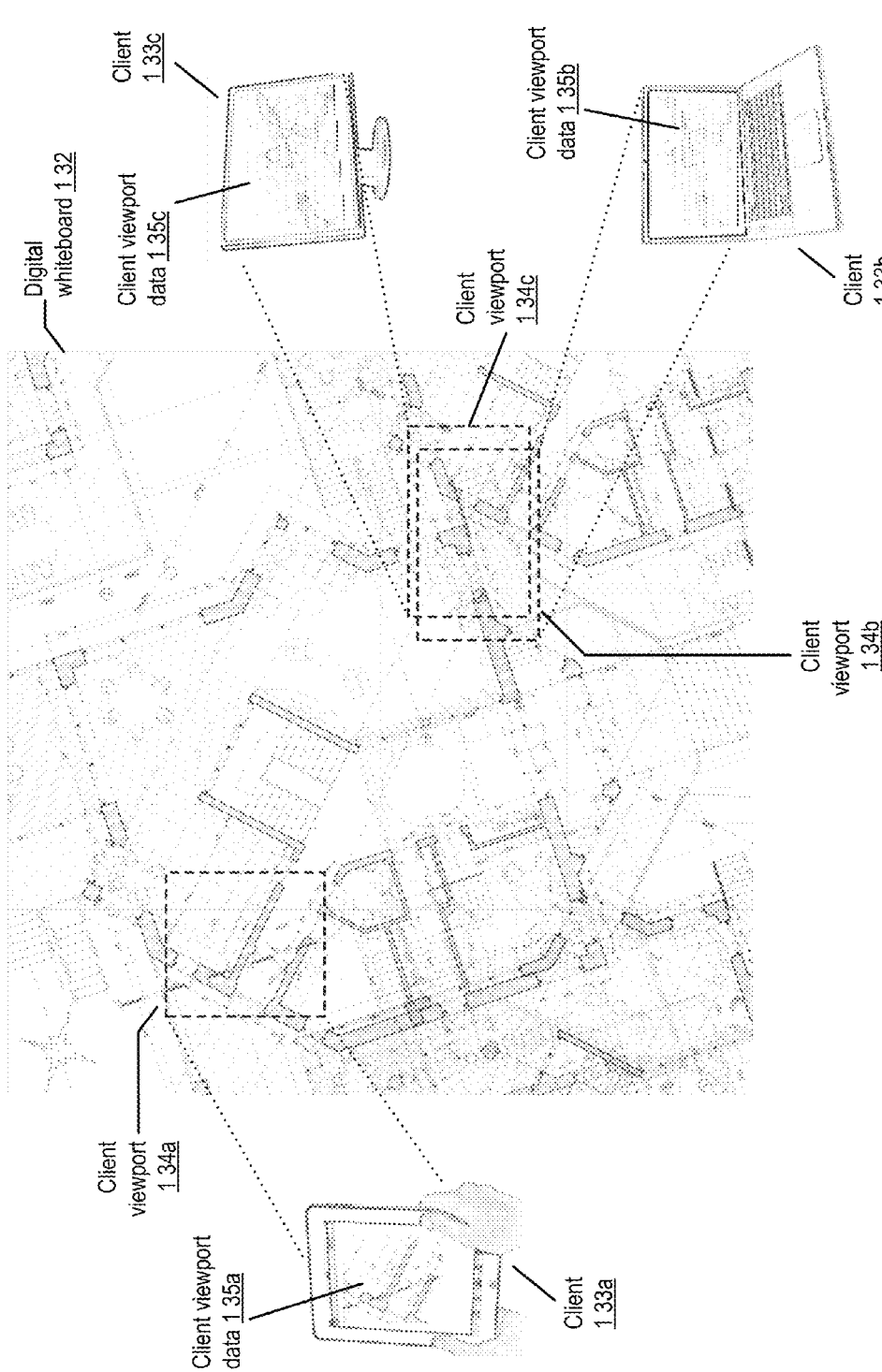
FIGURE 1J  Example: Digital Whiteboard Collaboration ("DWC") – Collaborative Whiteboarding

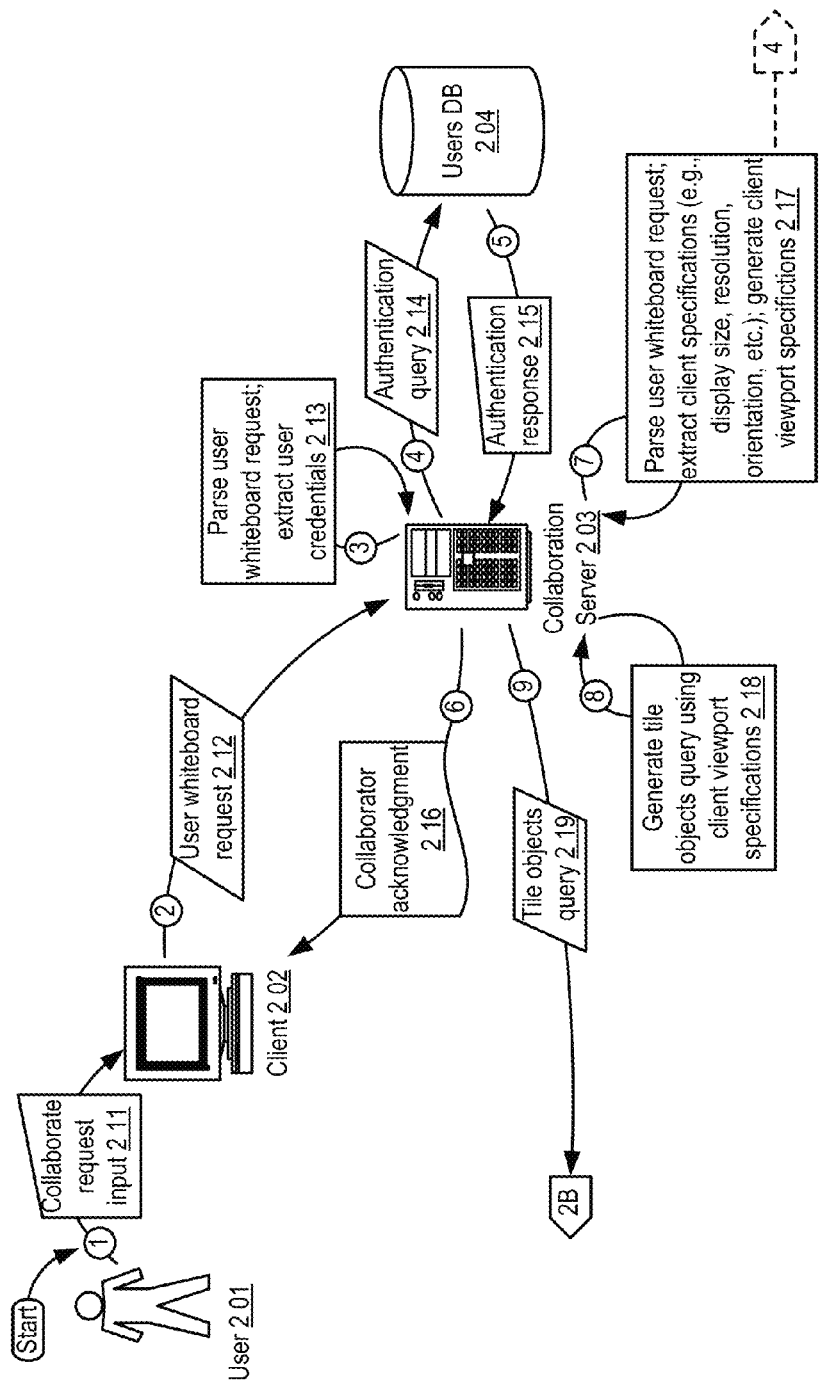
FIGURE 2A                    Example: Whiteboard Collaborator Session Initiation Example: Whiteboard Collaborator Session Initiation Example: Viewport Content Generation (VCG) component 500

Example: User Collaborative Whiteboarding

GESTURES + UI (CONT.)

ACCESS MAP - Five finger swipe down 8.26

8.27

8.28

Example: Whiteboarding gestures – Pie-menu system

US 9,430,140 B2

DIGITAL WHITEBOARD COLLABORATION APPARATUSES, METHODS AND SYSTEMS

PRIORITY CLAIM

This application claims priority under 35 USC §119 to U.S. provisional patent application Ser. No. 61/489,238 filed May 23, 2011, entitled "DIGITAL WHITEBOARD COLLABORATION APPARATUSES, METHODS AND SYSTEMS,". The entire contents of the aforementioned application are expressly incorporated by reference herein.

This application for letters patent discloses and describes various novel innovations and inventive aspects of DIGITAL WHITEBOARD COLLABORATION technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

STATEMENT CONCERNING JOINT RESEARCH AGREEMENT

Haworth, Inc., a Michigan corporation, and Obscura Digital Incorporated, a California corporation, are parties to a Joint Research Agreement.

FIELD

The present innovations generally address apparatuses, methods, and systems for digital collaboration, and more particularly, include DIGITAL WHITEBOARD COLLABORATION APPARATUSES, METHODS AND SYSTEMS ("DWC").

BACKGROUND

In some instances, users may be required to work collaboratively with each other to achieve efficient results in their undertakings. Such users may sometimes be located remotely from each other. The collaborative interactions between such users may sometimes require communication of complex information.

BRIEF DESCRIPTION OF THE DRAWINGS

The accompanying appendices and/or drawings illustrate various non-limiting, example, inventive aspects in accordance with the present disclosure:

FIGS. 1A-K shows a block diagram illustrating example aspects of digital whiteboard collaboration in some embodiments of the DWC;

FIGS. 2A-B show data flow diagrams illustrating an example procedure to initiate a whiteboarding session for a user in some embodiments of the DWC;

Figure 1A:
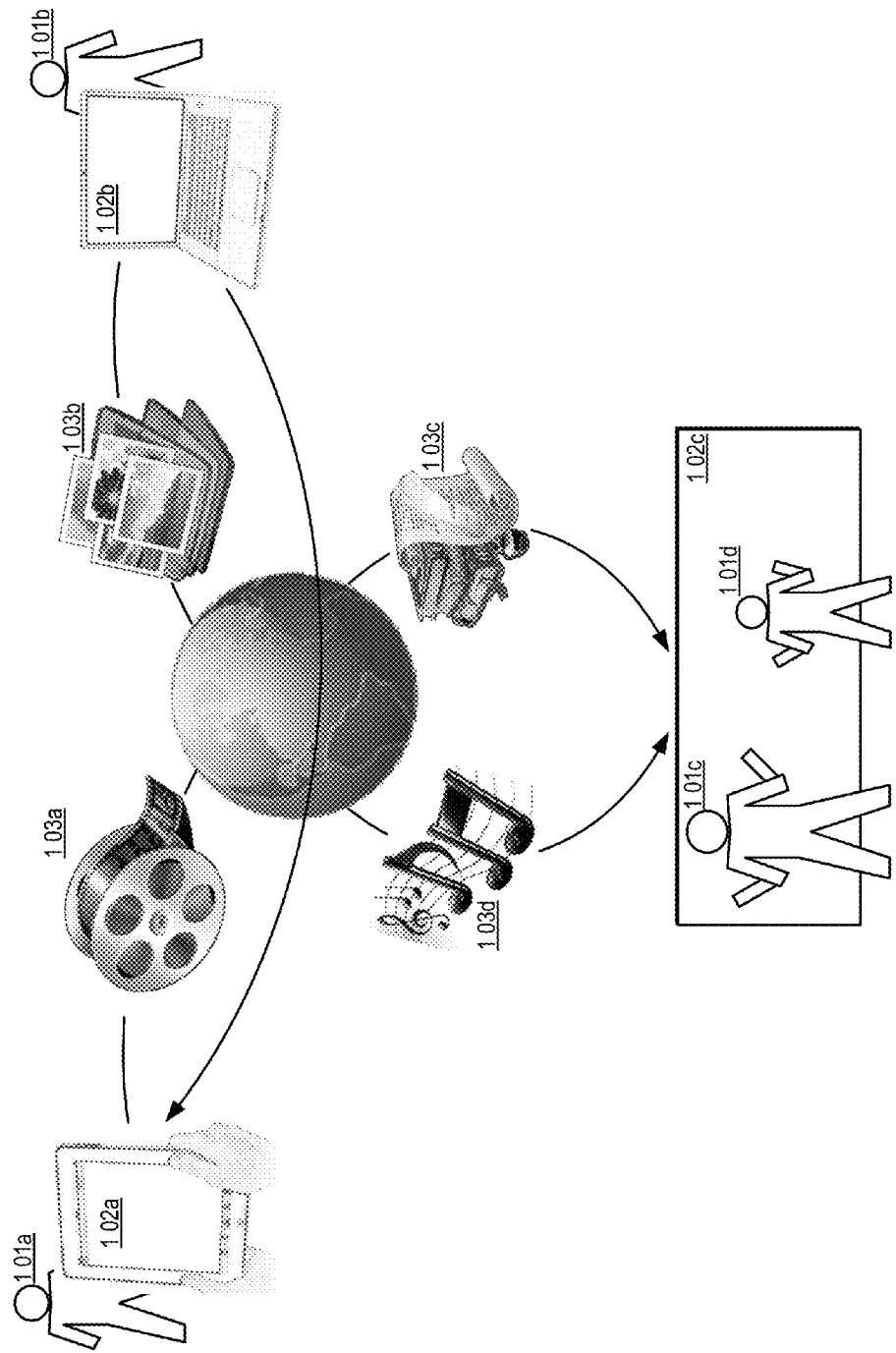
Figure 1B:
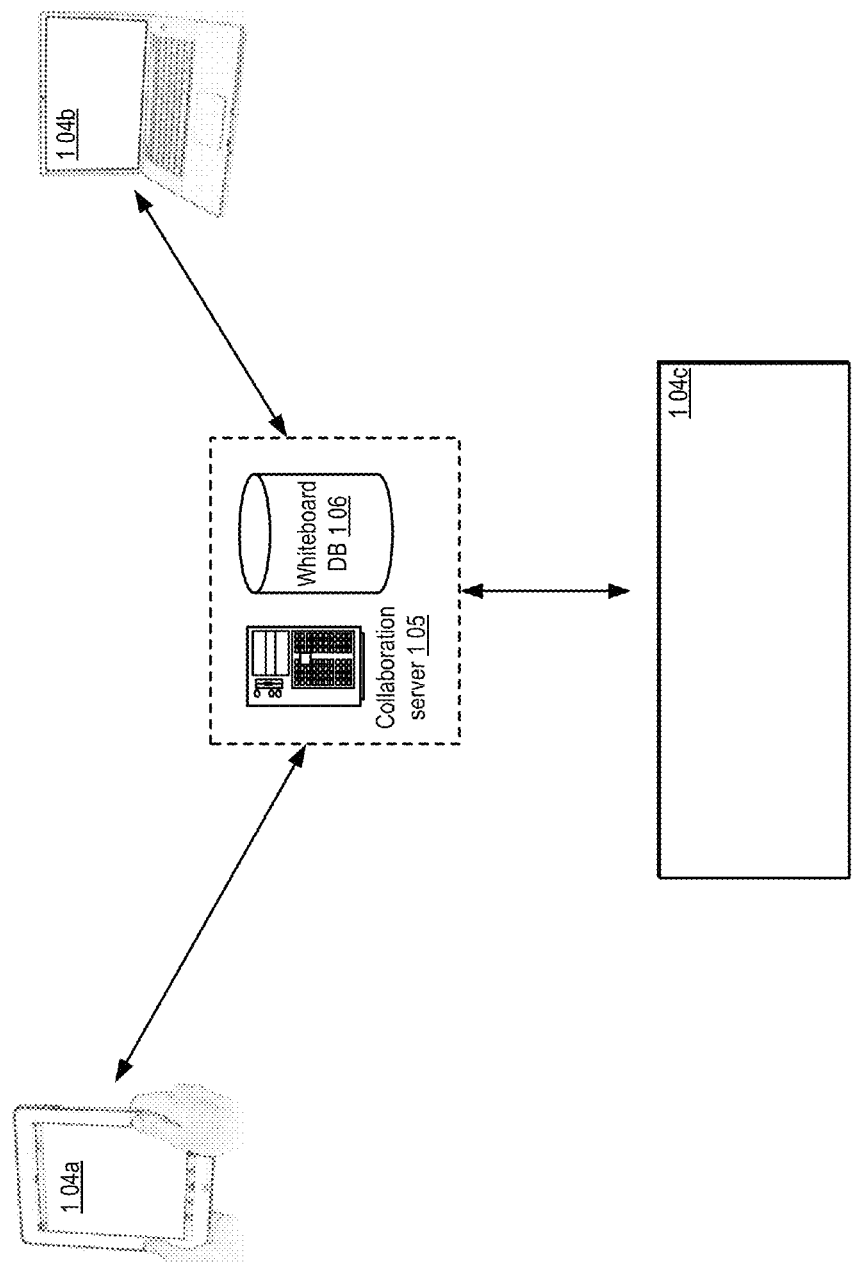
Figure 1C:
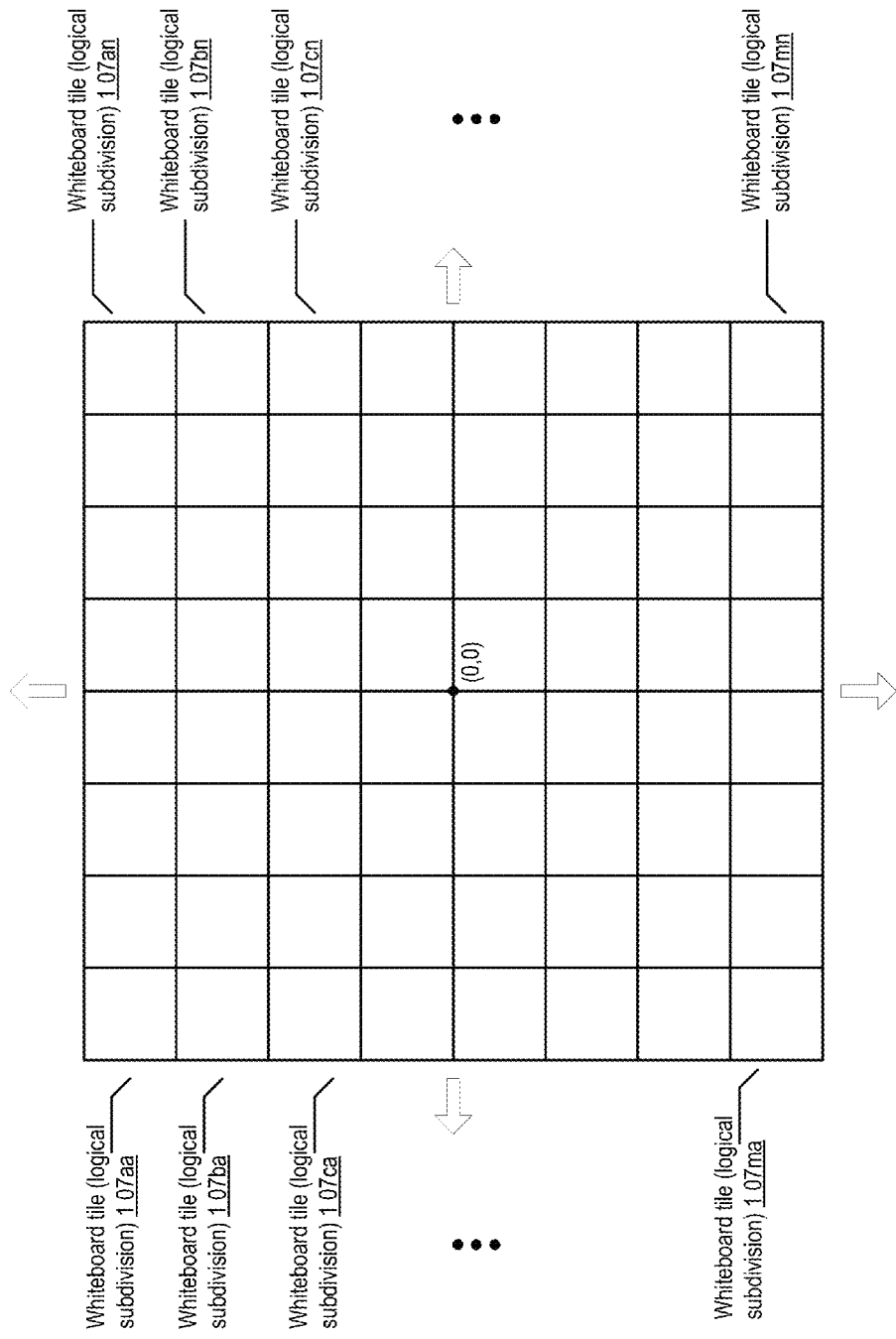
Figure 1D:
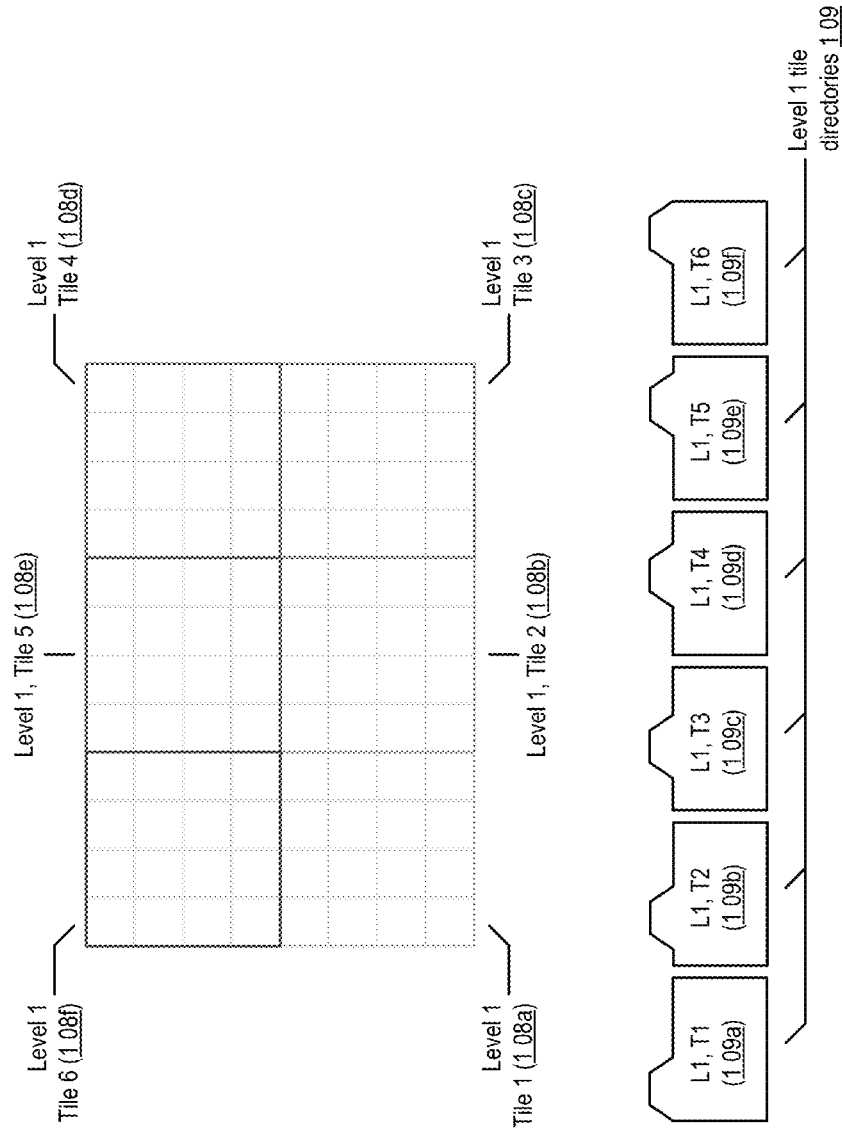
Figure 1E:
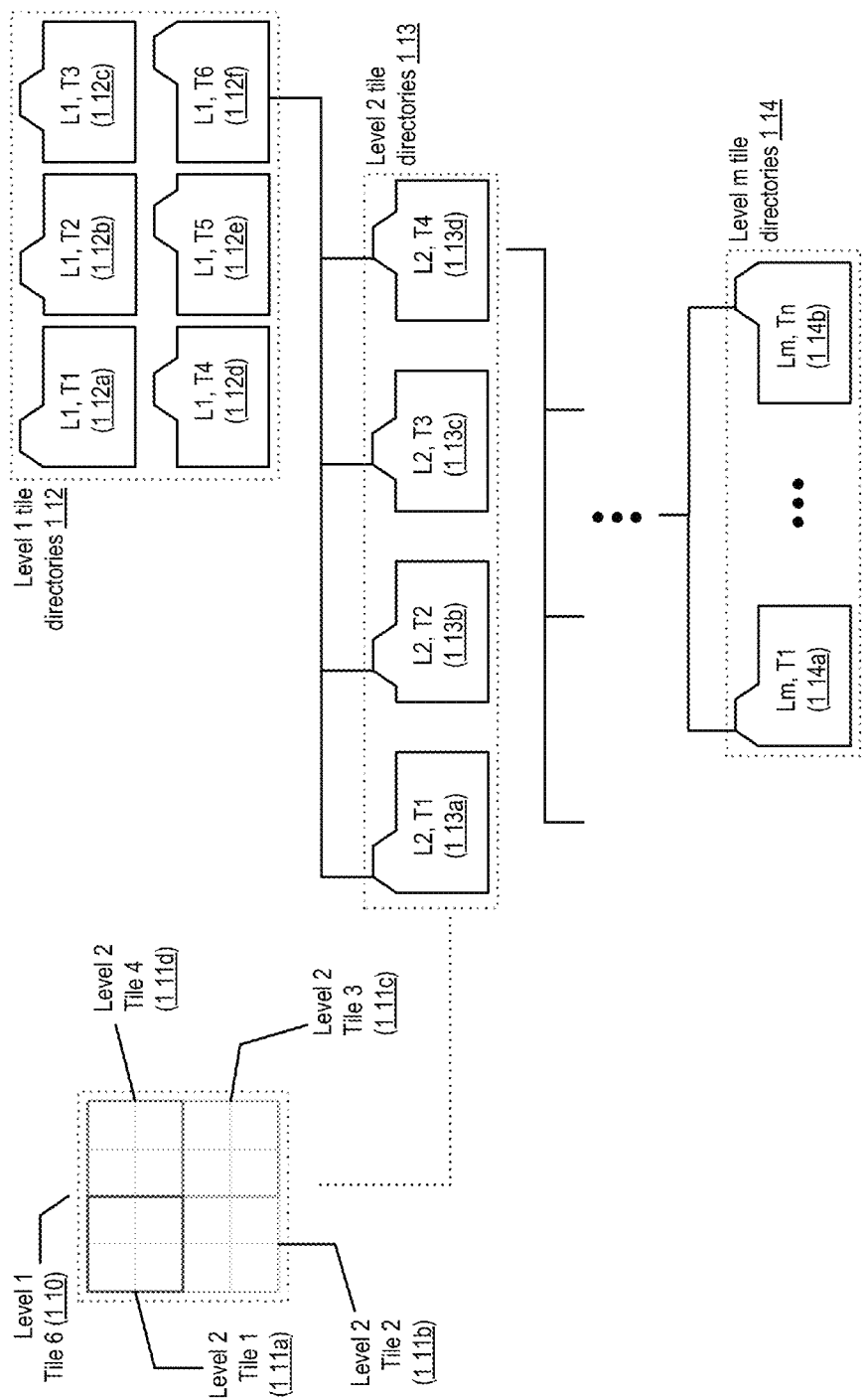
Figure 1F:
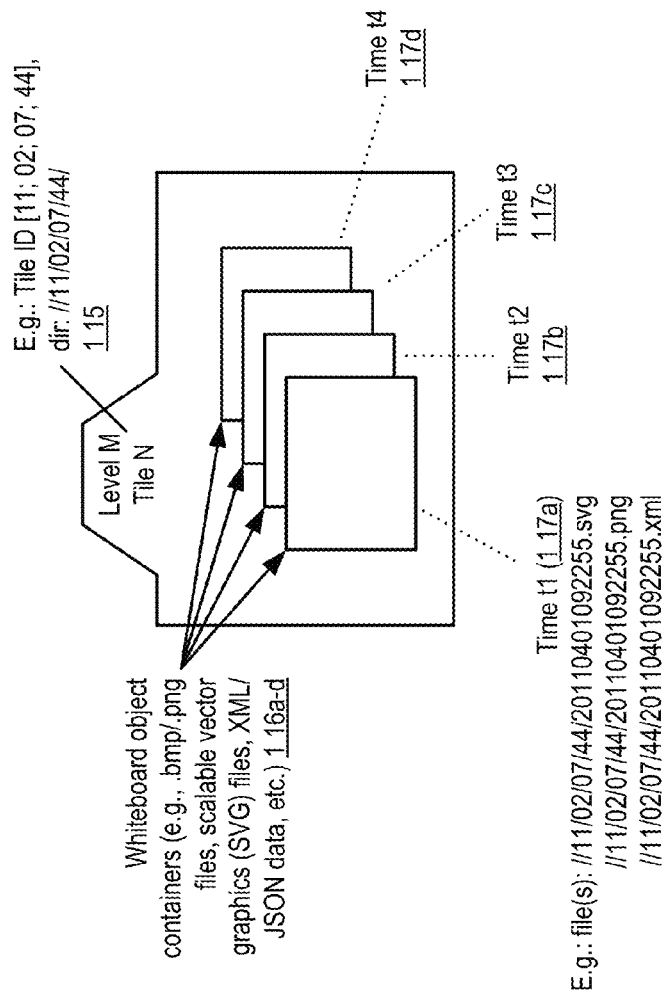
Figure 1G:
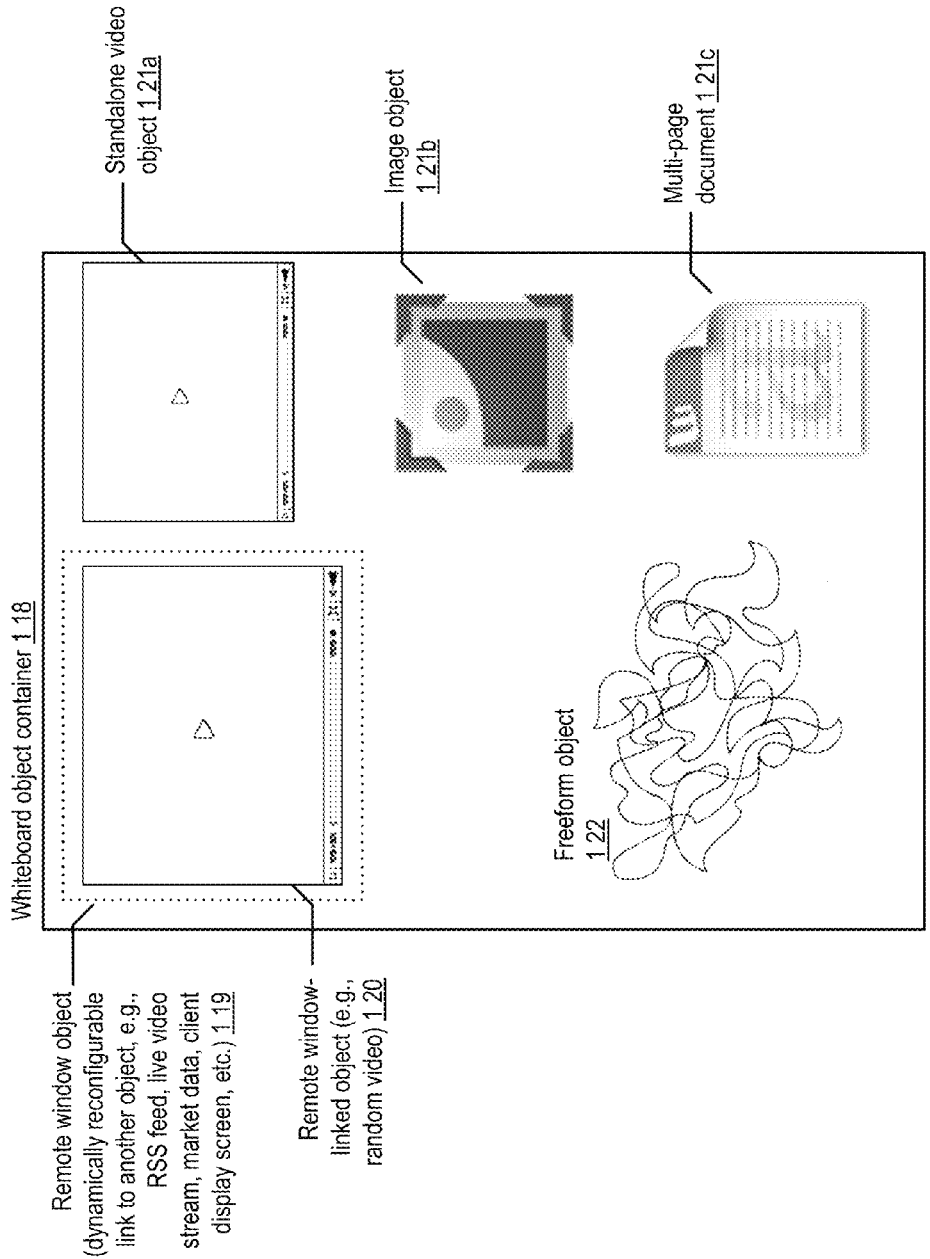
Figure 1I:
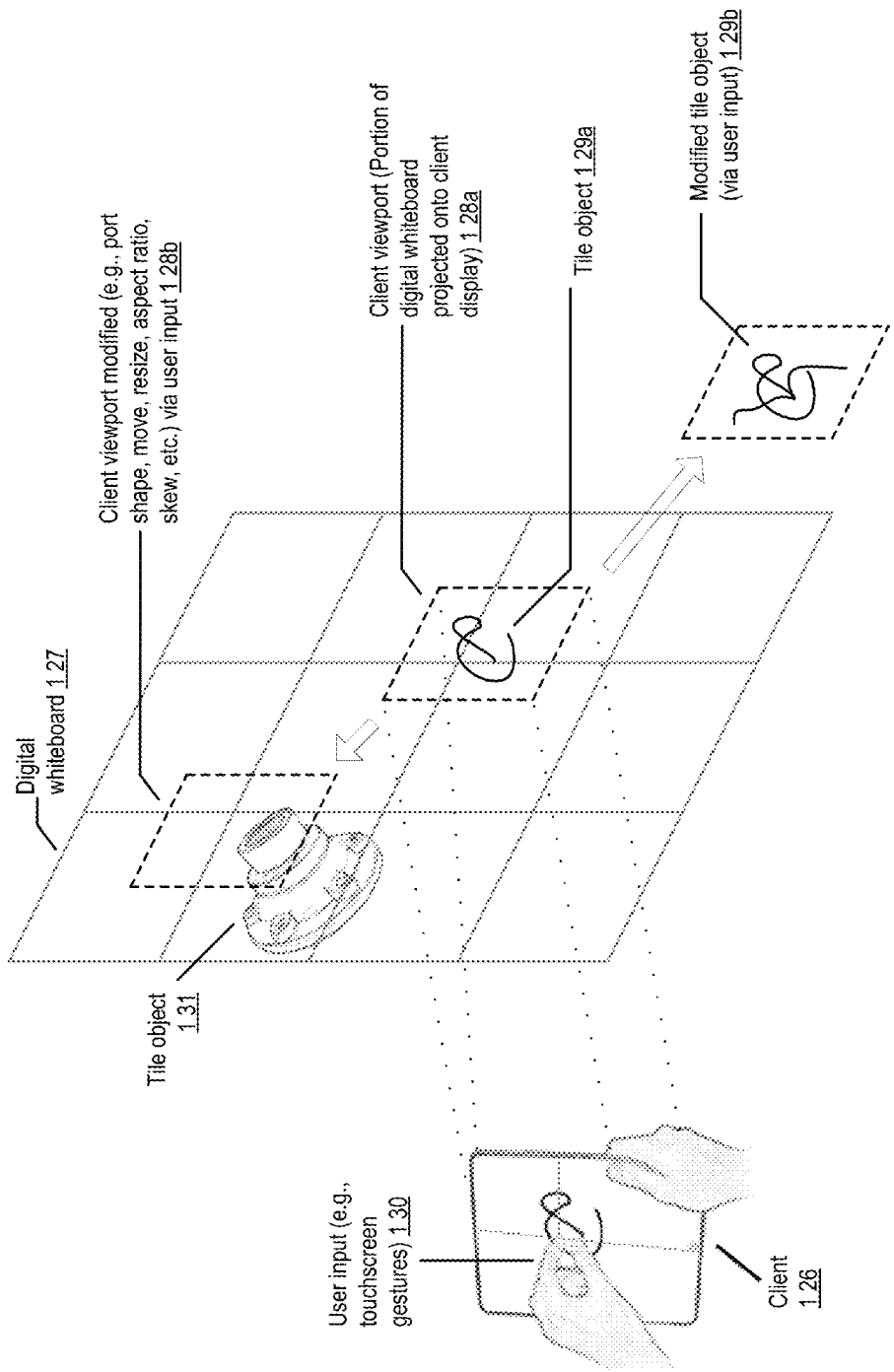
Figure 1K:

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Digital Whiteboard Collaboration (DWC)

The DIGITAL WHITEBOARD COLLABORATION APPARATUSES, METHODS AND SYSTEMS (hereinafter "DWC") transform user multi-element touchscreen gestures, via DWC components, into updated digital collaboration whiteboard objects. FIGS. 1A-K shows a block diagram illustrating example aspects of digital whiteboard collaboration in some embodiments of the DWC. In some implementations, a plurality of users, e.g., 101a-d, may desire to collaborate with each other in the creation of complex images, music, video, documents, and/or other media, e.g., 103a-d. The users may be scattered across the globe in some instances. Users may utilize a variety of devices in order to collaborate with each other, e.g., 102a-c. In some implementations, such devices may each accommodate a plurality of users (e.g., device 102c accommodating users 101c and 101d). In some implementations, the DWC may utilize a central collaboration server, e.g., 105, and/or whiteboard database, e.g., 106, to achieve collaborative interaction between a plurality of devices, e.g., 104a-c. In some implementations, the whiteboard database may have stored a digital whiteboard. For example, a digital collaboration whiteboard may be stored as data in memory, e.g., in whiteboard database 106. The data may, in various implementations, include image bitmaps, video objects, multi-page documents, scalable vector graphics, and/or the like. In some implementations, the digital collaboration whiteboard may be comprised of a plurality of logical subdivisions or tiles, e.g., 107*aa*-107*mn*. In some implementations, the digital whiteboard may be "infinite" in extent. For example, the number of logical subdivisions (tiles) may be as large as needed, subject only to memory storage and addressing considerations. For example, if the collaboration server utilizes 12-bit addressing, then the number of tile may be limited only by the addressing system, and or the amount of memory available in the whiteboard database.

In some implementations, each tile may be represented by a directory in a file storage system. For example, with reference to FIG. 1D, six tiles are included in one level of tiles, e.g., 108*a-f*. For each tile, a directory may be created in the file system, e.g., 109*a-f*. In some implementations, each tile may be comprised of a number of sub-tiles. For example, a level 1 tile, e.g., 110, may be comprised of a number of level 2 tiles, e.g., 111*a-d*. In such implementations, each sub-tile may be represented by a sub-folder in the file system, e.g., 113. In some implementations, tiles at each level may be comprised of sub-tiles of a lower level, thus generating a tree hierarchy structure, e.g., 112-114. In some implementations, a folder representing a tile may be storing a whiteboard object container. For example, a folder may be named according to its tile ID, e.g., 115. For example, a folder having tile ID [11 02 07 44] may represent the 44th tile at the further level, under the 7th tile at the third level, under the 2nd tile at the second level, under the 11th tile at the first level. In some implementations, such a folder may have stored whiteboard object container(s), e.g., 116*a-d*. The contents of the whiteboard object container may represent the contents of the tile in the digital whiteboard. The object container may include files such as, but not limited to: bitmap images, scalable vector graphics (SVG) files, eXtensible Markup Language (XML)/JavaScript™ object notation files, and/or the like. Such files may include data on objects contained within the digital collaboration whiteboard.

In some implementations, each file stored within a tile folder may be named to represent a version number, a timestamp, and/or like identification, e.g., 117*a-d*. Thus, various versions of each tile may be stored in a tile folder. In some implementations, each tile folder may include sub-folders representing layers of a tile of the digital whiteboard. Thus, in some implementations, each whiteboard may be comprised of various layers of tile objects superimposed upon each other.

In some implementations, the hierarchical tree structure of folders may be replaced by a set of folders, wherein the file names of the folders represent the tile level and layer numbers of each tile/layer in the digital whiteboard. Accordingly, in such implementations, sub-tile/layer folders need not be stored within their parent folders, but may be stored along side the parent folders in a flat file structure.

In some implementations, a whiteboard object container, e.g., 118, may include data representing various tile object that may be display on the digital whiteboard. For example, the whiteboard object container may include data standalone videos 121*a* (e.g., a link to a stored video), image objects, e.g., 121*b*, multi-page documents, e.g., 121*c*, freeform objects, e.g., 122, etc. In some implementations, the whiteboard object container may include a remote window object. For example, a remote window object may comprise a link to another object, e.g., a video, RSS feed, live video stream, client display screen, etc. For example, the link between the remote window object and any other object may be dynamically reconfigurable, e.g., 119. Thus, a remote window-linked object, e.g., 120 may be dynamically configured within the space reserved for the remote window within the digital whiteboard. Thus, for example, a randomly varying video, contents of an RSS feed, may be configured to display within the space reserved for the remote window.

In some implementations, object metadata may be associated with each tile object. For example, the metadata associated with a object may include a description of the object, object properties, and/or instructions for the DWC when the object is interrogated by a user (e.g., modified, viewed, clicked on, etc.). For example, an object may have associated XML-encoded data such as the example XML data provided below:

```
<tile_object>
    <general_properties>
        <object_id>AE1784</object_ID>
        <owner_ID>john.q.public@collaborate.com</owner_ID>
        <client_IP>129.88.79.102</client_IP>
        <last_modified>2011010122:15:07</last_modified>
        <drawdata_pointer>//11/02/07/44/
        20110401092255</drawdata_pointer>
    </general_properties>
    <display_properties>
        <origin>[25,251]</origin>
        <visible>true</visible>
        <shared>true</shared>
        <dumb_window_link>false</dumb_window_link>
        <svg width = "100%" height = "100%" version = "1.1"
            xmlns="http://www.w3.org/2000/svg">
            <circle cx="250" cy="75" r="33" stroke="blue"
            stroke-width="2" fill="yellow"/>
            <path d="M250 150 L150 350 L350 350 Z" />
            <polyline points=
            "0,0 0,20 20,20 20,40 40,40 40,80"
            style="fill:white;stroke:green;stroke-width:2"/>
            <polygon points="280,75 300,210 170,275"
                style="fill:#cc5500;
                stroke:#ee00ee;stroke-width:1"/>
        </svg>
    </display_properties>
    <context_instructions>
        <left_click>left_menu.csv</left_click>
        <right_click>right_menu.csv</right_click>
        <middle_click>middle_menu.csv</middle_click>
        <thumb_press>order:clear</thumb_press>
    </context_instructions>
</tile_object>
```

In some implementations, a client connected to a whiteboard collaboration session may communicate with the collaboration server to obtain a view of a portion of the digital whiteboard. For example, a client 126 may have associated with it a client viewport, e.g., a portion of the digital whiteboard 127 that is projected onto the client's display, e.g., 128*a*. In such implementations, the portion of tile objects, e.g., 129*a* extending into the client viewport, e.g., 128*a*, of the client, e.g., 126, may be depicted on the display of client 126. In some implementations, a user may modify the client viewport of the client. For example, the user may modify the shape of the client viewport, and/or the position of the client viewport. For example, with reference to FIG. 1I, the user may provide user input, e.g., touchscreen gestures 130, to modify the client viewport from its state in 128*a* to its state in 128*b*. Thus, the contents of the viewport may be modified from tile object 129*a* to a portion of tile object 131. In such a scenario, the portion of tile object 131 within the extent of the modified client viewport will be displayed on the display of client 126. In some implementations, the user may modify a tile object, e.g., 129*a* into modified tile object 129*b*, e.g., via user input 130. In such implementations, the modified tile object may be displayed on the display of the client 126.

In some implementations, a plurality of users may be utilizing clients to view portions of a digital whiteboard. For example, with reference to FIG. 1J, client 133a may receive client viewport data 135a comprising a depiction of the tile objects extending into client viewport 134a. Client 133b may receive client viewport data 135b comprising a depiction of the tile objects extending into client viewport 134b. Similarly, client 133c may receive client viewport data 135c comprising a depiction of the tile objects extending into client viewport 134c. In some scenarios, the client viewports of different client may not overlap (e.g., those of client 133a and client 133c). In other scenarios, the client viewports of two or more clients may overlap with each other, e.g., the client viewports 134b and 134c of clients 133b and 133c. In such scenarios, when a client modifies a tile object within the client's viewport, the modification of the tile object may be reflected in all viewports into which the modified portion of the tile object extends. Thus, in some implementations, a plurality of users may simultaneously observe the modification of a tile objects made by another user, facilitating collaborative editing of the tile objects.

In some implementations, a user may utilize a client, e.g., 137, to observe the modifications to a portion of a digital whiteboard across time/versions. For example, a user may position the client's viewport, e.g., 138, over a portion of the digital whiteboard (e.g., via user gestures into the client 137), and observe a time/version-evolution animation, e.g., 139, of that portion of the digital whiteboard on the client device's display using (time-stamped) versions, e.g., 136a-d, of the digital whiteboard.

Figure 2B:
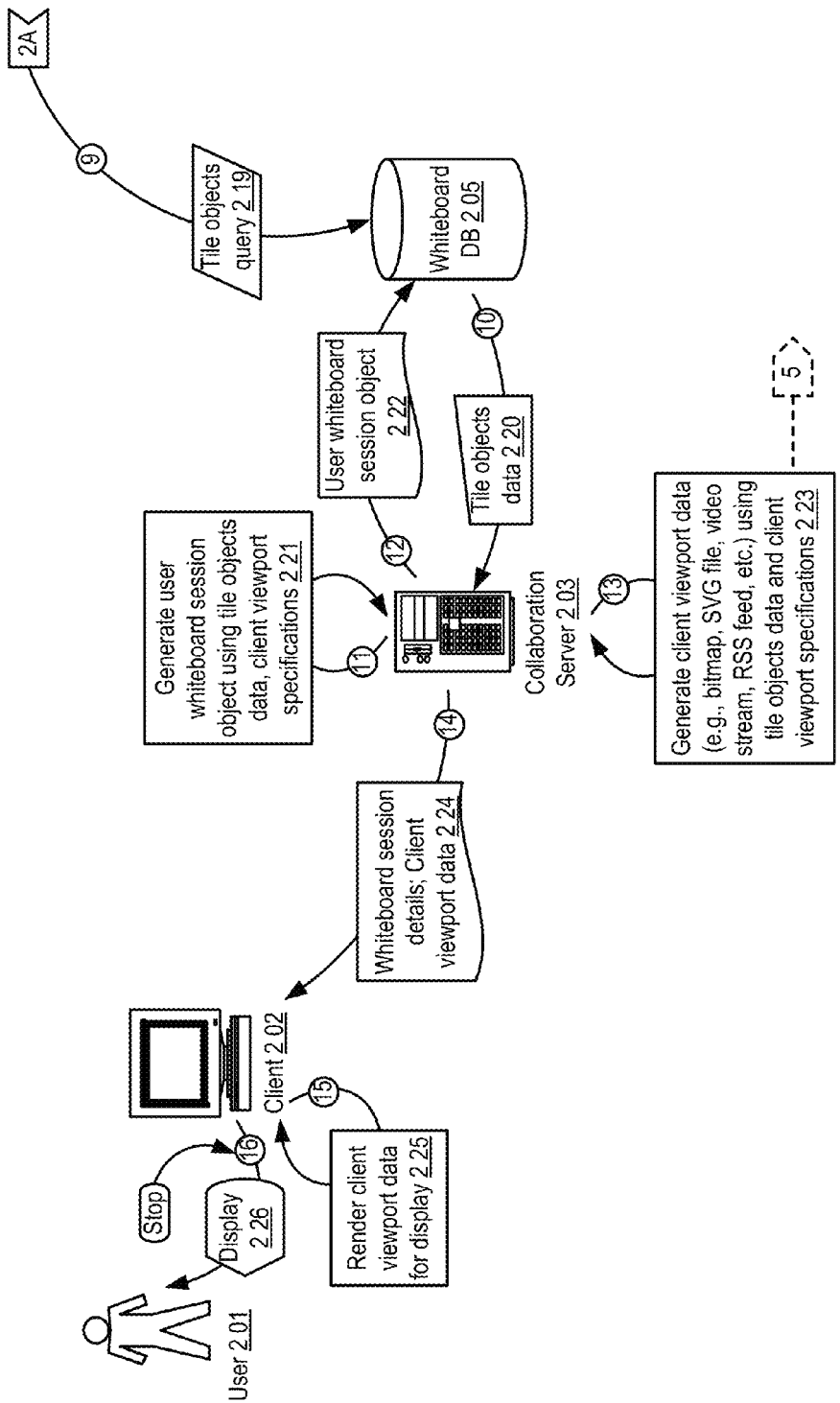

FIGS. 2A-B show data flow diagrams illustrating an example procedure to initiate a whiteboarding session for a user in some embodiments of the DWC. In some implementations, a user, e.g., 201, may desire to join a collaborative whiteboarding session on a digital whiteboard. For example, the user may utilize a client, e.g., 202, to join the digital whiteboarding collaboration session. The client may be a client device such as, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like. The user may provide collaborate request input, e.g., 211, into the client, indicating the user's desire to join the collaborative whiteboarding session. In various implementations, the user input may include, but not be limited to: keyboard entry, mouse clicks, depressing buttons on a joystick/game console, (3D; stereoscopic, time-of-flight 3D, etc.) camera recognition (e.g., motion, body, hand, limb, facial expression, gesture recognition, and/or the like), voice commands, single/multi-touch gestures on a touch-sensitive interface, touching user interface elements on a touch-sensitive display, and/or the like. For example, the user may utilize user touchscreen input gestures such as, but not limited to, the gestures depicted in FIGS. 8A-I and FIGS. 9A-C. In some implementations, the client may identify the user collaborate request input. For example, the client may utilize a user input identification component such as the User Gesture Identification ("UGI") component 1000 described below in FIG. 10. Upon identifying the user collaborate request input, the client may generate and provide a user whiteboard request, e.g., 212, to a server, e.g., collaboration server 203. For example, the client may provide a (Secure) HyperText Transport Protocol ("HTTP(S)") POST message with a message body encoded according to the eXtensible Markup Language ("XML") and including the user collaborate request input information. An example of such a HTTP(S) POST message is provided below:

```
POST /join.php HTTP/1.1
Host: www.collaborate.com
Content-Type: Application/XML
Content-Length: 324
<?XML version = "1.0" encoding = "UTF-8"?>
<join_request>
    <request_id>AJFY54</request_id>
    <timestamp>2010-05-23 21:44:12</timestamp>
    <user_ID>username@appserver.com</user_ID>
    <client_IP>275.37.57.98</client_IP>
    <client_MAC>EA-44-B6-F1</client_MAC>
    <session_id>4KJFH698</session_id>
    <session_name>work session 1</session_name>
</join_request>
```

In some implementations, the server (e.g., collaboration server 203) may parse the user whiteboarding request, and extract user credentials, e.g., 213, from the user whiteboarding request. Based on the extracted user credentials, the server may generate an authentication query, e.g., 214, for a database, e.g., users database 204. For example, the server may query whether the user is authorized to join the collaborative whiteboarding session. For example, the server may execute a hypertext preprocessor ("PHP") script including structured query language ("SQL") commands to query the database for whether the user is authorized to join the collaborative whiteboarding session. An example of such a PHP/SQL command listing is provided below:

```
<?PHP
header('Content-Type: text/plain');
mysql_connect("254.93.179.112",$DBserver,$password); // access database server
mysql_select_db("USERS.SQL"); // select database table to search
//create query
$query = "SELECT authorized_flag client_settings_list user_settings_list FROM
    UsersTable WHERE user_id LIKE '%' $userid" AND
    client_mac LIKE '%' $clientMAC";
$result = mysql_query($query); // perform the search query
mysql_close("USERS.SQL"); // close database access
?>
```

In response to obtaining the authentication query, e.g., 214, the database may provide, e.g., 215, an authentication response to the server. In some implementations, the server may determine, based on the authentication response, that the user is authorized to join the collaborative whiteboarding session. In such implementations, the server may parse the user whiteboarding request and/or the authentication response, and obtain client specifications for the client 202. For example, the server may extract client specifications including, but not limited to: display size, resolution, orientation, frame rate, contrast ratio, pixel count, color scheme, aspect ratio, 3D capability, and/or the like. In some implementations, using the client viewport specifications, the server may generate a query for tile objects that lie within the viewport of the client. For example, the server may provide a tile objects query, e.g., 219, to a database, e.g., whiteboard database 205, requesting information on tile objects which may form part of the client viewport content displayed on the client 202. For example, the server may provide the tile IDs of the tiles which overlap with the client viewport, and request a listing of tile object IDs and tile object data for object which may partially reside within the tile IDs. An example PHP/SQL command listing for querying a database for tile objects data within a single tile ID is provided below:

```
<?PHP
header('Content-Type: text/plain');
mysql_connect("254.93.179.112",$DBserver,$password); // access database server
mysql_select_db("OBJECTS.SQL"); // select database table to search
//create query
$query = "SELECT object_id object_data WHERE tile_id LIKE '%' $tileID";
$result = mysql_query($query); // perform the search query
mysql_close("OBJECTS.SQL"); // close database access
?>
```

In some implementations, the database may, in response to the tile objects query 219, provide the requested tile objects data, e.g., 220. For example, the database may provide a data structure representative of a scalable vector illustration, e.g., a Scalable Vector Graphics ("SVG") data file. The data structure may include, for example, data representing a vector illustration. For example, the data structure may describe a scalable vector illustration having one or more objects in the illustration. Each object may be comprised of one or more paths prescribing, e.g., the boundaries of the object. Further, each path may be comprised of one or more line segments. For example, a number of very small line segments may be combined end-to-end to describe a curved path. A plurality of such paths, for example, may be combined in order to form a closed or open object. Each of the line segments in the vector illustration may have start and/or end anchor points with discrete position coordinates for each point. Further, each of the anchor points may comprise one or more control handles. For example, the control handles may describe the slope of a line segment terminating at the anchor point. Further, objects in a vector illustration represented by the data structure may have stroke and/or fill properties specifying patterns to be used for outlining and/or filling the object. Further information stored in the data structure may include, but not be limited to: motion paths for objects, paths, line segments, anchor points, etc. in the illustration (e.g., for animations, games, video, etc.), groupings of objects, composite paths for objects, layering information (e.g., which objects are on top, and which objects appear as if underneath other objects, etc.) and/or the like. For example, the data structure including data on the scalable vector illustration may be encoded according to the open XML-based Scalable Vector Graphics "SVG" standard developed by the World Wide Web Consortium ("W3C"). An exemplary XML-encoded SVG data file, written substantially according to the W3C SVG standard, and including data for a vector illustration comprising a circle, an open path, a closed polyline composed of a plurality of line segments, and a polygon, is provided below:

```
<?XML version = "1.0" standalone = "no">
<!DOCTYPE svg PUBLIC "-//W3C//DTD SVG 1.1//EN"
  "http://www.w3.org/Graphics/SVG/1.1/DTD/svg11.dtd">
<svg width = "100%" height = "100%" version = "1.1"
  xmlns="http://www.w3.org/2000/svg">
  <circle cx="250" cy="75" r="33" stroke="blue"
  stroke-width="2" fill="yellow"/>
```

-continued

```
  <path d="M250 150 L150 350 L350 350 Z" />
  <polyline points="0,0 0,20 20,20 20,40 40,40 40,80"
  style="fill:white;stroke:green;stroke-width:2"/>
  <polygon points="280,75 300,210 170,275"
  style="fill:#cc5500;
  stroke:#ee00ee;stroke-width:1"/>
</svg>
```

In some implementations, the server may generate client viewport data (e.g., bitmap, SVG file, video stream, RSS feed, etc.) using the tile objects data and client viewport specifications, e.g. 223. The server may provide the generated client viewport data and client viewport specifications as whiteboard session details and client viewport data, e.g., 224.

In some implementations, the client may render, e.g. 225, the visualization represented in the client viewport data for display to the user. For example, the client may be executing an Adobe® Flash object within a browser environment including ActionScript™ 3.0 commands to render the visualization represented in the data structure, and display the rendered visualization for the user. Exemplary commands, written substantially in a form adapted to ActionScript™ 3.0, for rendering a visualization of a scene within an Adobe® Flash object with appropriate dimensions and specified image quality are provided below:

```
// import necessary modules/functions
import flash.display.BitmapData;
import flash.geom.*;
import com.adobe.images.JPGEncoder;
// generate empty bitmap with appropriate dimensions
var bitSource:BitmapData = new BitmapData (sketch_mc.width,
sketch_mc.height);
// capture snapsot of movie clip in bitmap
bitSource.draw(sketch_mc);
var imgSource:Image = new Image( );
imgSource.load(new Bitmap(bitSource, "auto", true));
// generate scaling constants for 1280 x 1024 HD output
var res:Number = 1280 / max(sketch_mc.width, sketch_mc.height);
var width:Number = round(sketch_mc.width * res);
var height:Number = round(sketch_mc.height * res);
// scale the image
imgSource.content.width = width;
// JPEG-encode bitmap with 85% JPEG compression image quality
var jpgEncoder:JPGEncoder = new JPGEncoder(85);
var jpgStream:ByteArray = jpgEncoder.encode(jpgSource);
```

In some implementations, the client may continuously generate new scalable vector illustrations, render them in real time, and provide the rendered output to the visual display unit, e.g. 226, in order to produce continuous motion of the objects displayed on the visual display unit connected to the client. In some implementations, the DWC may contain a library of pre-rendered images and visual objects indexed to be associated with one or more of search result terms or phrases, such as Clip Art files, e.g., accessible through Microsoft® PowerPoint application software.

Figure 3A:
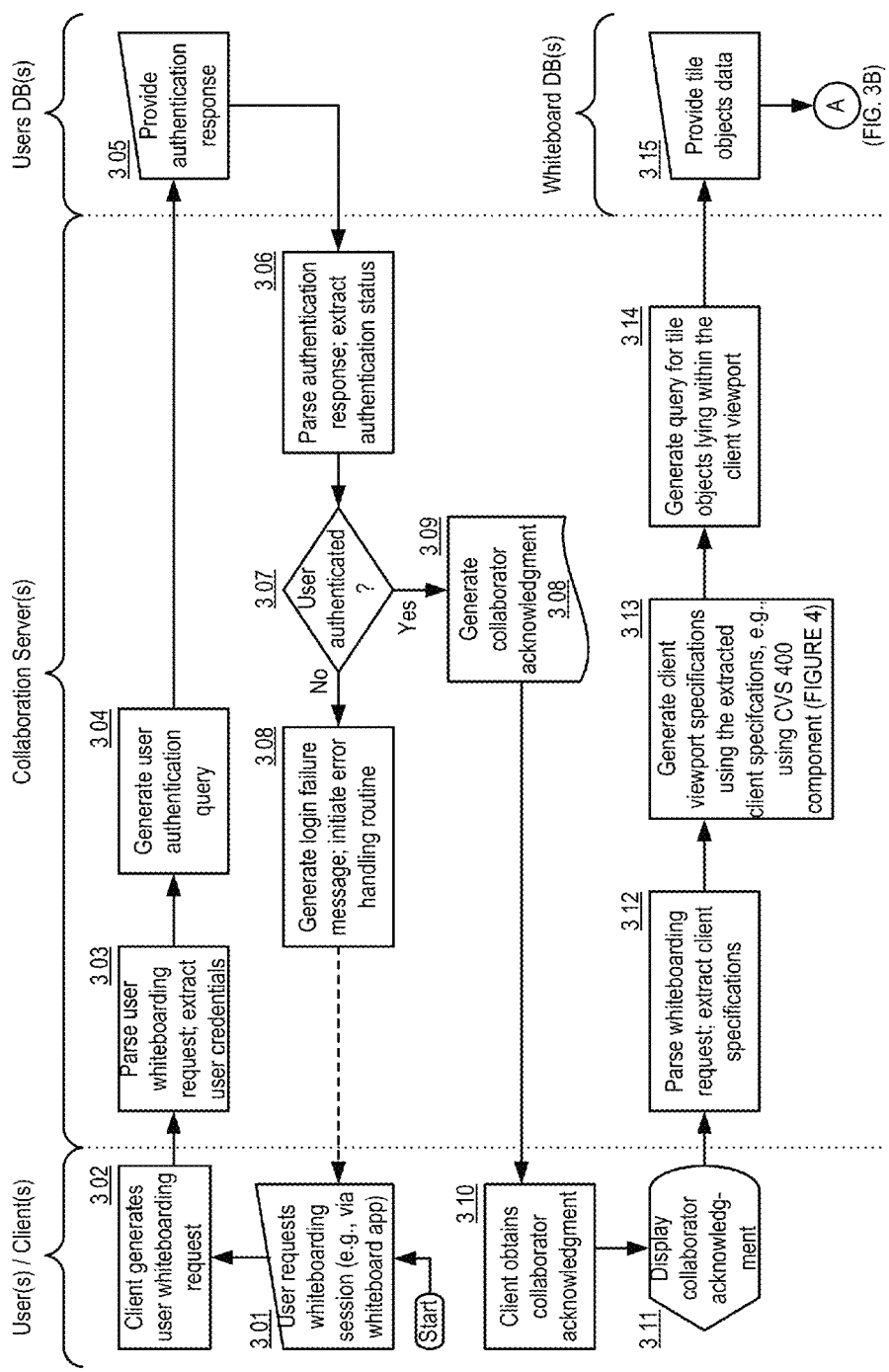
FIGS. 3A-B show logic flow diagrams illustrating example aspects of initiating a whiteboarding session for a user in some embodiments of the DWC, e.g., a Whiteboard Collaborator Session Initiation ("WCSI") component 300.
Figure 3B:
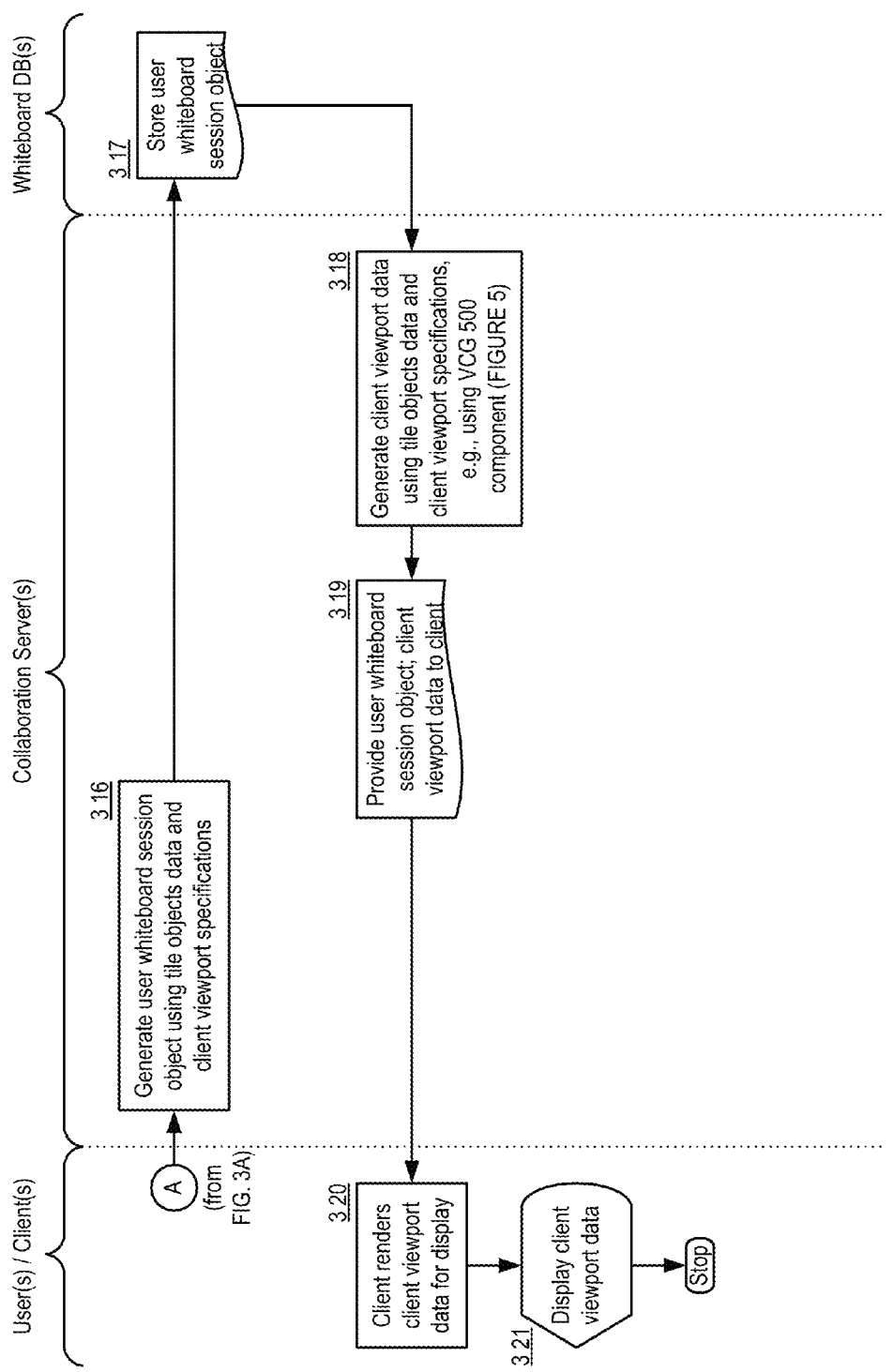

FIGS. 3A-B show logic flow diagrams illustrating example aspects of initiating a whiteboarding session for a user in some embodiments of the DWC, e.g., a Whiteboard Collaborator Session Initiation ("WCSI") component 300. In some implementations, a user may desire to join a collaborative whiteboarding session on a digital whiteboard. For example, the user may utilize a client to join the digital whiteboarding collaboration session. The user may provide collaborate request input, e.g., 301, into the client, requesting that the user join the whiteboarding session (e.g., via a whiteboarding app installed and/or executing on the client, such as an iPhone®/iPad® app, Adobe® Flash object, JavaScript™ code executing within a browser environment, application executable (*.exe) file, etc.). In some implementations, the client may identify the user collaborate request input. For example, the client may utilize a user input identification component such as the User Gesture Identification ("UGI") component 1000 described below in FIG. 10. Upon identifying the user collaborate request input, the client may generate and provide a user whiteboard request, e.g., 302, to a collaboration server. In some implementations, the collaboration server may parse the user whiteboarding request and extract user credentials, e.g., 303. Example parsers that the server may utilize are described further below in the discussion with reference to FIG. 12. Based on the extracted user credentials, the server may generate an authentication query, e.g., 304, for a users database, e.g., by executing PHP/SQL commands similar to the examples above. In some implementations, the database may provide an authentication response, e.g., 305. The server may parse the obtained authentication response, and extract the authentication status of the user/client, e.g., 306. If the user is not authenticated, e.g., 307, option "No," the server may generate a login failure message, and/or may initiate an error handling routine, e.g., 308.

In some implementations, upon authentication of the user/client, e.g., 307, option "Yes," the server may generate a collaborator acknowledgment, e.g., 309, for the user/client. The client may obtain the server's collaborator acknowledgment, e.g., 310, and in some implementations, display the acknowledgment for the user, e.g., 311.

In some implementations, the server may parse the user whiteboarding request and/or the authentication response, and obtain client specifications for the client. For example, the server may extract client specifications including, but not limited to: display size, resolution, orientation, frame rate, contrast ratio, pixel count, color scheme, aspect ratio, 3D capability, and/or the like, using parsers such as those described further below in the discussion with reference to FIG. 12. In some implementations, e.g., where the client viewport specifications have not been previously generated for the client being used by the user, the server may generate client viewport specifications using the specifications of the client. For example, the server may utilize a component such as the example client viewport specification component 400 discussed further below with reference to FIG. 4. In some implementations, using the client viewport specifications, the server may generate a query for tile objects that lie within the viewport of the client. For example, the server may provide a tile objects query, e.g., 314, to a whiteboard database 205, requesting information on tile objects which may form part of the client viewport content displayed on the client. For example, the server may provide the tile IDs of the tiles which overlap with the client viewport, and request a listing of tile object IDs and tile object data for object which may partially reside within the tile IDs. In some implementations, the database may, in response to the tile objects query 314, provide the requested tile objects data, e.g., 315. In some implementations, the server may generate a whiteboard session object, e.g., 316, using the client viewport specifications and/or the tile objects data. In some implementations, the server may store the whiteboard session object to a database, e.g., 317. In some implementations, the server may generate client viewport data (e.g., bitmap, SVG file, video stream, RSS feed, etc.) using the tile objects data and client viewport specifications, e.g. 318. The server may provide the generated client viewport data and client viewport specifications, e.g., 319, to the client. In some implementations, the client may render, e.g. 320, the visualization represented in the client viewport data for display to the user and/or continuously generate new scalable vector illustrations, render them in real time, and provide the rendered output to the visual display unit, e.g. 321, in order to produce continuous motion of the objects displayed on the visual display unit connected to the client.

Figure 4:
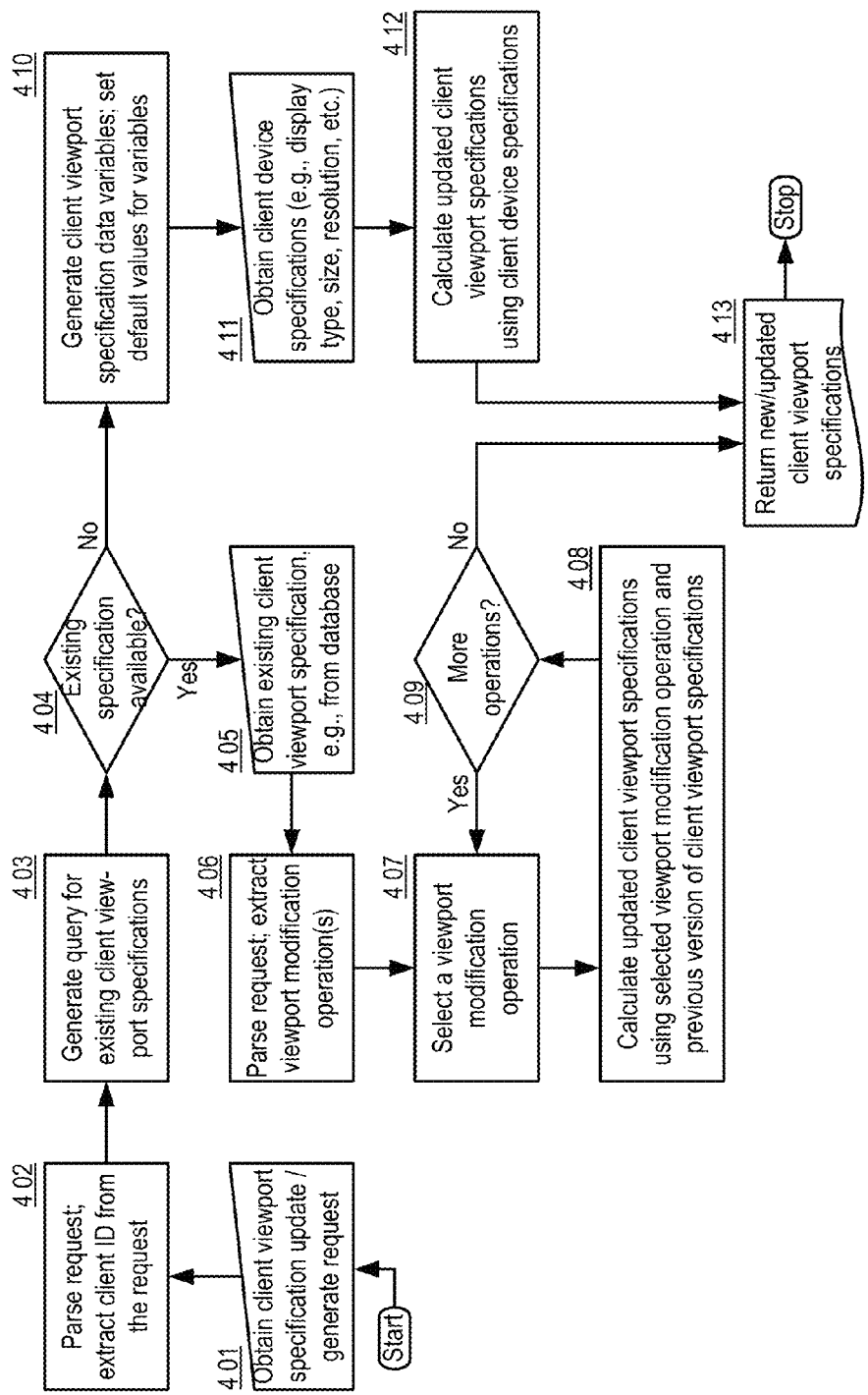
FIG. 4 shows a logic flow diagram illustrating example aspects of generating viewport specification for a client of a whiteboarding session collaborator in some embodiments of the DWC, e.g., a Client Viewport Specification ("CVS") component 400.

FIG. 4 shows a logic flow diagram illustrating example aspects of generating viewport specification for a client of a whiteboarding session collaborator in some embodiments of the DWC, e.g., a Client Viewport Specification ("CVS") component 400. In some implementations, a DWC component, e.g., a collaboration server, may obtain a request, e.g., 401, to generate new and/or updated client viewport specifications for a client of a user involved in, or seeking to join, a whiteboarding session within the DWC. For example, the request may be in the form of a HTTP(S) POST message with XML-encoded message body, similar to the examples provided above. The DWC may parse the request, and extract a client ID from the request. The DWC may generate a query, e.g., 403, for existing client viewport specifications associated with the client ID. For example, the DWC may utilize PHP/SQL commands to query a database, similar to the examples provided above. If an existing client viewport specification is available for the given client ID, e.g., 404, option "Yes," the DWC may obtain the existing client viewport specification, e.g., for a database. The DWC may parse the request, and extract any operations required to be performed on the existing client viewport specification (e.g., if the request is for updating the client viewport specification). For example, the request may include a plurality of client viewport modification instructions (e.g., convert viewport from rectangular shape to circular shape, modify the zoom level of the viewport, modify the aspect ratio of the viewport, modify the position of the viewport, etc.). The DWC may select each instruction, e.g., 407, and calculate an updated client viewport specification based on the instruction using the previous version of the client viewport specification, e.g., 408. In some implementations, the DWC may operate on the client viewport specifications using each of the instructions, e.g., 409, until all client viewport modification operations have been performed, e.g., 409, option "No." In some implementations, the DWC may return the updated client viewport specifications, e.g., 413.

In some implementations, the DWC may determine that there are no existing client viewport specifications. In such implementations, the DWC may generate client viewport specification data variables, e.g., display size, resolution, shape, aspect ratio, zoom level, [x,y] position, whiteboard layers visible, etc., e.g., 410. The DWC may initially set default values for each of the client viewport specification variables. The DWC may obtain the client device specifications (e.g., client's display monitor size, pixel count, color depth, resolution, etc.), e.g., 411. Based on the client's actual specifications, the DWC may calculate updated client viewport specification using the client device specifications and the default values set for each of the client viewport specification variables. The DWC may return the calculated updated client viewport specifications, e.g., 413.

Figure 5:
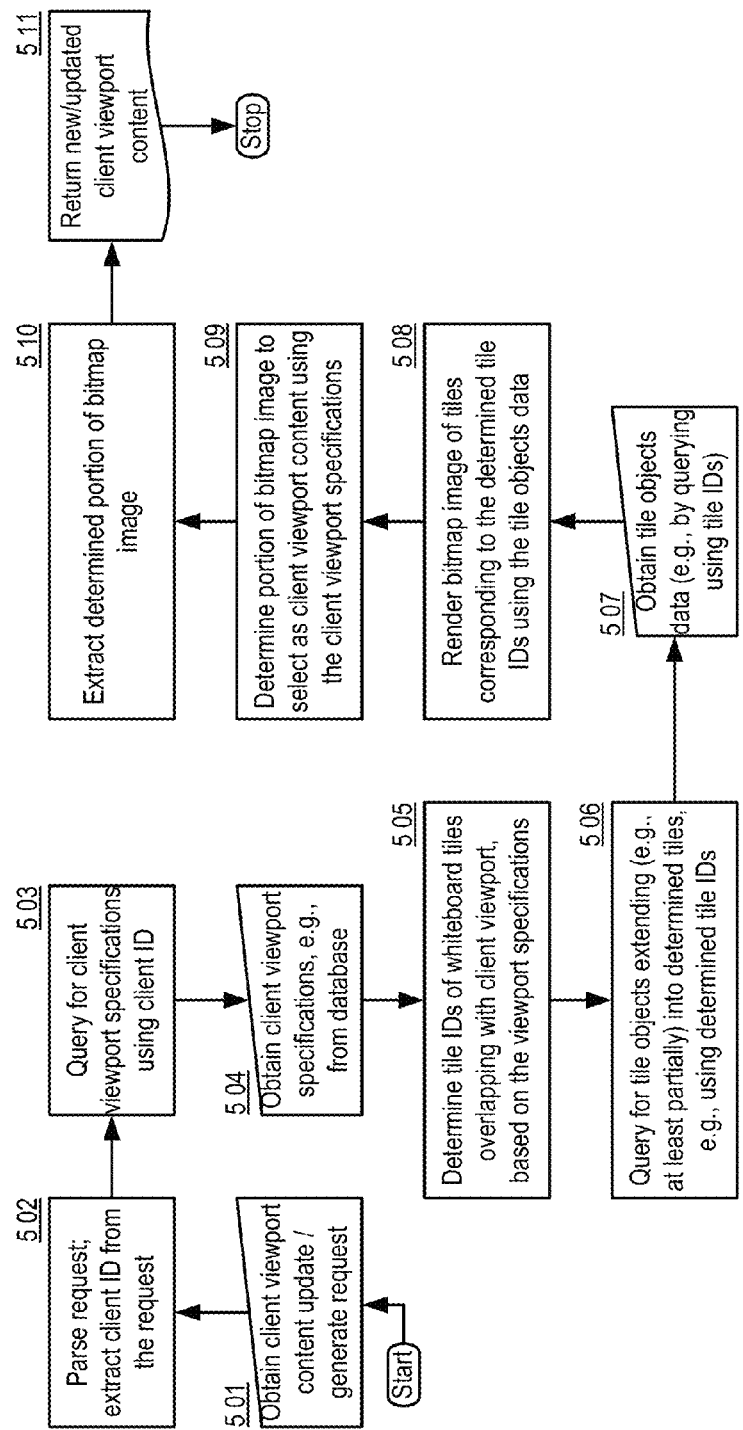
FIG. 5 shows a logic flow diagram illustrating example aspects of generating viewport content for a client of a whiteboarding session collaborator in some embodiments of the DWC, e.g., a Viewport Content Generation ("VCG") component 500.

FIG. 5 shows a logic flow diagram illustrating example aspects of generating viewport content for a client of a whiteboarding session collaborator in some embodiments of the DWC, e.g., a Viewport Content Generation ("VCG") component 500. In some implementations, a component of the DWC (e.g., collaboration server) may obtain a request to update/generate client viewport data to provide for a client involved in a whiteboarding session, e.g., 501. In some implementations, the DWC may parse the request, and extract a client ID from the request, e.g., 502. The DWC may generate a query, e.g., 503, for client viewport specifications associated with the client ID. For example, the DWC may utilize PHP/SQL commands to query a database, similar to the examples provided above. The DWC may obtain the existing client viewport specification, e.g., from a database, e.g., 504. In some implementations, the DWC may determine tile IDs of whiteboard tiles that overlap with the client viewport of the client, e.g., 505. For example, the DWC may calculate the extent of the client viewport using the client viewport specifications (e.g., position coordinates and length/width). Based on the extent of the client viewport, the DWC may determine which of the tile the client viewport extends into, and obtain the tile IDs of the determined whiteboard tiles. In some implementations, the DWC may obtain tile object data for all tile objects that lie within the tile IDs into which the client viewport extends. For example, the DWC may query, e.g., 506, for tile objects data of all tile objects that extend into tiles that the client viewport also extends into. For example, the DWC may obtain such data from a database, e.g., 507. In some implementations, using the tile objects data, the DWC may generate a rendered bitmap of the tiles corresponding to the determined tile IDs using the tile objects data, e.g., 508. In alternate implementations, the DWC may generate SVG files, video, documents, and/or the like, objects that may be displayed on the client's display monitor. In some implementations, the DWC may determine a portion of the rendered bitmap that overlaps with the client viewport, based on the client viewport specifications, e.g., 509. The DWC may extract the determined portion of the rendered bitmap, e.g., 510, and provide the portion as updated client viewport data to the client, e.g., 511.

Figure 6A:
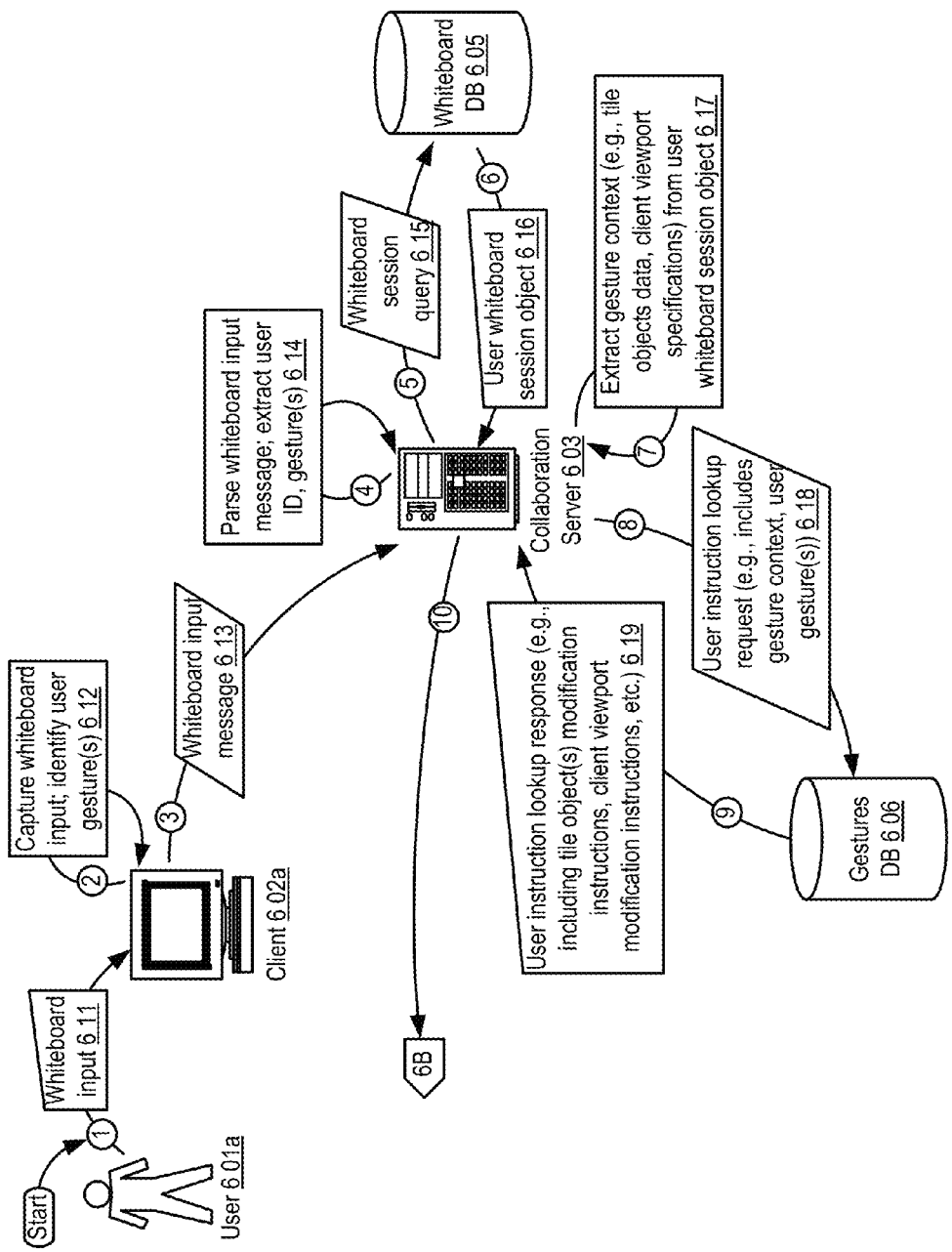
FIGS. 6A-C show data flow diagrams illustrating an example procedure to facilitate collaborative whiteboarding among a plurality of users in some embodiments of the DWC.
Figure 6B:
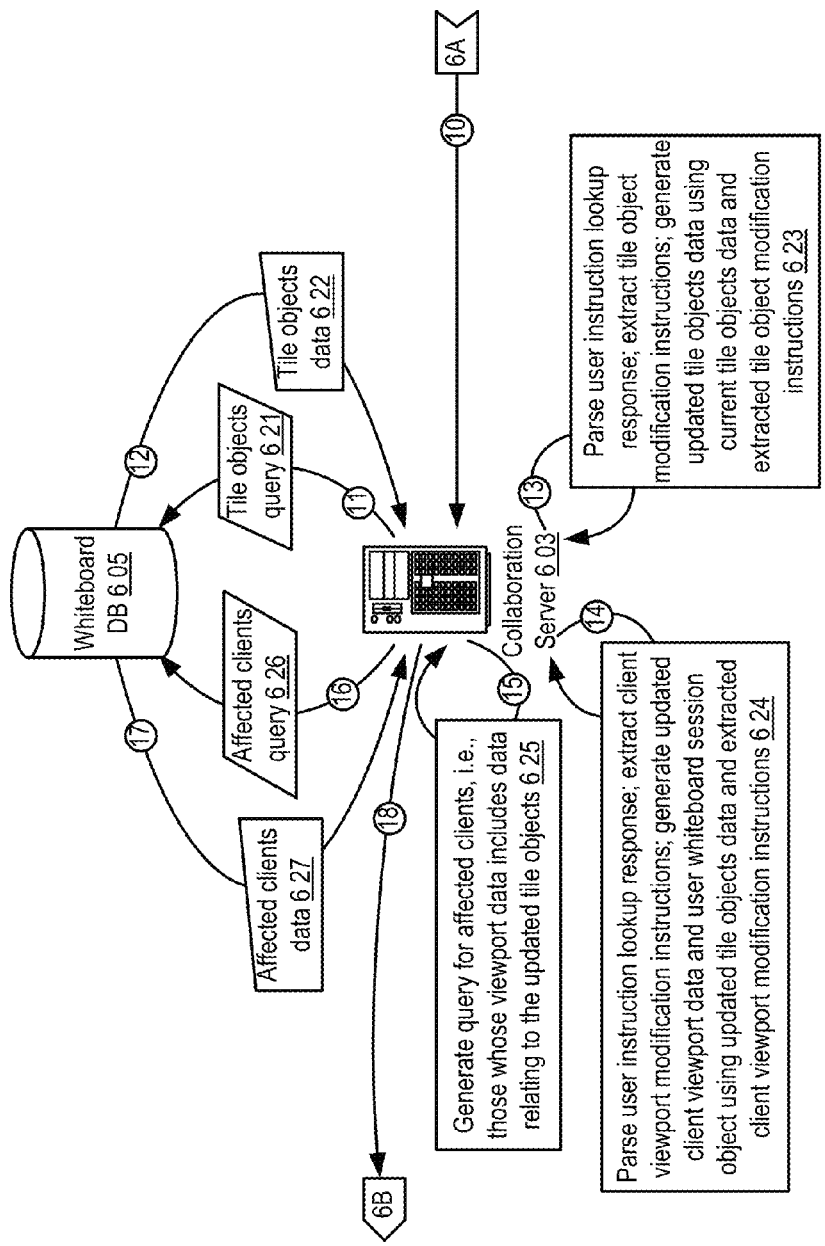
Figure 6C:
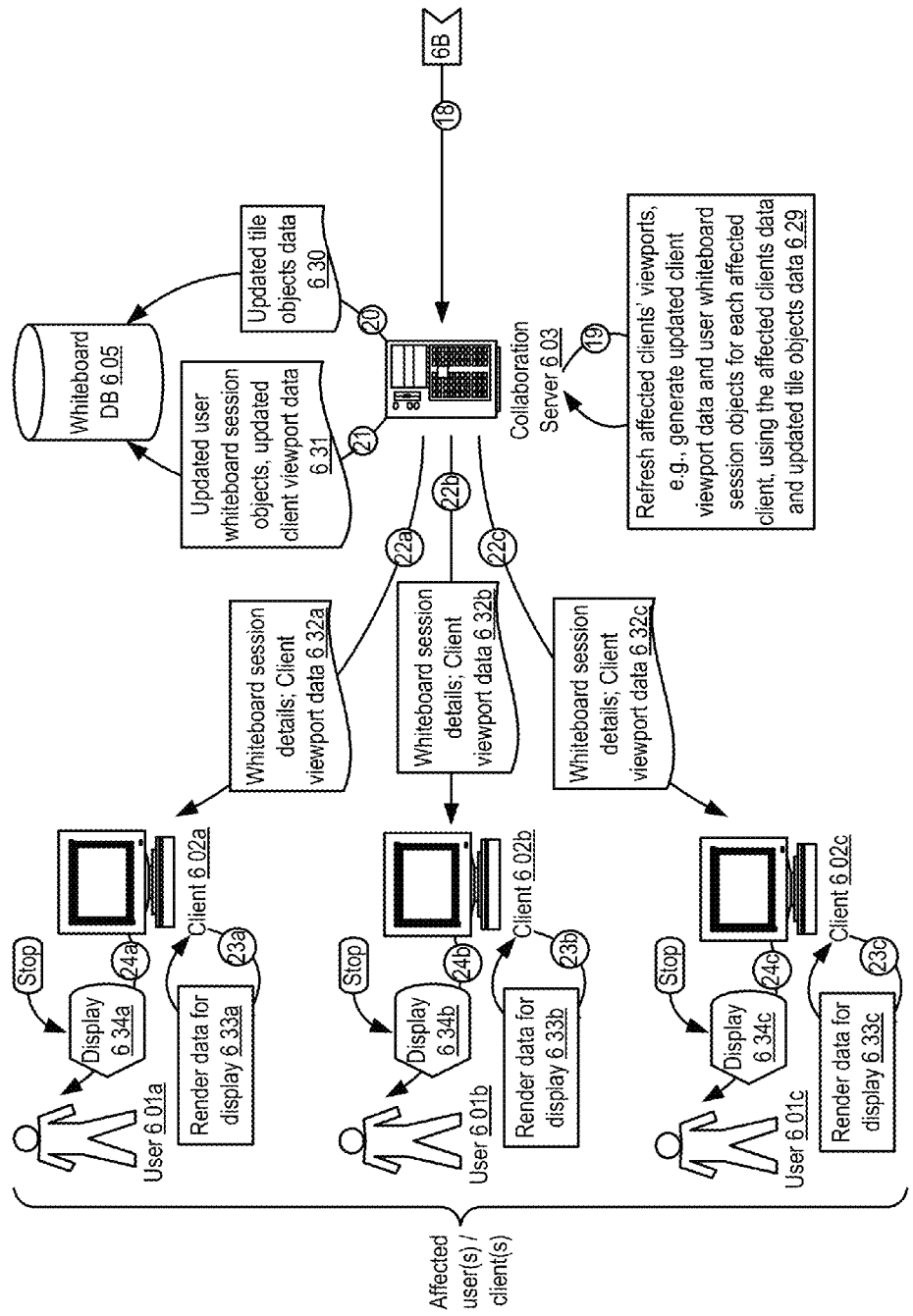
Figure 7A:
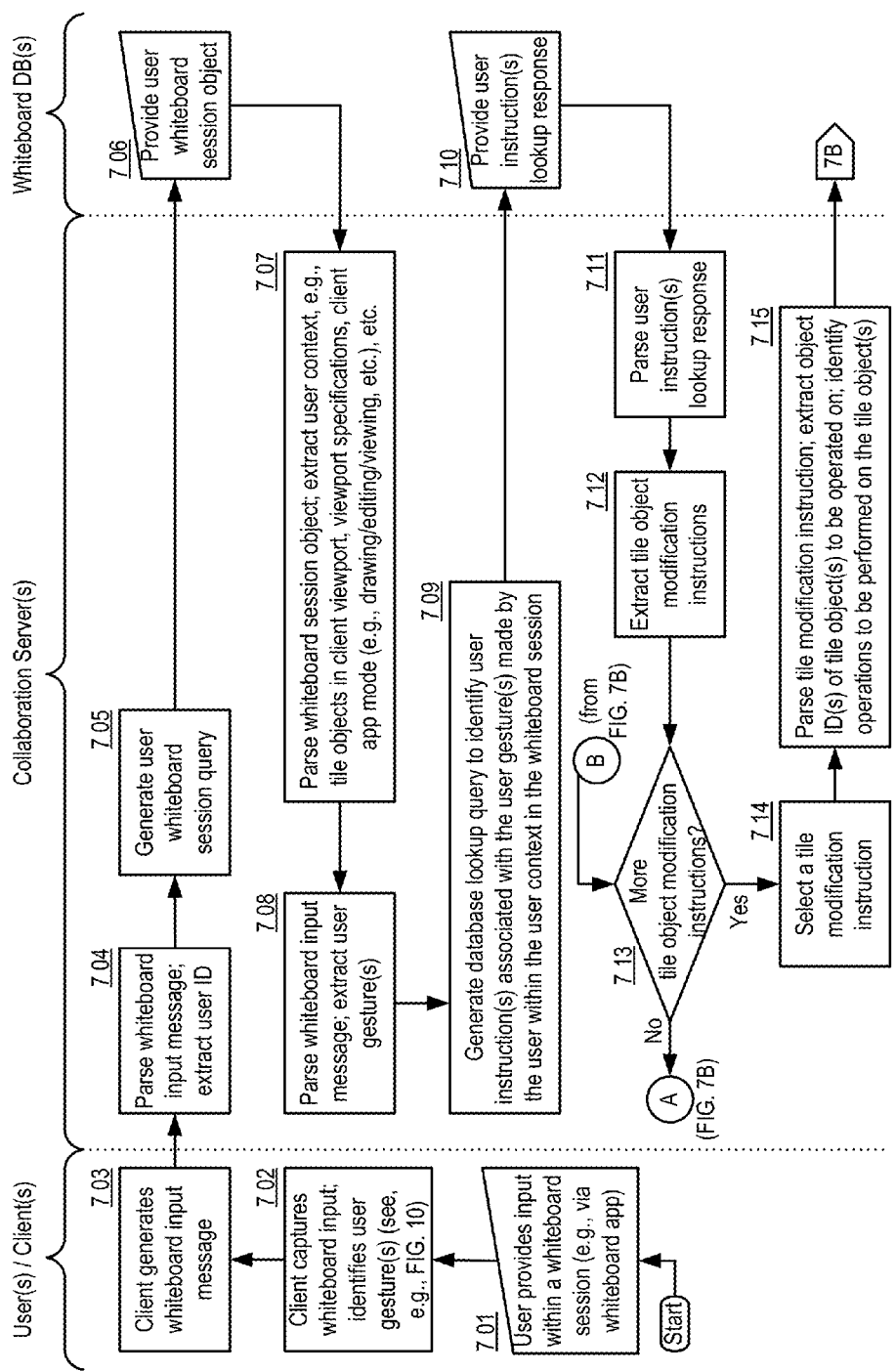
FIGS. 7A-D show logic flow diagrams illustrating example aspects of facilitating collaborative whiteboarding among a plurality of users in some embodiments of the DWC, e.g., a User Collaborative Whiteboarding ("UCW") component 700.
Figure 7B:
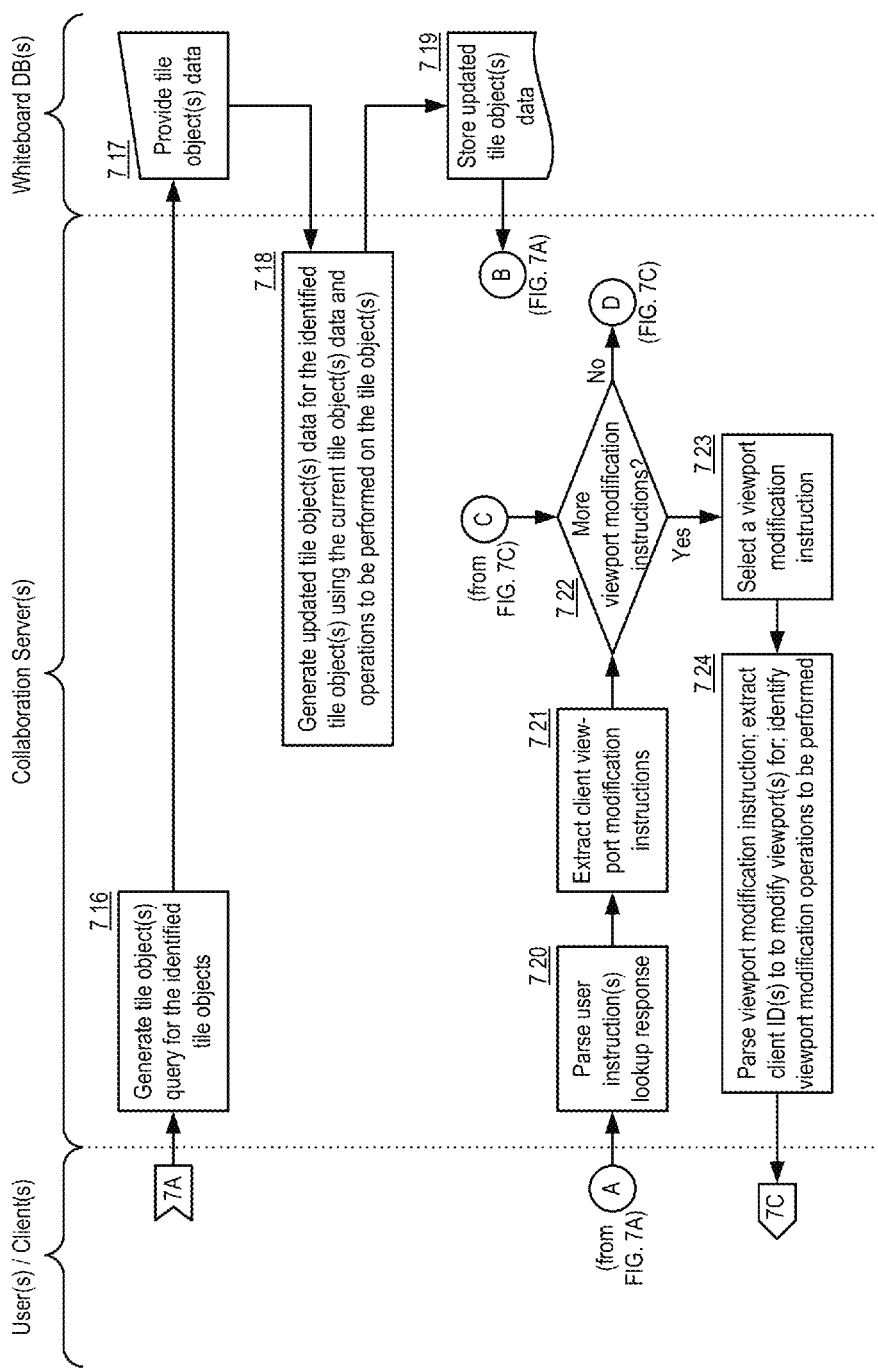
Figure 7C:
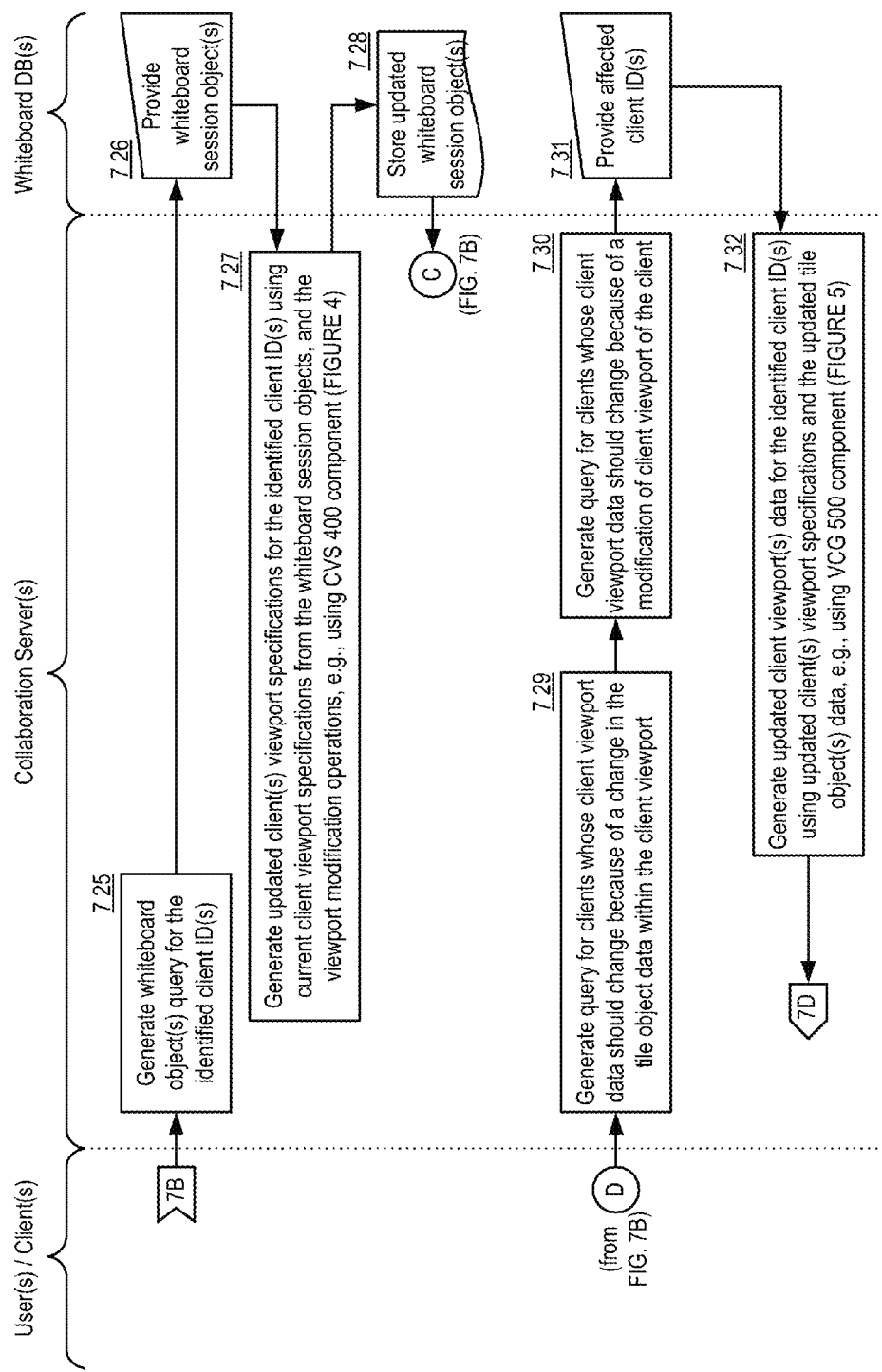
Figure 7D:
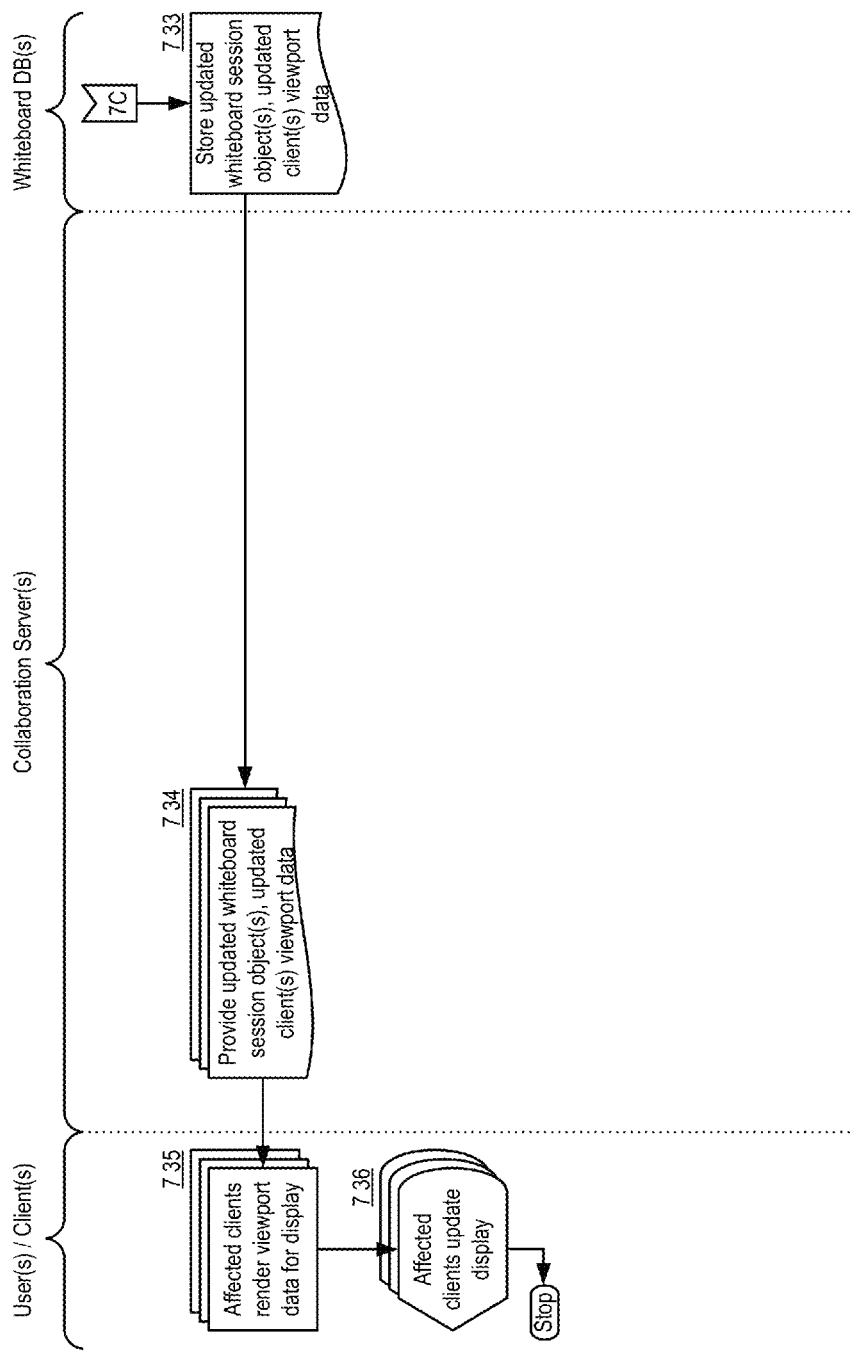
Figure 8A:
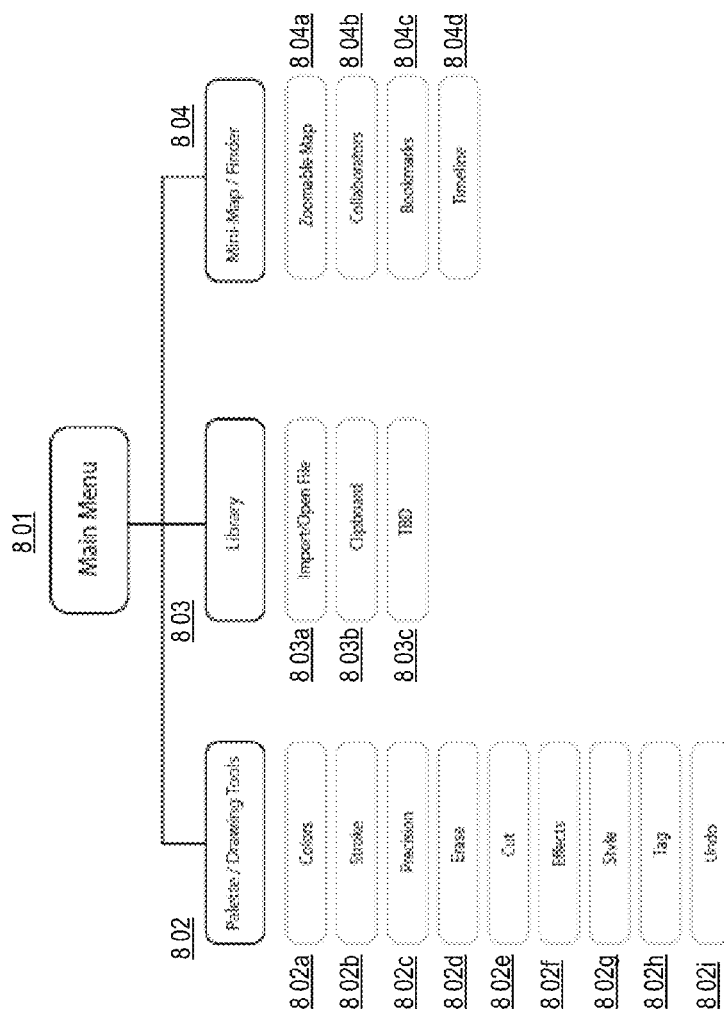
FIGS. 8A-I show block diagrams illustrating example aspects of a pie-menu user whiteboarding gesture system for digital whiteboard collaboration in some embodiments of the DWC.
Figure 8B:
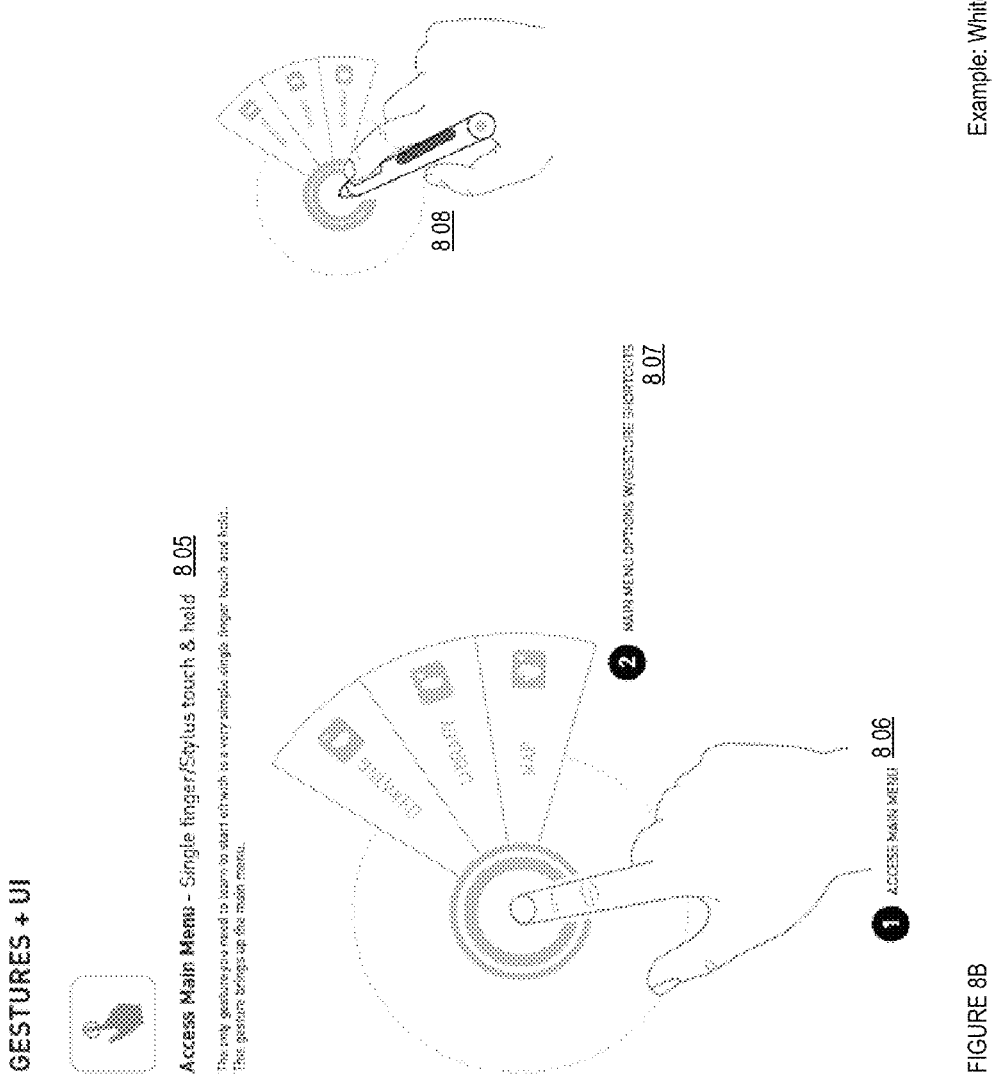
Figure 8C:
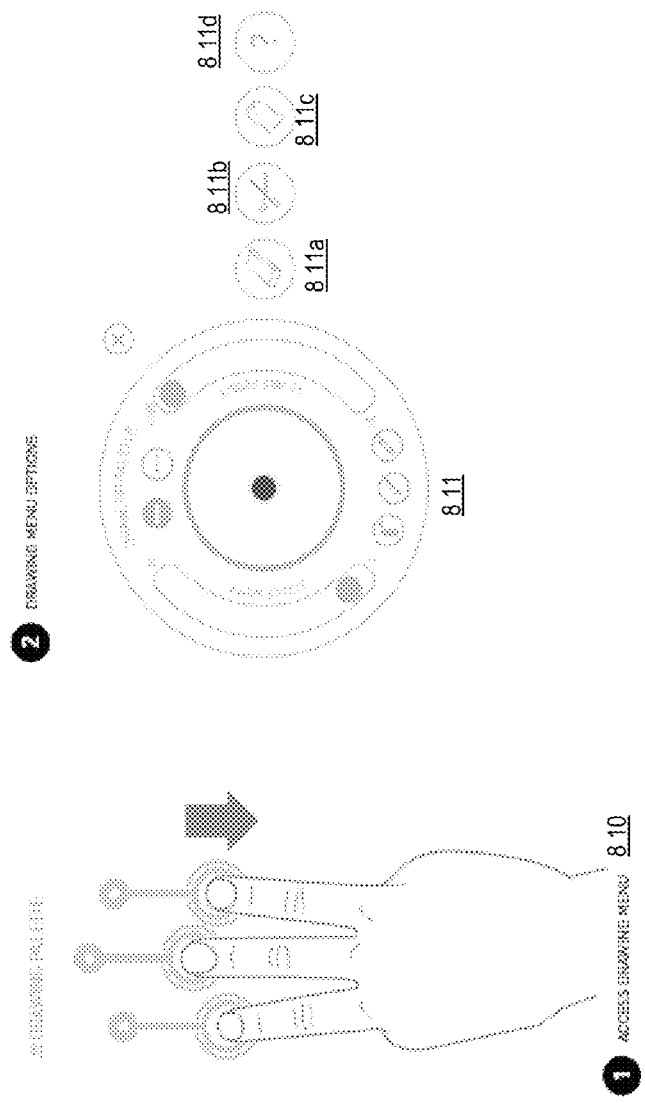
Figure 8D:
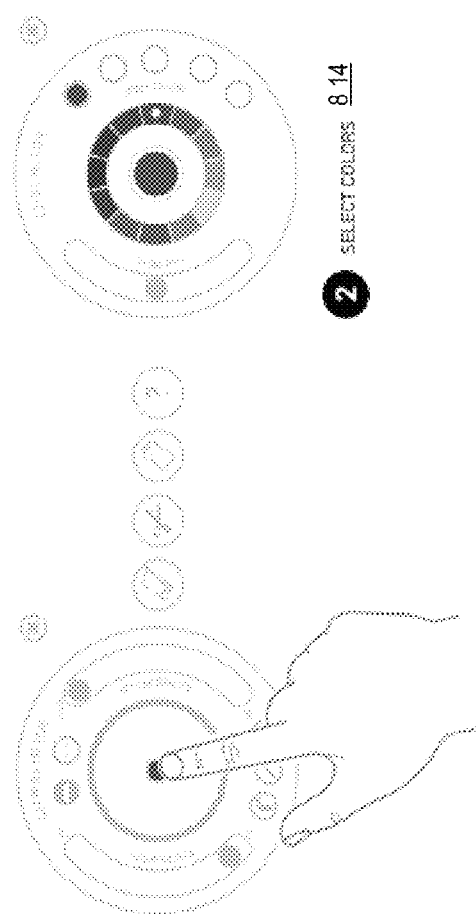
Figure 8E:
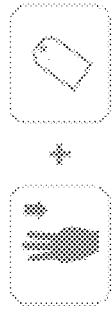
Figure 8E:
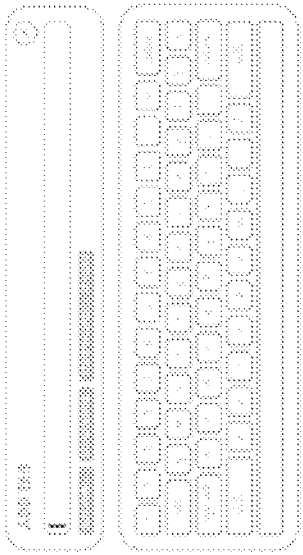
Figure 8E:
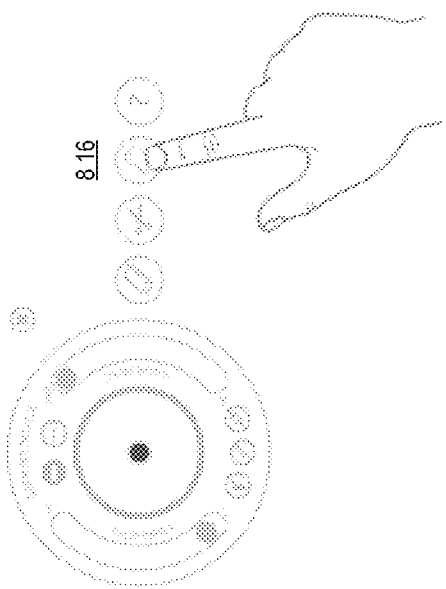
Figure 8F:
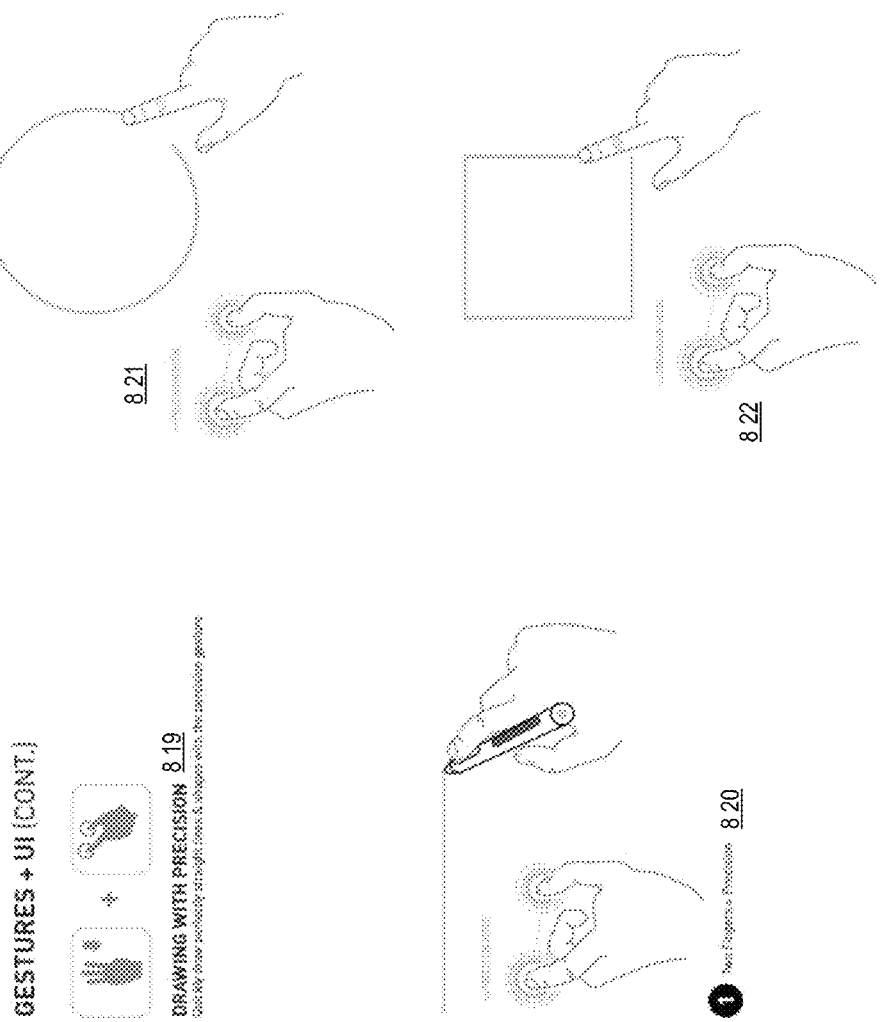
Figure 8G:
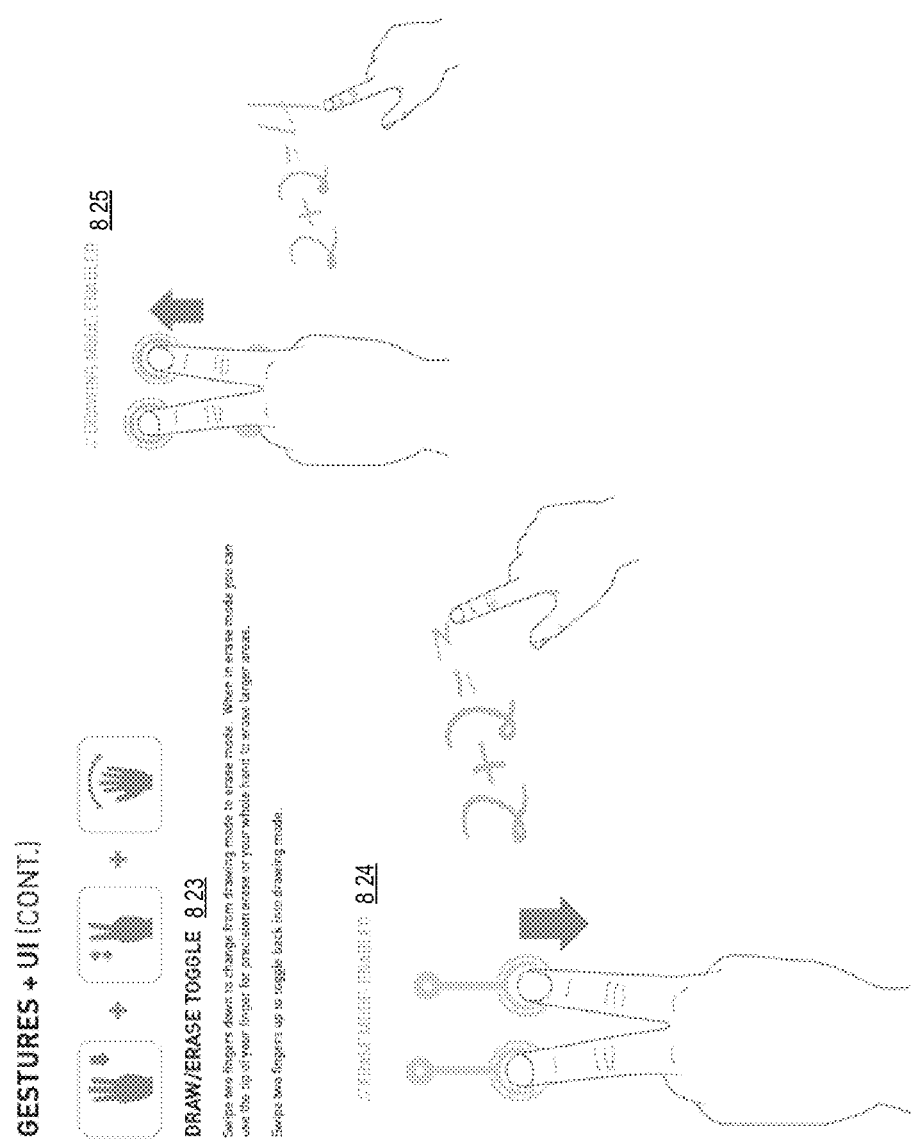
Figure 8H:
Figure 8H:
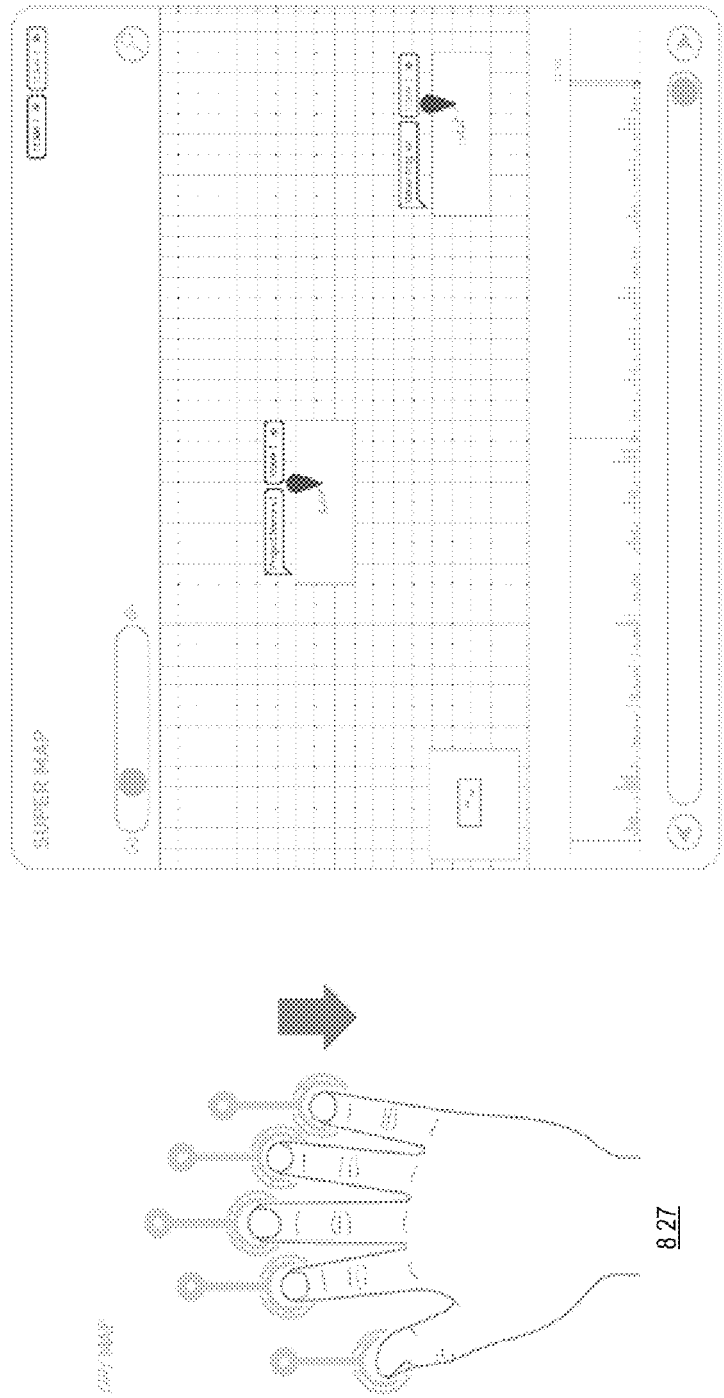
Figure 8I:
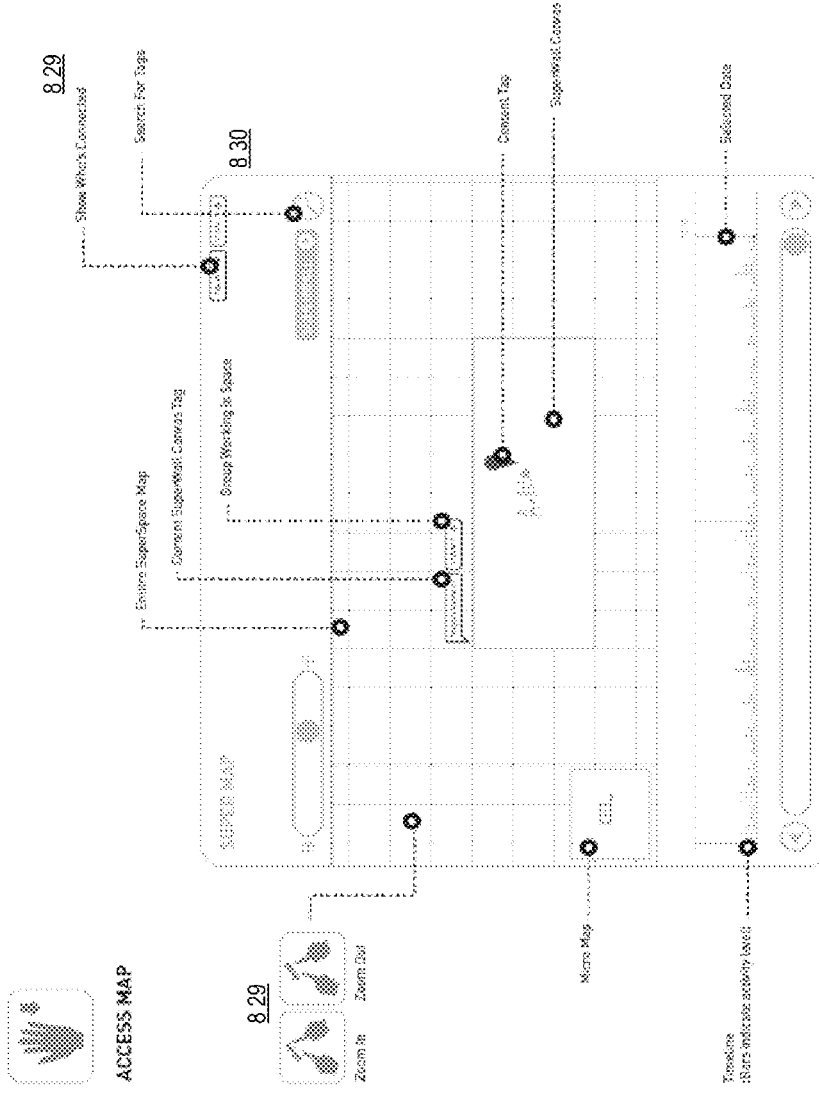

FIGS. 6A-C show data flow diagrams illustrating an example procedure to facilitate collaborative whiteboarding among a plurality of users in some embodiments of the DWC. In some implementations, a user, e.g., 601a, may desire to collaborate with other users, e.g., users 601b-c (FIG. 6C), in a collaborative whiteboarding session. For example, the user may desire to modify the contents of a digital whiteboard (e.g., one of a plurality of digital whiteboards) included within the collaborative whiteboarding session. For example, the user may utilize a client, e.g., 602a, to participate in the digital whiteboarding collaboration session. The user may provide whiteboard input, e.g., 611, into the client, indicating the user's desire to modify the collaborative whiteboarding session (e.g., modify the contents of a digital whiteboard; modify a participating client's view of a digital whiteboard, etc.). In various implementations, the whiteboard input may include, but not be limited to: keyboard entry, mouse clicks, depressing buttons on a joystick/game console, (3D; stereoscopic, time-of-flight 3D, etc.) camera recognition (e.g., motion, body, hand, limb, facial expression, gesture recognition, and/or the like), voice commands, single/multi-touch gestures on a touch-sensitive interface, touching user interface elements on a touch-sensitive display, and/or the like. For example, the user may utilize user touchscreen input gestures such as, but not limited to, the gestures depicted in FIGS. 8A-I and FIGS. 9A-C.

In some implementations, the client may capture the user's whiteboard input, e.g., 612. The client may identify the user's whiteboard input in some implementations. For example, the client may utilize a user input identification component such as the User Gesture Identification ("UGI") component 1000 described below in FIG. 10, to identify gesture(s) made by the user on a touchscreen display of the client to modify the collaborative whiteboarding session. Upon identifying the user whiteboard input, the client may generate and provide a whiteboard input message, e.g., 613, to a server, e.g., collaboration server 603. For example, the client may provide a (Secure) HyperText Transport Protocol ("HTTP(S)") POST message with an XML-encoded message body including the user whiteboard input and/or identified user gesture(s). An example of such a HTTP(S) POST message is provided below:

```
POST /session.php HTTP/1.1
Host: www.collaborate.com
Content-Type: Application/XML
Content-Length: 229
<?XML version = "1.0" encoding = "UTF-8"?>
<user_input>
    <log_id>AJFY54</log_id>
    <timestamp>2010-05-23 21:44:12</timestamp>
    <user_ID>username@appserver.com</user_ID>
    <client_IP>275.37.57.98</client_IP>
    <client_MAC>EA-44-B6-F1</client_MAC>
    <session_id>4KJFH698</session_id>
    <gestures>
        <1><id>FDKI28</id><related_text>john.q.-
        public</related_text></1>
        <2><id>DJ38FF</id><related_text>see marked
        changes</related_text></2>
    </gestures>
</user_input>
```

In some implementations, the server (e.g., collaboration server 603) may parse the user whiteboard input, and extract the user ID, client ID, and/or user gestures from the whiteboard input message, e.g., 614. Based on the extracted information, the server may generate a whiteboard session query, e.g., 615, for the gesture context, e.g., the viewport content of the client 602a being used by the user. For example, the server may query a database, e.g., whiteboard database 605, for the client viewport specifications and tile objects corresponding to the client viewport specifications. An example PHP/SQL command listing for querying a database for client viewport specifications, and tile objects data within a single tile ID, is provided below:

```
<?PHP
header('Content-Type: text/plain');
mysql_connect("254.93.179.112",$DBserver,$password); // access
database server
mysql_select_db("USERS.SQL"); // select database table to search
//create query
$query = "SELECT client_viewport_coordinates WHERE client_id
    LIKE '%' $clientID";
$result = mysql_query($query); // perform the search query
mysql_close("USERS.SQL"); // close database access
mysql_select_db("OBJECTS.SQL"); // select database table to search
//create query
$query = "SELECT object_id object_data WHERE tile_id
LIKE '%' $tileID";
$result = mysql_query($query); // perform the search query
mysql_close("OBJECTS.SQL"); // close database access
?>
```

In some implementations, the database may, in response to the whiteboard session query, provide the requested client viewport specifications and tile objects data, e.g., whiteboard session object 616. For example, the database may provide an SVG data file representing the tile objects and/or an XML data file representing the client viewport specifications.

In some implementations, the server may determine the user's intended instructions based on the user's gestures and the gesture context, e.g., as retrieved from the database. For example, the user's intended instructions may depend on the context within which the user gestures were made. For example, each user gesture may have a pre-specified meaning depending on the type of tile object upon which the user gesture was made. For example, a particular user gesture may have a pre-specified meaning depending on whether the object above which the gesture was made was a video, or a multi-page document. In some implementations, the tile object on which the gesture was made may include gesture/context interpretation instructions, which the server may utilize to determine the appropriate instructions intended by the user. In alternate implementations, the server and/or databases may have stored gesture/context interpretation instructions for each type of object (e.g., image, SVG vector image, video, remote window, etc.), and similar user instructions may be inferred from a user gesture above all objects of a certain type.

In some implementations, the server may extract the user gesture context, e.g., 617, from the user whiteboard session object. Using the gesture context (e.g., the object data), the server may query a database, e.g., gestures database 606, for user instructions lookup corresponding to the user gestures and/or user gesture context. An example PHP/SQL command listing for querying a database for user instruction lookup is provided below:

```
<?PHP
header('Content-Type: text/plain');
mysql_connect("254.93.179.112",$DBserver,$password); // access database server
mysql_select_db("GESTURES.SQL"); // select database table to search
//create query
$query = "SELECT user_instruction WHERE gesture_id LIKE '%'
    $gestureID" AND copntext LIKE '%' $user_context";
$result = mysql_query($query); // perform the search query
mysql_close("GESTURES.SQL"); // close database access
?>
```

In some implementations, the database may, in response to the user instruction lookup request, provide the requested user instruction lookup response, e.g., 619. In some implementations, the server may also query, e.g., 621, for tile objects within the client's viewport (e.g., using PHP/SQL commands similar to the examples above), and obtain, e.g., 622, from the whiteboard database 605, the tile objects data pertaining to tile objects within the viewport of the client.

In some implementations, the server may parse the user instruction lookup response and extract instructions to execute from the response. For example, the user instruction lookup response may include instructions to modify tile objects and/or instructions to modify the client viewport(s) of client(s) in the whiteboarding session. In some implementations, the server may extract tile object modification instructions, e.g., 623, and generate updated tile objects based on the existing tile object data and the extract tile object modification instructions. In some implementations, the server may parse the user instruction lookup response and extract instructions to modify the viewport of client(s). The server may generate, e.g., 624, updated client viewport specifications and/or client viewport data using the updated tile objects, existing client viewport specifications, and/or extracted client viewport modification instructions. In some implementations, e.g., where the tile objects have been modified, the server may query (e.g., via PHP/SQL commands) for clients whose viewport contents should be modified to account for the modification of the tile objects and/or client viewport specifications, e.g., 625. The server may provide, e.g., 626, the query to the whiteboard database, and obtain, e.g., 627, a list of clients whose viewport contents have been affected by the modification. In some implementations, the server may refresh the affected clients' viewports. For example, the server may generate, for each affected client, updated client viewport specifications and/or client viewport content using the (updated) client viewport specifications and/or (updated) tile objects data, e.g, 629. In some implementations, the server may store, e.g., 630-631, the updated tile objects data and/or updated client viewport specifications (e.g., via updated whiteboard session objects, updated client viewport data, etc.). In some implementations, the server may provide the (updated) whiteboard session details and/or (updated) client viewport data, e.g., 632a-c, to each of the affected client(s), e.g., 601a-c. In some implementations, the client(s) may render, e.g. 633a-c, the visualization represented in the client viewport data for display to the user, e.g., using data and/or program module(s) similar to the examples provided above with reference to FIG. 2. In some implementations, the client(s) may continuously generate new scalable vector illustrations, render them in real time, and provide the rendered output to the visual display unit, e.g. 633a-c, in order to produce continuous motion of the objects displayed on the visual display unit connected to the client.

FIGS. 7A-D show logic flow diagrams illustrating example aspects of facilitating collaborative whiteboarding among a plurality of users in some embodiments of the DWC, e.g., a User Collaborative Whiteboarding ("UCW") component 700. In some implementations, a user may desire to collaborate with other users in a collaborative whiteboarding session. For example, the user may desire to modify the contents of a digital whiteboard (e.g., one of a plurality of digital whiteboards) included within the collaborative whiteboarding session. The user may provide whiteboard input, e.g., 701, within a whiteboarding session into the client, indicating the user's desire to modify the collaborative whiteboarding session (e.g., modify the contents of a digital whiteboard; modify a participating client's view of a digital whiteboard, etc.). In some implementations, the client may capture the user's whiteboard input. The client may identify the user's whiteboard input in some implementations, e.g., 702. For example, the client may utilize a user input identification component such as the User Gesture Identification ("UGI") component 1000 described below in FIG. 10, to identify gesture(s) made by the user on a touchscreen display of the client to modify the collaborative whiteboarding session. Upon identifying the user whiteboard input, the client may generate and provide a whiteboard input message, e.g., 703, to a collaboration server.

In some implementations, the server may parse the user whiteboard input, and extract the user ID, client ID, etc. from the whiteboard input message, e.g., 704. Based on the extracted information, the server may generate a whiteboard session query, e.g., 705, for the gesture context, e.g., the viewport content of the client being used by the user. In some implementations, a database may, in response to the whiteboard session query, provide the requested client viewport specifications and tile objects data, e.g., whiteboard session object 706. For example, the database may provide an SVG data file representing the tile objects and/or an XML data file representing the client viewport specifications.

In some implementations, the server may parse the whiteboard session object, and extract user context, e.g., client viewport specifications, tile object IDs of tile objects extending into the client viewport, client app mode (e.g., drawing/editing/viewing, etc., portrait/landscape, etc.), e.g., 707. The server may parse the whiteboard session object and extract user gesture(s) made by the user into the client during the whiteboard session, e.g., 708. The server may attempt to determine the user's intended instructions based on the user's gestures and the gesture context, e.g., as retrieved from the database. For example, the user's intended instructions may depend on the context within which the user gestures were made. For example, each user gesture may have a pre-specified meaning depending on the type of tile object upon which the user gesture was made. For example, a particular user gesture may have a pre-specified meaning depending on whether the object above which the gesture was made was a video, or a multi-page document. In some implementations, the tile object on which the gesture was made may include custom object-specific gesture/context interpretation instructions, which the server may utilize to determine the appropriate instructions intended by the user. In alternate implementations, the server and/or databases may have stored system-wide gesture/context interpretation instructions for each type of object (e.g., image, SVG vector image, video, remote window, etc.), and similar user instructions may be inferred from a user gesture above all objects of a certain type.

In some implementations, the server may query a whiteboard database for user instructions lookup corresponding to the user gestures and/or user gesture context, e.g., 709. The database may, in response to the user instruction lookup request, provide the requested user instruction lookup response, e.g., 710. In some implementations, the server may also query for tile objects within the client's viewport the tile objects data pertaining to tile objects within the viewport of the client.

In some implementations, the server may parse the user instruction lookup response and extract instructions to execute from the response, e.g., 711. For example, the user instruction lookup response may include instructions to modify tile objects and/or instructions to modify the client viewport(s) of client(s) in the whiteboarding session. In some implementations, the server may extract tile object modification instructions, e.g., 712. The server may modify tile object data of the tile objects in accordance with the tile object modifications instructions. For example, the server may select a tile object modification instruction, e.g., 714. The server may parse the tile object modification instruction, and extract object IDs of the tile object(s) to be operated on, e.g., 715. Using the tile object modification instructions, the server may determine the operations to be performed on the tile object(s). In some implementations, the server may generate a query for the tile object data of the tile object(s) to be operated on, e.g., 716, and obtain the tile object data, e.g., 717, from a database. The server may generate updated tile object data for each of the tile objects operated on, using the current tile object data and the tile object modification operations from the tile modification instructions, e.g., 718. In some implementations, the server may store the updated tile object data in a database, e.g., 719. In some implementations, the server may repeat the above procedure until all tile object modification instructions have been executed, see, e.g., 713.

In some implementations, the server may parse the user instruction lookup response, e.g., 720, and extract client viewport modification instructions, e.g., 721. The server may modify client viewport specifications of the client(s) in accordance with the viewport modifications instructions. For example, the server may select a viewport instruction, e.g., 723. The server may parse the viewport modification instruction, and extract client IDs for which updated viewport specifications are to be generated, e.g., 724. Using the viewport modification instructions, the server may determine the operations to be performed on the client viewport specifications. In some implementations, the server may generate a whiteboard object query for the viewport specifications to be operated, e.g., 725, and obtain the whiteboard session object including the viewport specifications, e.g., 726, from a database. The server may generate updated client viewport specifications for each of the client viewports being operated on, using the current client viewport specifications and the viewport modification operations from the viewport modification instructions, e.g., 727. For example, the server may utilize a component such as the client viewport specification component 400 described with reference to FIG. 4. In some implementations, the server may store the updated client viewport specifications via an updated whiteboard specification object in a database, e.g., 728. In some implementations, the server may repeat the above procedure until all tile object modification instructions have been executed, see, e.g., 722.

In some implementations, e.g., where the tile objects and/or client viewport specifications have been modified, the server may query (e.g., via PHP/SQL commands) for clients whose viewport contents should be modified to account for the modification of the tile objects and/or client viewport specifications, e.g., 729-730. The server may provide the queries to the whiteboard database, and obtain, e.g., 731, a list of clients whose viewport contents have been affected by the modification. In some implementations, the server may refresh the affected clients' viewports. For example, the server may generate, e.g., 732, for each affected client, updated client viewport specifications and/or client viewport content using the (updated) client viewport specifications and/or (updated) tile objects data. For example, the server may utilize a component such as the viewport content generation component 500 described with reference to FIG. 5. In some implementations, the server may store, e.g., 733, the updated tile objects data and/or updated client viewport specifications (e.g., via updated whiteboard session objects, updated client viewport data, etc.). In some implementations, the server may provide the (updated) whiteboard session details and/or (updated) client viewport data, e.g., 734, to each of the affected client(s). In some implementations, the client(s) may render, e.g., 735, the visualization represented in the client viewport data for display to the user, e.g., using data and/or program module(s) similar to the examples provided above with reference to FIG. 2. In some implementations, the client(s) may continuously generate new scalable vector illustrations, render them in real time, and provide the rendered output to the visual display unit, e.g. 736, in order to produce continuous motion of the objects displayed on the visual display unit connected to the client.

FIGS. 8A-I show block diagrams illustrating example aspects of a pie-menu user whiteboarding gesture system for digital whiteboard collaboration in some embodiments of the DWC. In some implementations, the DWC may provide a variety of features for the user when the user provides input gestures into a client device involved in a digital collaborative whiteboarding session. For example, under a main menu 801, the DWC may provide a variety of palette/drawing tools 802, library tools 803 and/or mini-map/finder tools 804. For example, the DWC may provide a variety of palette/drawing tools, including but not limited to: colors 802*a*, stroke type 802*b*, precision drawing mode 802*c*, eraser 802*d*, cut 802*e*, effects 802*f*, styles 802*g*, tags 802*h*, undo feature 802*i*, and/or the like. As another example, the DWC may provide library tools such as, but not limited to: import/open file 803*a*, access clipboard 803*b*, and/or the like 803*c*. As another example, the DWC may provide mini-map/finder tools such as, but not limited to: zoom 804*a*, collaborators 804*b*, bookmarks 804*c*, timeline view 804*d*, and/or the like.

In some implementations, a user may access a main menu by pressing the touchscreen with a single finger, e.g., 805. In some implementations, a menu, such a pie menu, e.g., 807, may be provided for the user when the user attempts to access the main menu by pressing a single finger on the touchscreen, e.g., 806. In some implementations, the user may press a stylus against the touchscreen, e.g., 808. In some implementations, the menu options provided to the user may vary depending on whether the uses a single finger touch or a single stylus touch.

In some implementations, a user may access a drawing menu by swiping down on the touchscreen with three fingers, e.g., 809. In some implementations, a menu, such a drawing menu, e.g., 811, may be provided for the user when the user attempts to access the drawing menu by swiping three fingers on the touchscreen, e.g., 810. In some implementations, a drawing palette may include a variety of tools. For example, the drawing palette may include a drawing tool selector, e.g., 811, for selecting tools from a drawing palette. In some implementations, a variety of commonly used drawing tools may be provided separately for the user to easily access. For example, an eraser tool, 811*a*, cut tool 811*b*, tag tool 811*c*, help tool 811*d*, and/or the like may be provided as separate user interface objects for the user to access.

In some implementations, a user may select a color from a color picker tool within the drawing palette menu. For example, the user may swipe three fingers on the touchscreen to obtain the drawing palette, e.g., 812. From the drawing palette, the user may select a color picker by tapping on an active color picker, e.g., 813. Upon tapping the color picker, a color picker menu, e.g., 814 may be provided for the user via the user interface.

In some implementations, a user may tag an object within the digital whiteboard, e.g., 815. For example, within the drawing palette, the user may tap on a user interface element, e.g., 816. In response, the user may be provided with a virtual keyboard 818, as well as a virtual entry form 817 for the user to type a tag into via the virtual keyboard.

In some implementations, a user may enter into a precision drawing mode, wherein the user may be able to accurately place/draw tile objects. For example, the user may place two fingers on the touchscreen and hold the finger positions. For the duration that the user holds the two-finger precision drawing gesture, the user may be provided with precision drawing capabilities. For example, the user may be able to precisely draw a line to the length, orientation and placement of the user's choosing, e.g., 820. Similarly, using other drawing tools, the user may be able to draw precise circles, e.g., 821, rectangles, e.g., 822, and/or the like. In general, it is contemplated the precision of any drawing tool provided may be enhanced by entering into the precision drawings mode by using the two-finger hold gesture.

In some implementations, a user may be able to toggle between an erase and draw mode using a two-finger swipe. For example, if the user swipes downwards, an erase mode may be enabled, e.g., 824, while if the user swipes upwards, the draw mode may be enabled, e.g., 825.

In some implementations, a user may be able to an overall map of the whiteboard by swiping all five fingers down simultaneously, e.g., 826. Upon performing a five-finger swipe, e.g., 827, a map of the digital whiteboard, e.g., 828, may be provided for the user. In some implementations, the user may be able to zoom in or zoom out of a portion of the digital whiteboard by using two fingers, and moving the two fingers either together (e.g., zoom out) or away from each other (e.g., zoom in), see, e.g., 829. In such an access map mode, a variety of features and/or information may be provided for the user. For example, the user may be provided with a micromap, which may provide an indication of the location of the user's client viewport relative to the rest of the digital whiteboard. The user may be provided with information on other users connected to the whiteboarding session, objects within the whiteboard, tags providing information on owners of objects in the whiteboard, etc., a timeline of activity showing the amount of activity as a function of time, and/or the like information and/or features.

Figure 9A:
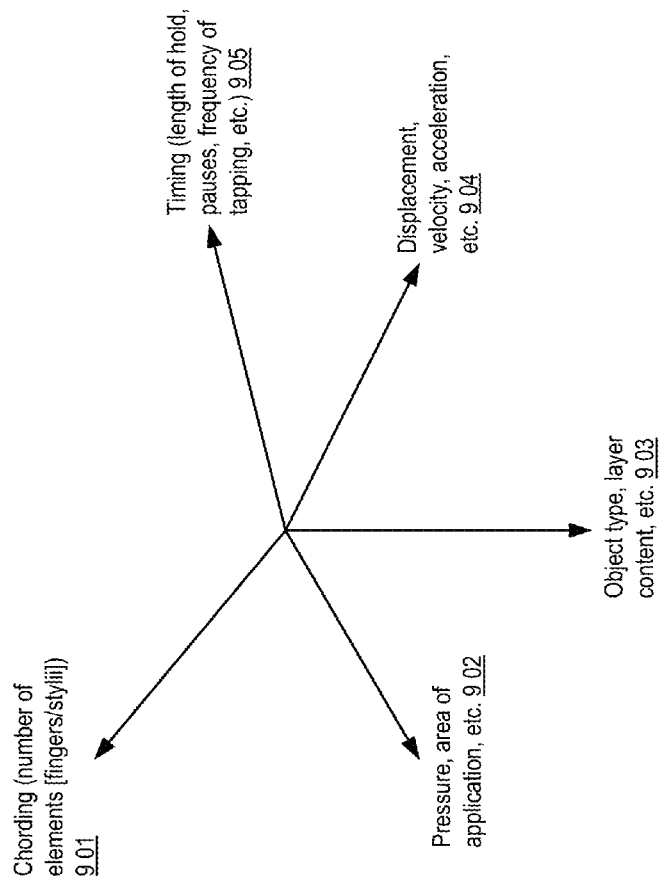
FIGS. 9A-C show block diagrams illustrating example aspects of a chord-based user whiteboarding gesture system for digital whiteboard collaboration in some embodiments of the DWC.
Figure 9B:
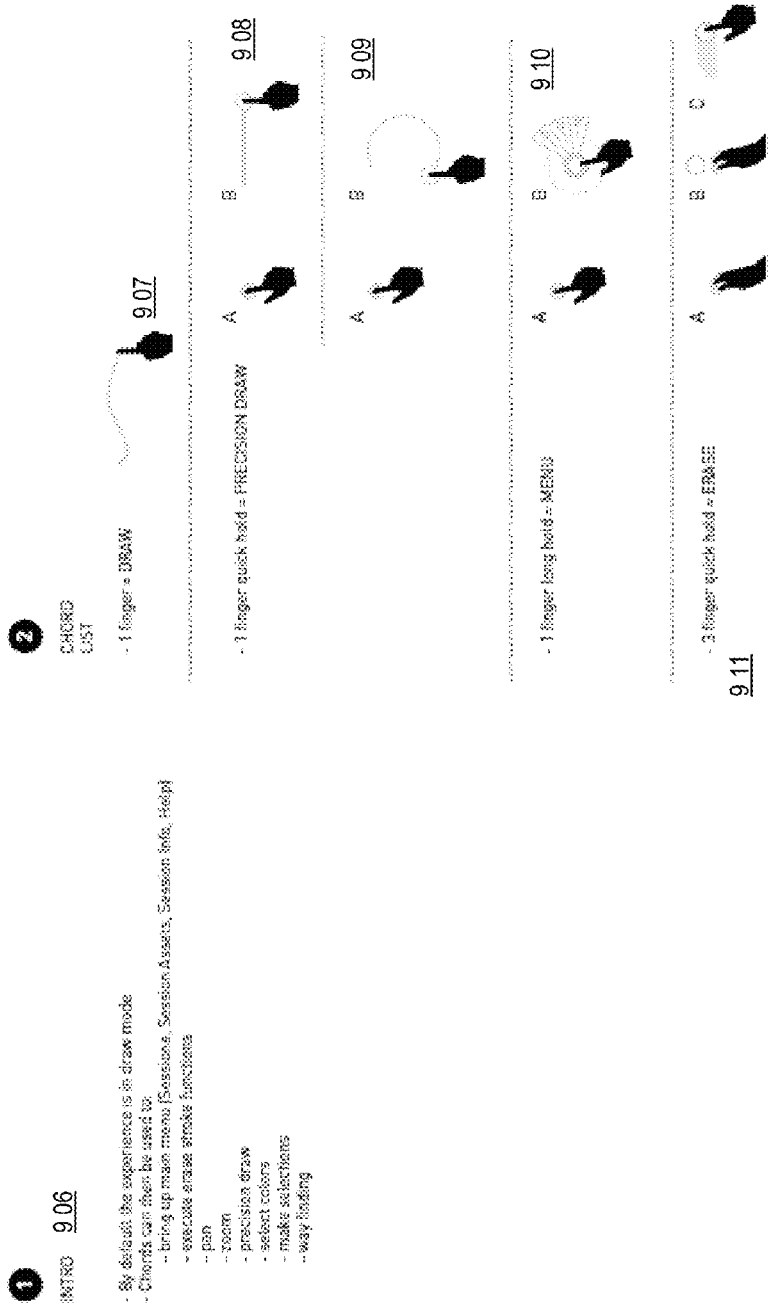
Figure 9C:
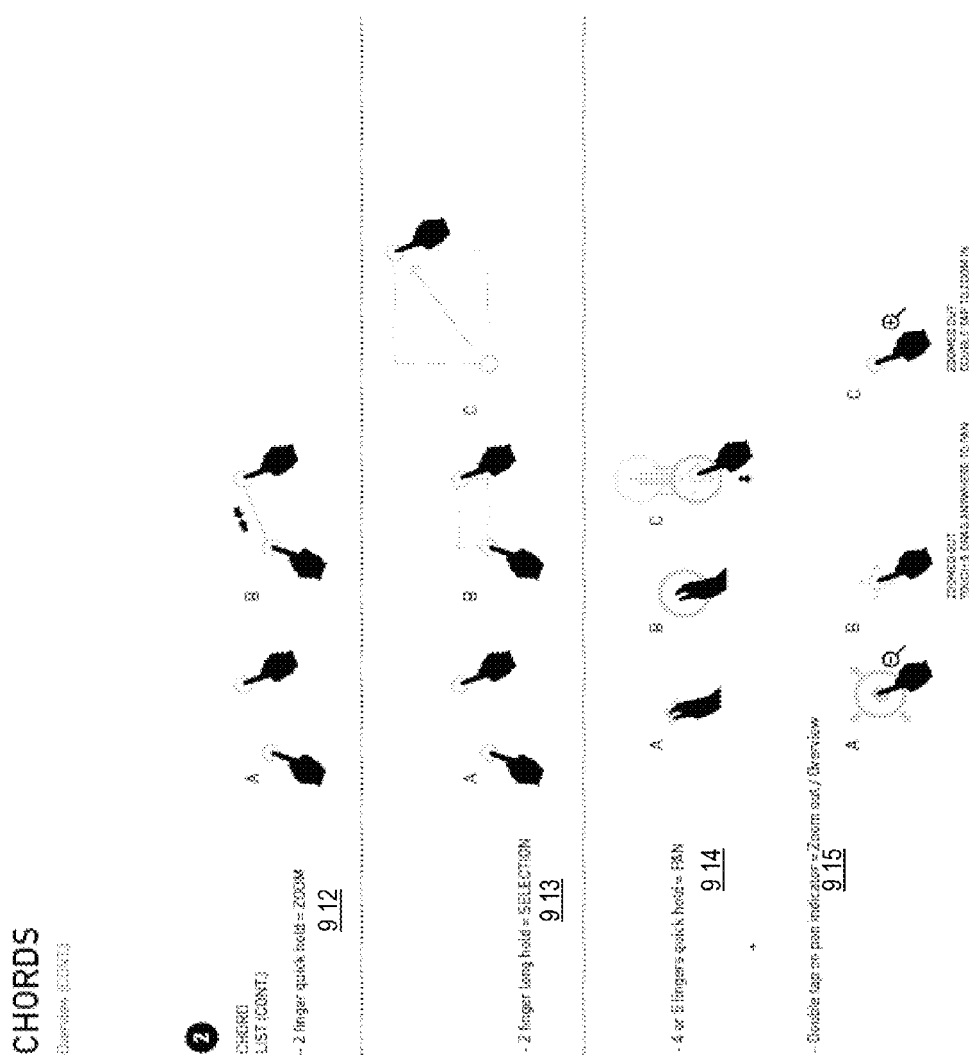

FIGS. 9A-C show block diagrams illustrating example aspects of a chord-based user whiteboarding gesture system for digital whiteboard collaboration in some embodiments of the DWC. With reference to FIG. 9A, in some implementations, a chord-based gesture system may utilize a number of variables to determine the meaning of a user gesture, e.g., the intentions of a user to instruct the DWC. For example, variables such as, but not limited to: number of fingers/styli inputs in the chord 901, pressure and area of application of pressure on each chord element 902, contextual information about the object underneath the chord 903, displacement, velocity, direction of the chord movement 904, timing associated with the chord (e.g., length of hold, pause, frequency/duty cycle of tapping, etc.), and/or the like, may affect the interpretation of what instructions are intended by a gesture made by the user. For example, with reference to FIG. 9B, chords of various types may be utilized to obtain menus, perform drawing, editing, erasing features, modify the view of the client, find editing collaborators, and/or the like, see, e.g., 906. For example, displacing a single finger of an empty portion of the screen may automatically result in a draw mode, and a line may be drawn on the screen following the path of the single finger, e.g., 907. As another example, holding a finger down and releasing quickly may provide a precision drawing mode, wherein when a finger is drawn along the screen, a line ma be drawn with high precision following the path of the finger, e.g., 908-909. As another example, holding a finger down and releasing after a longer time may provide menu instead of a precision drawing mode, e.g., 910. As another example, when three fingers are placed on the screen in the vicinity of each other, an eraser tool may be provided underneath the position of the three-finger chord. When the three-finger chord is displaced, an eraser tool may also be displaced underneath the chord, thus erasing (portion of) objects over which the chord is passed by the user, e.g., 911. As another example, with reference to FIG. 9C, when two fingers as held down and quickly released, a zoom tool may be provided for the user. The user may then place two fingers down on the screen, and move the fingers together or away from each other to zoom out or zoom in respectively, e.g., 912. As another example, when two fingers are placed down and held for a longer period of time, this may provide the user with a tool to select an object on the screen, and modify the object (e.g., modify the scale, aspect ratio, etc. of the object), e.g., 913. As another example, when four or five fingers are placed down on the screen and quickly released, the user may be provided with a pan function, e.g., 914. As another example, when a user double-taps on a pan indicator, the user may be provided with a zoon and/or overview selection user interface element, e.g., 915. As the example above describe, various gesture features may be provided depending on the attributes of the chord, including, but not limited to: the number of chord elements, timing of the chord elements, pressure/area of the chord elements, displacement/velocity/acceleration/orientation of the chord elements, and/or the like.

Figure 10:
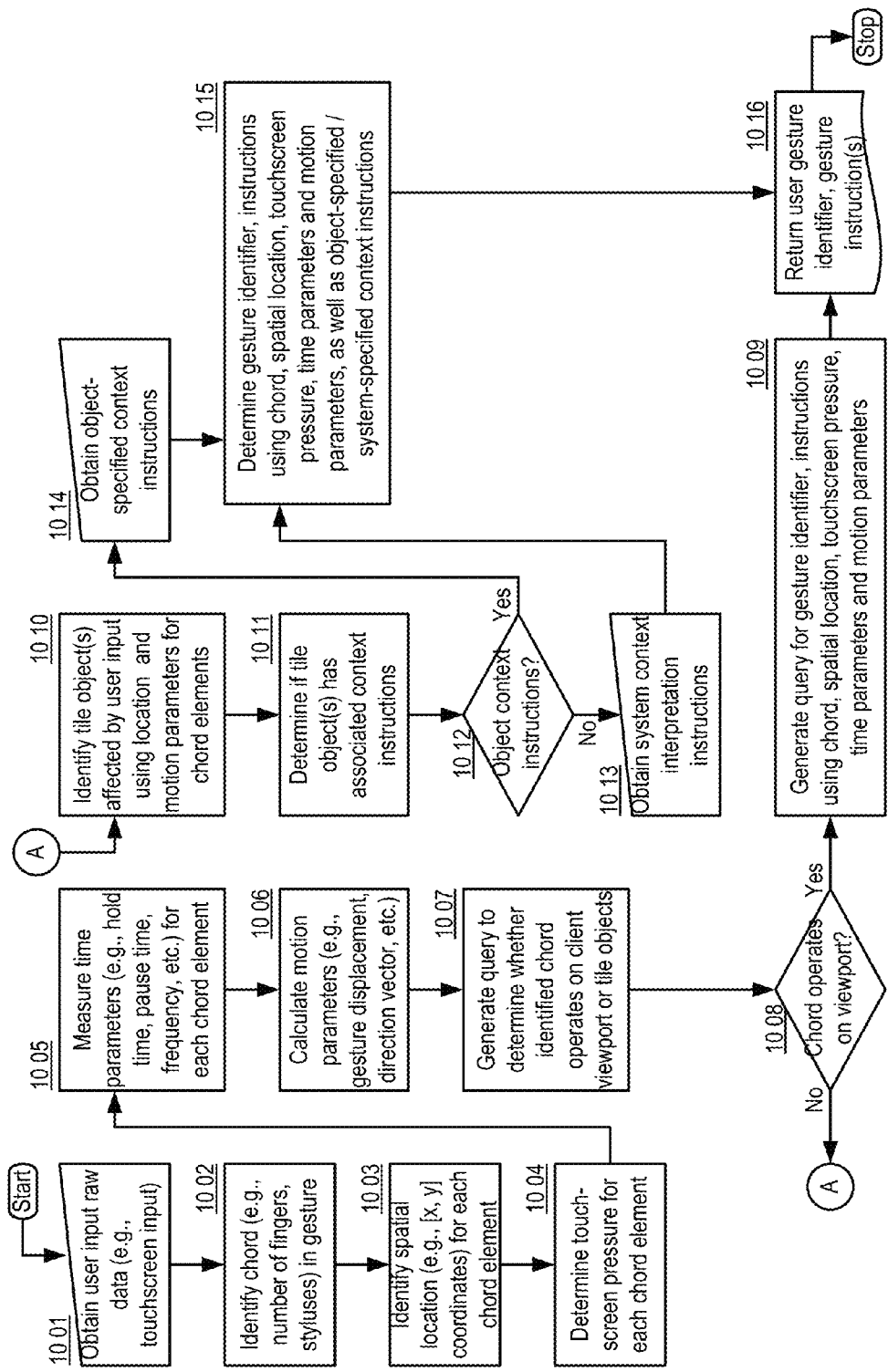
FIG. 10 shows a logic flow diagram illustrating example aspects of identifying user gestures of a whiteboarding session collaborator in some embodiments of the DWC, e.g., a User Gesture Identification ("UGI") component 1000.

FIG. 10 shows a logic flow diagram illustrating example aspects of identifying user gestures of a whiteboarding session collaborator in some embodiments of the DWC, e.g., a User Gesture Identification ("UGI") component 1000. In some implementations, a user may provide input (e.g., one of more touchscreen gestures) into a client, e.g., 1001. The client may obtain the user input raw data, and identify a chord based on the raw data. For example, the client may determine the number of fingers pressed onto the touchscreen, whether a stylus was incorporated in the user touch raw data, which fingers of the user were pressed onto the touchscreen, and/or the like, e.g., 1002. The client may determine the spatial coordinates of each of the chord elements (e.g., wherein each simultaneous finger/stylus touch is a chord element of the chord comprised of the finger/stylus touches), e.g., 1003. For example, the client may determine the [x,y] coordinates for each chord element. In some implementations, the client may determine the touch screen pressure for each chord element, area of contact for each chord element (e.g., which may also be used to determine whether a chord element is a finger or a stylus touch, etc.), e.g., 1004. In some implementations, the client may determine time parameters for each chord element of the chord, e.g., 1005. For example, the client may determine such parameters such as hold duration, touch frequency, touch interval, pause time, etc. for each chord element of the chord and/or an average time for each such parameter for the entire chord. In some implementations, the client may determine motion parameters for each chord element of the chord, e.g., 1006. For example, the client may determine displacement, direction vector, acceleration, velocity, etc. for each chord element of the chord. Based on the chord, the client may determine whether the chord gesture is for modifying a client view, or for modifying a tile object present in a digital whiteboard. In some implementations, the client may generate a query (e.g., of a database stored in the client's memory) to determine whether the identified chord operates on the client viewport or tile objects. If the client determines that the chord operates on a viewport, e.g., 1008, option "Yes," the client may generate a query for a gesture identifier, and associated instructions using the chord, spatial location, touchscreen pressure, time parameters, motion parameters, and/or the like. If the client determines that the chord operates on tile object(s), e.g., 1008, option "No," the client may identify the tile object(s) affected by the user input using the location and motion parameters for the chord elements, e.g., 1010. The client may determine whether the tile object(s) has any associated context/gesture interpretation instructions/data, e.g., loll. If the object does not have custom context instructions, e.g., 1012, option "No," the client may utilize system-wide context interpretation instructions based on the object type of the tile object, e.g., 1013. If the object has custom context instructions, e.g., 1012, option "Yes," the client may obtain the customer object-specific context interpretation instructions, e.g., 1014. In some implementations, the client may determine the gesture identifier and associated instructions using the chord, spatial location, touchscreen pressure, time parameters and motion parameters, as well as object/system-specified context interpretation instructions, e.g., 1015, and may return the user gesture identifier and associated gesture instructions, e.g., 1016. It is to be understood that any of the actions recited above may be performed by the client and/or any other entity and/or component of the DWC.

Figure 11A:
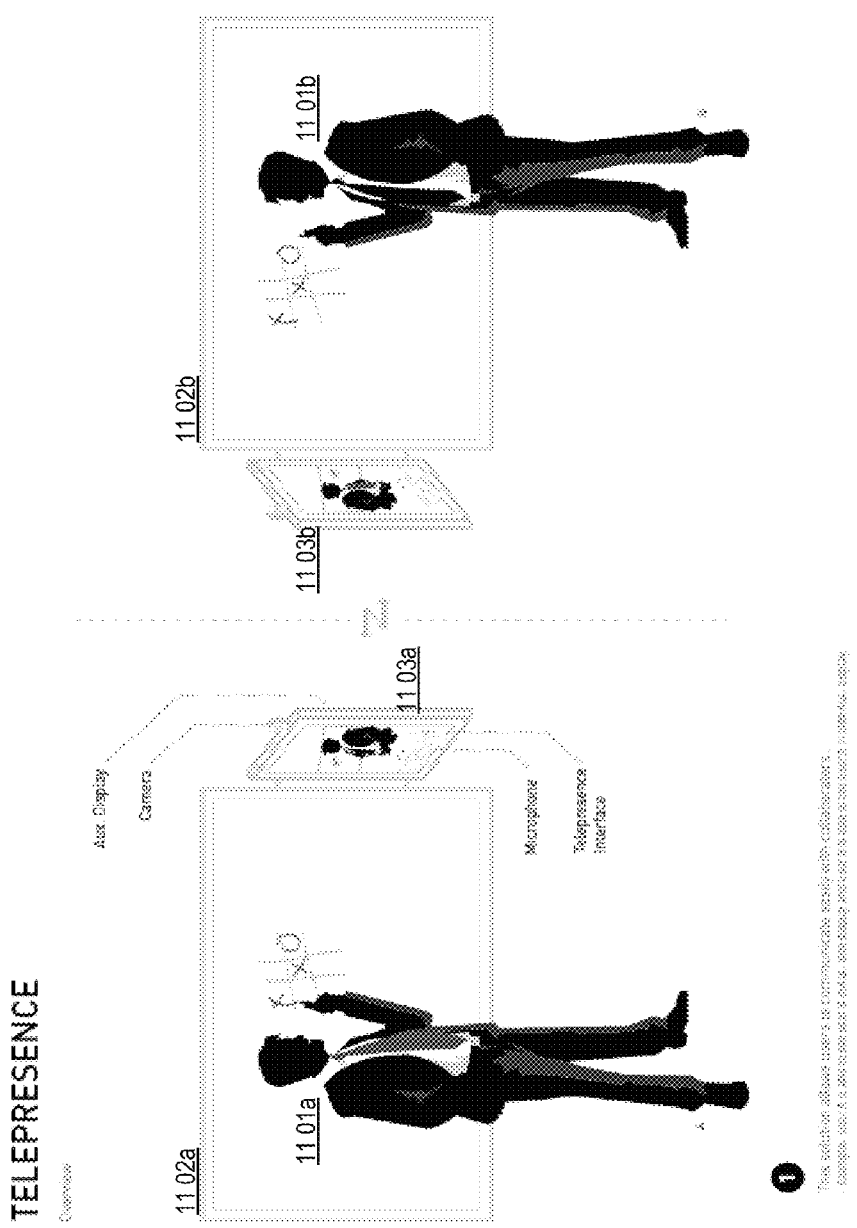
FIGS. 11A-B show block diagrams illustrating example aspects of a whiteboarding telepresence system for digital whiteboard collaboration in some embodiments of the DWC.
Figure 11B:
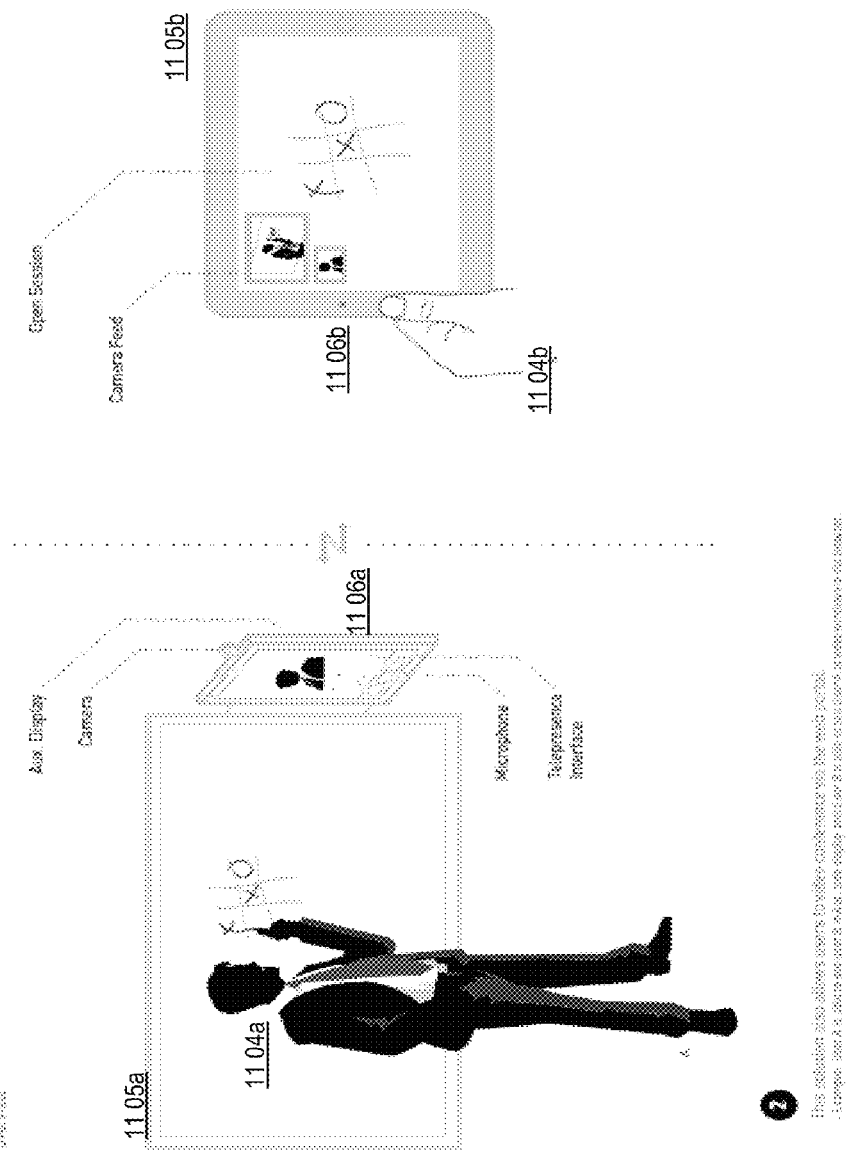

FIGS. 11A-B show block diagrams illustrating example aspects of a whiteboarding telepresence system for digital whiteboard collaboration in some embodiments of the DWC. In some implementations, a plurality of users may be collaborating with each other, for example, via a digital whiteboard collaboration system as described above. In some implementations, the users may be interacting with each other via other communication and/or collaboration systems. In some implementations, a user, e.g., 1101a, may desire to visually communicate with another user, e.g., 1101b. The user 1101a may be utilizing a touchscreen interface, e.g., 1102a, and user 1101b may be utilizing touchscreen interface 1102b. For example, the touchscreen interfaces may be operating ion conjunction with other DWC components to provide a digital whiteboard collaboration experience for the users. In some implementations, the user may utilize a telepresence system, e.g., 1103a-b, to enhance the collaborative session between the users. For example, a user 1101a may be able to visualize 1101b via the telepresence system. The user 1101a may be able to hear (e.g., via a speaker system) and see (e.g., via auxiliary display) user 1101b. The user 1101a may also be able to speak to user 1101b via a microphone, and may be able to provide a video of himself (e.g., via a camera). Similarly, user 1101b may be able to see and hear user 1101, and provide audio and video to user 1101a via user 1101b's telepresence interface.

In some implementations, users utilizing different types of device may interactively collaborate via a telepresence system. For example, with reference to FIG. 11B, user 1104a may be utilizing a large-screen touch interface, e.g., 1105a, while a user 1104b may be utilizing a portable device, e.g., 1105b. In such implementations, the user interface of the collaborative session, as well as the telepresence system, may be modified according to the device being used by the user in the collaborative session. For example, the user 1104a, utilizing the large-screen touch interface 1105a, may be utilizing an auxiliary telepresence system 1106a. The user 1104b may, however, be utilizing a telepresence system inbuilt into the device, e.g., 1106b. Accordingly, in some implementations, the users may interact with each other via telepresence for collaborative editing across a variety of user devices.

DWC Controller

Figure 12:
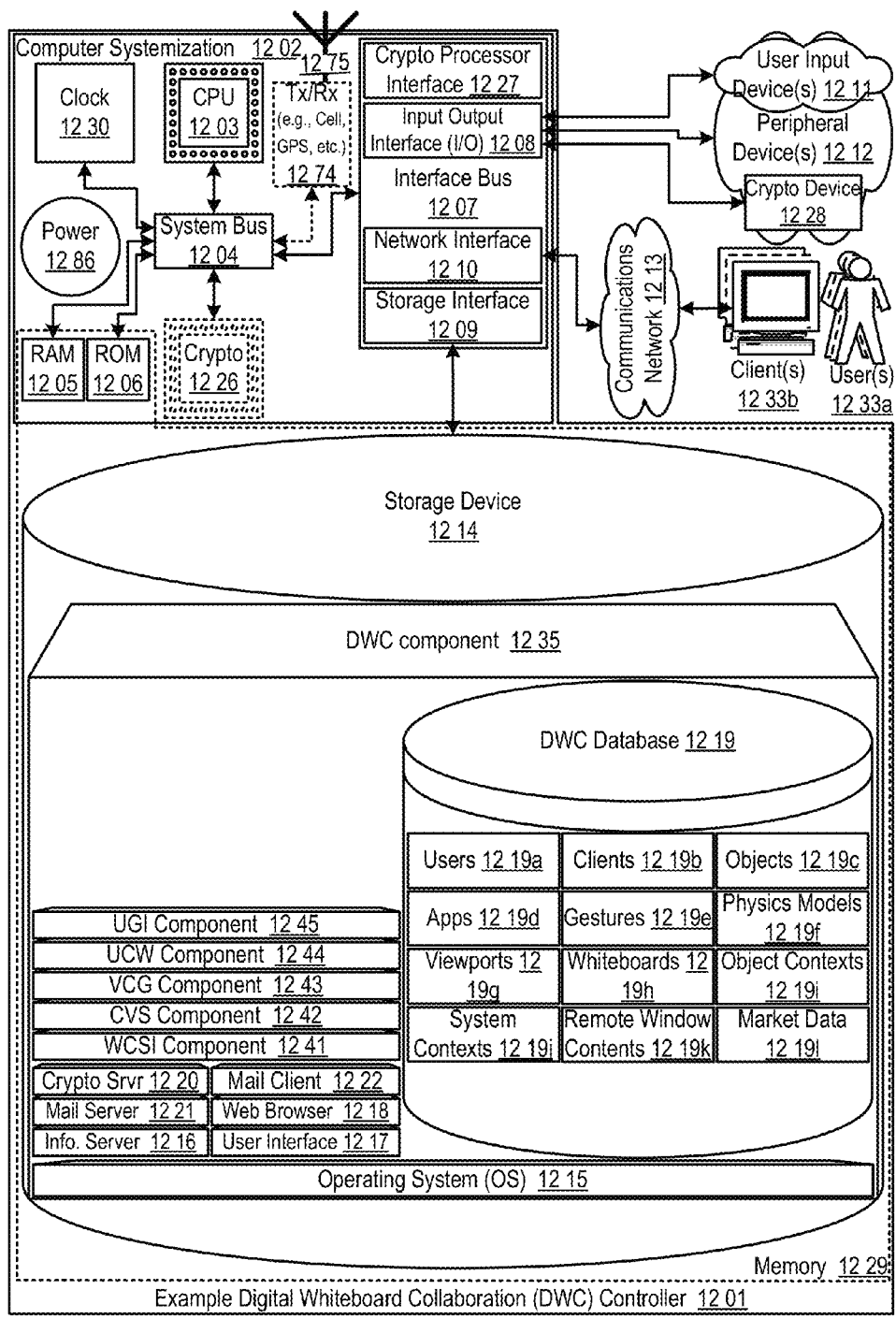
FIG. 12 shows a block diagram illustrating embodiments of a DWC controller.

FIG. 12 shows a block diagram illustrating example aspects of a DWC controller 1201. In this embodiment, the DWC controller 1201 may serve to aggregate, process, store, search, serve, identify, instruct, generate, match, and/or facilitate interactions with a computer through various technologies, and/or other related data.

Users, e.g., 1233a, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DWC controller 1201 may be connected to and/or communicate with entities such as, but not limited to: one or more users from user input devices 1211; peripheral devices 1212; an optional cryptographic processor device 1228; and/or a communications network 1213. For example, the DWC controller 1201 may be connected to and/or communicate with users, e.g., 1233a, operating client device(s), e.g., 1233b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DWC controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)" and/or "processor(s)" (these terms are used interchangeably throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 and/or transceivers (e.g., ICs) 1274 may be connected to the system bus. In another embodiment, the cryptographic processor and/or transceivers may be connected as either internal and/or external peripheral devices 1212 via the interface bus I/O. In turn, the transceivers may be connected to antenna(s) 1275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DWC controller to determine its location)); Broadcom BCM4329FKUBG transceiver chip (e.g., providing 802.11n, Bluetooth 2.1+ EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA (2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the DWC controller and beyond through various interfaces. Should processing requirements dictate a greater amount speed and/or capacity, distributed processors (e.g., Distributed DWC), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the DWC may be achieved by implementing a microcontroller such as CAST's R8051XC2 microcontroller; Intel's MCS 51 (i.e., 8051 microcontroller); and/or the like. Also, to implement certain features of the DWC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DWC component collection (distributed or otherwise) and/or features may be implemented via the microprocessor and/or via embedded components; e.g., via ASIC, coprocessor, DSP, FPGA, and/or the like. Alternately, some implementations of the DWC may be implemented with embedded components that are configured and used to achieve a variety of features or signal processing.

Depending on the particular implementation, the embedded components may include software solutions, hardware solutions, and/or some combination of both hardware/software solutions. For example, DWC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DWC features. A hierarchy of programmable interconnects allow logic blocks to be interconnected as needed by the DWC system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the DWC may be developed on regular FPGAs and then migrated into a fixed version that more resembles ASIC implementations. Alternate or coordinating implementations may migrate DWC controller features to a final ASIC instead of or in addition to FPGAs. Depending on the implementation all of the aforementioned embedded components and microprocessors may be considered the "CPU" and/or "processor" for the DWC.

Power Source

The power source 1286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the DWC thereby providing an electric current to all the interconnected components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, frequently, although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 1210 may accept, communicate, and/or connect to a communications network 1213. Through a communications network 1213, the DWC controller is accessible through remote clients 1233b (e.g., computers with web browsers) by users 1233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DWC), architectures may similarly be employed to pool, load balance, and/or otherwise increase the communicative bandwidth required by the DWC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user input devices 1211, peripheral devices 1212, cryptographic processor devices 1228, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 1211 often are a type of peripheral device 1212 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the DWC controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1228), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the DWC controller may be embodied as an embedded, dedicated, and/or monitor-less (i.e., headless) device, wherein access would be provided over a network interface connection.

Cryptographic units such as, but not limited to, microcontrollers, processors 1226, interfaces 1227, and/or devices 1228 may be attached, and/or communicate with the DWC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the DWC controller and/or a computer systemization may employ various forms of memory 1229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1229 may include ROM 1206, RAM 1205, and a storage device 1214. A storage device 1214 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the DWC component(s) 1235; and/or the like (i.e., collectively a component collection). These components may be stored and accessed from the storage devices and/or from storage devices accessible through an interface bus. Although non-conventional program components such as those in the component collection may be stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the DWC controller. The operating system may facilitate access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DWC controller to communicate with other entities through a communications network 1213. Various communication protocols may be used by the DWC controller as a subcarrier transport mechanism for interaction, such as, but not limited to: multicast, TCP/IP, UDP, unicast, and/or the like.

Information Server

An information server component 1216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DWC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DWC database 1219, operating systems, other program components, user interfaces, Web browsers, and/or the like.

Access to the DWC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DWC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DWC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/ 21 Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the DWC equipped nodes. The combined application may be nugatory on systems employing standard Web browsers.

Mail Server

A mail server component 1221 is a stored program component that is executed by a CPU 1203. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/ or to the DWC.

Access to the DWC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DWC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DWC component to engage in secure transactions if so desired. The cryptographic component facilitates the secure accessing of resources on the DWC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DWC Database

The DWC database component 1219 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DWC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DWC database is implemented as a data-structure, the use of the DWC database 1219 may be integrated into another component such as the DWC component 1235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1219 includes several tables 1219a-1. A Users table 1219a may include fields such as, but not limited to: user ID, first_name, last_name, middle_name, suffix, prefix, device_ID_list, device_name_list, device_type_list, hardware_configuration_list, software_apps_list, device_IP_list, device_MAC_list, device_preferences_list, and/or the like. The Users table may support and/or track multiple entity accounts on a DWC. A Clients table 1219b may include fields such as, but not limited to: device_ID_list, device_name_list, device_type_list, hardware_configuration_list, software_apps_list, device_IP_list, device_MAC_list, device_preferences_list, and/or the like. A Objects table 1219c may include fields such as, but not limited to: size_pixels, resolution, scaling, x_position, y_position, height, width, shadow_flag, 3D_effect_flag, alpha, brightness, contrast, saturation, gamma, transparency, overlap, boundary_margin, rotation_angle, revolution_angle, and/or the like. An Apps table 1219d may include fields such as, but not limited to: app_name, app_id, app_version, app_software_requirements_list, app_hardware_requirements_list, and/or the like. A Gestures table 1219e may include fields such as, but not limited to: gesture_name, gesture_type, assoc_code_module, num_users, num_inputs, velocity_threshold_list, acceleration_threshold_list, pressure_threshold_list, and/or the like. A Physics Models table 1219f may include fields such as, but not limited to: acceleration, velocity, direction_x, direction_y, orientation_theta, orientation_phi, object_mass, friction_coefficient_x, friction_coefficient_y, friction_coefficient_theta, friction_coefficient_phi, object_elasticity, restitution_percent, terminal_velocity, center_of_mass, moment_inertia, relativistic_flag, newtonian_flag, collision_type, dissipation_factor, and/or the like. A Viewports table 1219g may include fields such as, but not limited to: user_id, client_id, viewport_shape, viewport_x, viewport_y, viewport_size_list, and/or the like. A Whiteboards table 1219h may include fields such as, but not limited to: whiteboard_id, whiteboard_name, whiteboard_team_list, whiteboard_directory, and/or the like. An Object Contexts table 1219i may include fields such as, but not limited to: object_id, object_type, system_settings_flag, object_menu_XML, and/or the like. A System Contexts table 1219j may include fields such as, but not limited to: object_type, system_settings_flag, system_menu_XML, and/or the like. A Remote Window Contents table 1219k may include fields such as, but not limited to: window_id, window_link, window_refresh_trigger, and/or the like. A Market Data table 1219l may include fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the DWC database may interact with other database systems. For example, employing a distributed database system, queries and data access by search DWC component may treat the combination of the DWC database, an integrated data security layer database as a single database entity.

In one embodiment, user programs may contain various user interface primitives, which may serve to update the DWC. Also, various accounts may require custom database tables depending upon the environments and the types of clients the DWC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1219a-1. The DWC may be configured to keep track of various settings, inputs, and parameters via database controllers.

The DWC database may communicate to and/or with other components in a component collection, including itself, and/or facilities of the like. Most frequently, the DWC database communicates with the DWC component, other program components, and/or the like. The database may contain, retain, and provide information regarding other nodes and data.

The DWCs

The DWC component 1235 is a stored program component that is executed by a CPU. In one embodiment, the DWC component incorporates any and/or all combinations of the aspects of the DWC discussed in the previous figures. As such, the DWC affects accessing, obtaining and the provision of information, services, transactions, and/or the like across various communications networks. The features and embodiments of the DWC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DWC's features and facilities, and in many cases reduce the costs, energy consumption/requirements, and extend the life of DWC's underlying infrastructure; this has the added benefit of making the DWC more reliable. Similarly, many of the features and mechanisms are designed to be easier for users to use and access, thereby broadening the audience that may enjoy/employ and exploit the feature sets of the DWC; such ease of use also helps to increase the reliability of the DWC. In addition, the feature sets include heightened security as noted via the Cryptographic components 1220, 1226, 1228 and throughout, making access to the features and data more reliable and secure.

The DWC component may transform user multi-element touchscreen gestures via DWC components into updated digital collaboration whiteboard objects, and/or the like and use of the DWC. In one embodiment, the DWC component 1235 takes inputs (e.g., collaborate request input 211, authentication response 215, tile objects data 220, whiteboard input 611, user whiteboard session object 616, user instruction lookup response 619, tile objects data 622, affected clients data 627, user input raw data 1001, object-specified context instructions 1014, system context interpretation instructions 1013, and/or the like) etc., and transforms the inputs via various components (e.g., WCSI 1241, CVS 1242, VCG 1243, UCW 1244, UGI 1245, and/or the like), into outputs (e.g., collaborator acknowledgment 216, user whiteboard session object 222, whiteboard session details 224, updated tile objects data 630, updated user whiteboard session details 631-632a-c, user gesture identifier 1016, and/or the like).

The DWC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools, Prototype; script.aculo.us, Simple Object Access Protocol (SOAP); SWFObject; Yahoo! User Interface; and/or the like), WebObjects, and/or the like. In one embodiment, the DWC server employs a cryptographic server to encrypt and decrypt communications. The DWC component may communicate to and/or with other components in a component collection, including itself, and/or facilities of the like. Most frequently, the DWC component communicates with the DWC database, operating systems, other program components, and/or the like. The DWC may contain, communicate, generate, obtain, and/or provide program component, system, user, and/or data communications, requests, and/or responses.

Distributed DWCs

The structure and/or operation of any of the DWC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DWC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DWC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data via SSL, parse the data to extract variables, and store it in a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
```

-continued

```
VALUES ($data)"); // add data to UserTable table in a CLIENT database
mysql_close("CLIENT_DB.SQL"); // close connection to database
?>
```

Also, the following provide example embodiments of SOAP and other parser implementations, all of which are expressly incorporated by reference herein:

[1] http://www.xav.com/perl/site/lib/SOAP/Parser.html
[2] http://publib.boulder.ibm.com/infocenter/tivihelp/v2r1/index.jsp?topic=/com.ibm.IBMDI.doc/referenceguide295.htm
[3] http://publib.boulder.ibm.com/infocenter/tivihelp/v2r1/index.jsp?topic=/com.ibm.IBMDI.doc/referenceguide259.htm Non-limiting example embodiments highlighting numerous further advantageous aspects include:

1. A digital collaborative whiteboarding processor-implemented method embodiment, comprising:
    obtaining user whiteboard input from a client device of a user participating in a digital collaborative whiteboarding session;
    parsing the user whiteboard input to determine user instructions;
    identifying a user instruction based on parsing the user whiteboard input;
    modifying an attribute of the digital collaborative whiteboarding session according to the identified user instruction;
    generating updated client viewport content for the client device; and
    providing the updated client viewport content to the client device.
2. The method of embodiment 1, wherein modifying the attribute of the digital collaborative whiteboarding session includes modifying a client viewport specification associated with the client device.
3. The method of embodiment 1, wherein modifying the attribute of the digital collaborative whiteboarding session includes modifying a tile object included in a digital whiteboard that is part of the digital collaborative whiteboarding session.
4. The method of embodiment 3, further comprising:
    determining that client viewport content of a second client device should be modified because of modifying the tile object included in the digital whiteboard;
    generating updated client viewport content for the second client device after determining that the client viewport content of the second client device should be modified; and
    providing, to the second client device, the updated client viewport content for the second client device.
5. The method of embodiment 1, wherein the user whiteboard input includes data on a touchscreen gesture performed by the user.
6. The method of embodiment 5, wherein the client device is one of: a multi-user touchscreen device; and a mobile touchscreen-enabled device.
7. The method of embodiment 1, wherein the user instructions include client viewport modification instructions and tile object modification instructions.
8. A digital collaborative whiteboarding system embodiment, comprising:
    a processor; and
    a memory disposed in communication with the processor and storing processor-executable instructions to:
        obtain user whiteboard input from a client device of a user participating in a digital collaborative whiteboarding session;
        parse the user whiteboard input to determine user instructions;
        identify a user instruction based on parsing the user whiteboard input;
        modify an attribute of the digital collaborative whiteboarding session according to the identified user instruction;
        generate updated client viewport content for the client device; and
        provide the updated client viewport content to the client device.
9. The system of embodiment 8, wherein modifying the attribute of the digital collaborative whiteboarding session includes modifying a client viewport specification associated with the client device.
10. The system of embodiment 8, wherein modifying the attribute of the digital collaborative whiteboarding session includes modifying a tile object included in a digital whiteboard that is part of the digital collaborative whiteboarding session.
11. The system of embodiment 10, the memory further storing instructions to:
    determine that client viewport content of a second client device should be modified because of modifying the tile object included in the digital whiteboard;
    generate updated client viewport content for the second client device after determining that the client viewport content of the second client device should be modified; and
    provide, to the second client device, the updated client viewport content for the second client device.
12. The system of embodiment 8, wherein the user whiteboard input includes data on a touchscreen gesture performed by the user.
13. The system of embodiment 12, wherein the client device is one of: a multi-user touchscreen device; and a mobile touchscreen-enabled device.
14. The method of embodiment 8, wherein the user instructions include client viewport modification instructions and tile object modification instructions.
15. A processor-readable tangible medium embodiment storing processor-executable digital collaborative whiteboarding instructions to:
    obtain user whiteboard input from a client device of a user participating in a digital collaborative whiteboarding session;
    parse the user whiteboard input to determine user instructions;
    identify a user instruction based on parsing the user whiteboard input;
    modify an attribute of the digital collaborative whiteboarding session according to the identified user instruction;
    generate updated client viewport content for the client device; and
    provide the updated client viewport content to the client device.
16. The medium of embodiment 15, wherein modifying the attribute of the digital collaborative whiteboarding session includes modifying a client viewport specification associated with the client device.
17. The medium of embodiment 15, wherein modifying the attribute of the digital collaborative whiteboarding session includes modifying a tile object included in a digital whiteboard that is part of the digital collaborative whiteboarding session.
18. The medium of embodiment 17, further storing instructions to:
determine that client viewport content of a second client device should be modified because of modifying the tile object included in the digital whiteboard;
generate updated client viewport content for the second client device after determining that the client viewport content of the second client device should be modified; and
provide, to the second client device, the updated client viewport content for the second client device.
19. The medium of embodiment 15, wherein the user whiteboard input includes data on a touchscreen gesture performed by the user.
20. The medium of embodiment 19, wherein the client device is one of: a multi-user touchscreen device; and a mobile touchscreen-enabled device.
21. The medium of embodiment 15, wherein the user instructions include client viewport modification instructions and tile object modification instructions.
22. A chord-based gesturing processor-implemented method embodiment, comprising:
obtaining user touchscreen data input into a touchscreen device;
identifying a chord from the user touchscreen data input, the identification of the chord including a number of elements included in the chord;
determining, via a processor, for each element included in the chord, at least:
a touchscreen pressure;
a time parameter; and
a motion parameter;
identifying a gesture context for the chord based on a spatial coordinate for at least one chord element of the chord;
generating a database lookup query for a user intention corresponding to the chord using the identified gesture context, the touchscreen pressure, the time parameters and the motion parameter;
querying a database using the generated database lookup query; and
obtaining the user intention corresponding to the chord based on querying the database.
23. The method of embodiment 22, wherein at least one of the elements included in the chord is a stylus touch.
24. The method of embodiment 22, wherein the time parameter is a hold time.
25. The method of embodiment 22, wherein the motion parameters is a direction vector.
26. The method of embodiment 22, wherein the touchscreen device is one of: a multi-user touchscreen device; and a mobile device.
27. The method of embodiment 22, wherein the gesture context for the chord includes a touchscreen object located at the spatial coordinate for the at least one chord element of the chord.
28. The method of embodiment 22, wherein the user intention includes an intention to modify an object displayed on the touchscreen device.

29. A chord-based gesturing apparatus embodiment, comprising:
a processor; and
a memory disposed in communication with the processor and storing processor-executable instructions to:
obtain user touchscreen data input;
identify a chord from the user touchscreen data input, the identification of the chord including a number of elements included in the chord;
determine, for each element included in the chord, at least:
a touchscreen pressure;
a time parameter; and
a motion parameter;
identify a gesture context for the chord based on a spatial coordinate for at least one chord element of the chord;
generate a database lookup query for a user intention corresponding to the chord using the identified gesture context, the touchscreen pressure, the time parameters and the motion parameter;
query a database using the generated database lookup query; and
obtain the user intention corresponding to the chord based on querying the database.
30. The apparatus of embodiment 29, wherein at least one of the elements included in the chord is a stylus touch.
31. The apparatus of embodiment 29, wherein the time parameter is a hold time.
32. The apparatus of embodiment 29, wherein the motion parameters is a direction vector.
33. The apparatus of embodiment 29, wherein the apparatus is one of: a multi-user touchscreen device; and a mobile device.
34. The apparatus of embodiment 29, wherein the gesture context for the chord includes a touchscreen object located at the spatial coordinate for the at least one chord element of the chord.
35. The apparatus of embodiment 29, wherein the user intention includes an intention to modify an object displayed on the apparatus.
36. A processor-readable tangible medium embodiment storing processor-executable chord-based gesturing instructions to:
obtain user touchscreen data input into a touchscreen device;
identify a chord from the user touchscreen data input, the identification of the chord including a number of elements included in the chord;
determine, for each element included in the chord, at least:
a touchscreen pressure;
a time parameter; and
a motion parameter;
identify a gesture context for the chord based on a spatial coordinate for at least one chord element of the chord;
generate a database lookup query for a user intention corresponding to the chord using the identified gesture context, the touchscreen pressure, the time parameters and the motion parameter;
query a database using the generated database lookup query; and
obtain the user intention corresponding to the chord based on querying the database.
37. The medium of embodiment 36, wherein at least one of the elements included in the chord is a stylus touch.

38. The medium of embodiment 36, wherein the time parameter is a hold time.

39. The medium of embodiment 36, wherein the motion parameters is a direction vector.

40. The medium of embodiment 36, wherein the touchscreen device is one of: a multi-user touchscreen device; and a mobile device.

41. The medium of embodiment 36, wherein the gesture context for the chord includes a touchscreen object located at the spatial coordinate for the at least one chord element of the chord.

42. The medium of embodiment 36, wherein the user intention includes an intention to modify an object displayed on the apparatus.

43. A digital whiteboard file system processor-implemented method embodiment, comprising:
   obtaining a whiteboard input from a participant in a collaborative digital whiteboarding session;
   determining a whiteboarding instruction by parsing the whiteboard input;
   modifying, via a processor, a file system representative of the digital collaborative whiteboarding session according to the identified whiteboard instructions; and
   providing an indication of modification of the file system.

44. The method of embodiment 43, wherein the collaborative digital whiteboarding session is modifiable by a plurality of participants.

45. The method of embodiment 43, further comprising:
   generating a timestamp associated with the whiteboarding instruction; and
   storing the timestamp in the modified file system.

46. The method of embodiment 43, wherein the file system comprises a plurality of directories, each directory representing a tile in a digital whiteboard; and
   wherein each directory includes a tile content data structure storing tile content for the tile in the digital whiteboard that the directory represents.

47. The method of embodiment 46, wherein one of the directories includes a plurality of tile content data structures, wherein each of the plurality of tile content data structures is associated with a unique timestamp.

48. The method of embodiment 46, wherein one of the directories includes a plurality of tile content data structures, wherein each of the plurality of tile content data structure is associated with a unique set of user identifications.

49. The method of embodiment 46, wherein one of the directories includes a plurality of tile content data structures, wherein each of the plurality of tile content data structures represents a layer within the digital whiteboard.

50. The method of embodiment 46, wherein one of the directories includes a sub-directory storing a sub-tile content data structure including sub-tile content for a sub-tile in the digital whiteboard that the sub-directory represents.

51. The method of embodiment 46, wherein the tile content includes at least one of: a remote window object; an audio-visual object; and a multi-page document.

52. The method of embodiment 46, wherein the tile content data structure includes metadata associated with the stored tile content.

53. A digital whiteboard system embodiment, comprising:
   a processor; and
   a memory disposed in communication with the processor and storing processor-executable instructions to:
      obtain a whiteboard input from a participant in a collaborative digital whiteboarding session;
      determine a whiteboarding instruction by parsing the whiteboard input;
      modify, via the processor, a file system representative of the digital collaborative whiteboarding session according to the identified whiteboard instructions; and
      provide an indication of modification of the file system.

54. The system of embodiment 53, wherein the collaborative digital whiteboarding session is modifiable by a plurality of participants.

55. The system of embodiment 53, the memory further stores instructions to:
   generate a timestamp associated with the whiteboarding instruction; and
   store the timestamp in the modified file system.

56. The system of embodiment 53, wherein the file system comprises a plurality of directories, each directory representing a tile in a digital whiteboard; and
   wherein each directory includes a tile content data structure storing tile content for the tile in the digital whiteboard that the directory represents.

57. The system of embodiment 56, wherein one of the directories includes a plurality of tile content data structures, wherein each of the plurality of tile content data structures is associated with a unique timestamp.

58. The system of embodiment 56, wherein one of the directories includes a plurality of tile content data structures, wherein each of the plurality of tile content data structure is associated with a unique set of user identifications.

59. The system of embodiment 56, wherein one of the directories includes a plurality of tile content data structures, wherein each of the plurality of tile content data structures represents a layer within the digital whiteboard.

60. The system of embodiment 56, wherein one of the directories includes a sub-directory storing a sub-tile content data structure including sub-tile content for a sub-tile in the digital whiteboard that the sub-directory represents.

61. The system of embodiment 56, wherein the tile content includes at least one of: a remote window object; an audio-visual object; and a multi-page document.

62. The system of embodiment 56, wherein the tile content data structure includes metadata associated with the stored tile content.

63. A non-transitory computer-readable medium embodiment storing processor-executable digital whiteboard instructions to:
   obtain a whiteboard input from a participant in a collaborative digital whiteboarding session;
   determine a whiteboarding instruction by parsing the whiteboard input;
   modify, via the processor, a file system representative of the digital collaborative whiteboarding session according to the identified whiteboard instructions; and
   provide an indication of modification of the file system.

64. The medium of embodiment 63, wherein the collaborative digital whiteboarding session is modifiable by a plurality of participants.

65. The medium of embodiment 63, further storing instructions to:
generate a timestamp associated with the whiteboarding instruction; and
store the timestamp in the modified file system.

66. The medium of embodiment 63, wherein the file system comprises a plurality of directories, each directory representing a tile in a digital whiteboard; and
wherein each directory includes a tile content data structure storing tile content for the tile in the digital whiteboard that the directory represents.

67. The medium of embodiment 66, wherein one of the directories includes a plurality of tile content data structures, wherein each of the plurality of tile content data structures is associated with a unique timestamp.

68. The medium of embodiment 66, wherein one of the directories includes a plurality of tile content data structures, wherein each of the plurality of tile content data structure is associated with a unique set of user identifications.

69. The medium of embodiment 66, wherein one of the directories includes a plurality of tile content data structures, wherein each of the plurality of tile content data structures represents a layer within the digital whiteboard.

70. The medium of embodiment 66, wherein one of the directories includes a sub-directory storing a sub-tile content data structure including sub-tile content for a sub-tile in the digital whiteboard that the sub-directory represents.

71. The medium of embodiment 66, wherein the tile content includes at least one of: a remote window object; an audio-visual object; and a multi-page document.

72. The medium of embodiment 66, wherein the tile content data structure includes metadata associated with the stored tile content.

73. A digital whiteboard viewer processor-implemented method embodiment, comprising:
obtaining a user gesture input via a touchscreen interface of a device;
identifying a user whiteboarding instruction based on the obtained user gesture input;
generating a user whiteboard message including the user whiteboarding instruction for providing into a collaborative digital whiteboarding session;
providing the user whiteboard message to a digital whiteboard server;
obtaining client viewport data in response to the user whiteboard message;
rendering, via the device, a client viewport screen based on the client viewport data; and
displaying the rendered client viewport screen via the touchscreen interface of the device.

74. The method of embodiment 73, wherein the device is a mobile device.

75. The method of embodiment 73, wherein the user whiteboarding instruction is a client viewport modification instruction.

76. The method of embodiment 73, wherein the user whiteboarding instruction includes an instruction to modify a tile object displayed within the client viewport screen via the touchscreen interface of the device.

77. The method of embodiment 73, wherein the user whiteboarding instructions includes an instruction to display an evolution of tile content displayed within the client viewport screen via the touchscreen interface of the device.

78. The method of embodiment 77, wherein the evolution of the tile content is presented as a video file.

79. The method of embodiment 77, wherein the wherein the tile content includes at least one of: a remote window object; an audio-visual object; and a multi-page document.

80. The method of embodiment 73, wherein the rendered client viewport screen depicts tile content of a portion of a tile included in the digital collaborative whiteboarding session.

81. The method of embodiment 75, wherein the client viewport modification instruction includes an instruction to modify the content of the rendered client viewport screen to depict content of another rendered client viewport screen of another device participating in the digital collaborative whiteboarding session.

82. The method of embodiment 75, wherein the rendered client viewport screen is customized automatically to an attribute of the touchscreen interface of the device.

83. A digital whiteboard viewer apparatus embodiment, comprising:
a processor; and
a memory disposed in communication with the processor and storing processor-executable instructions to:
obtain a user gesture input via a touchscreen interface of a device;
identify a user whiteboarding instruction based on the obtained user gesture input;
generate a user whiteboard message including the user whiteboarding instruction for providing into a collaborative digital whiteboarding session;
provide the user whiteboard message to a digital whiteboard server;
obtain client viewport data in response to the user whiteboard message;
render, via the device, a client viewport screen based on the client viewport data; and
display the rendered client viewport screen via the touchscreen interface of the device.

84. The apparatus of embodiment 83, wherein the device is a mobile device.

85. The apparatus of embodiment 83, wherein the user whiteboarding instruction is a client viewport modification instruction.

86. The apparatus of embodiment 83, wherein the user whiteboarding instruction includes an instruction to modify a tile object displayed within the client viewport screen via the touchscreen interface of the device.

87. The apparatus of embodiment 83, wherein the user whiteboarding instructions includes an instruction to display an evolution of tile content displayed within the client viewport screen via the touchscreen interface of the device.

88. The apparatus of embodiment 87, wherein the evolution of the tile content is presented as a video file.

89. The apparatus of embodiment 87, wherein the wherein the tile content includes at least one of: a remote window object; an audio-visual object; and a multi-page document.

90. The apparatus of embodiment 83, wherein the rendered client viewport screen depicts tile content of a portion of a tile included in the digital collaborative whiteboarding session.
91. The apparatus of embodiment 85, wherein the client viewport modification instruction includes an instruction to modify the content of the rendered client viewport screen to depict content of another rendered client viewport screen of another device participating in the digital collaborative whiteboarding session.
92. The apparatus of embodiment 85, wherein the rendered client viewport screen is customized automatically to an attribute of the touchscreen interface of the device.
93. A non-transitory computer-readable medium embodiment storing processor-executable digital whiteboard viewer instructions to:
   obtain a user gesture input via a touchscreen interface of a device;
   identify a user whiteboarding instruction based on the obtained user gesture input;
   generate a user whiteboard message including the user whiteboarding instruction for providing into a collaborative digital whiteboarding session;
   provide the user whiteboard message to a digital whiteboard server;
   obtain client viewport data in response to the user whiteboard message;
   render, via the device, a client viewport screen based on the client viewport data; and
   display the rendered client viewport screen via the touchscreen interface of the device.
94. The medium of embodiment 93, wherein the device is a mobile device.
95. The medium of embodiment 93, wherein the user whiteboarding instruction is a client viewport modification instruction.
96. The medium of embodiment 93, wherein the user whiteboarding instruction includes an instruction to modify a tile object displayed within the client viewport screen via the touchscreen interface of the device.
97. The medium of embodiment 93, wherein the user whiteboarding instructions includes an instruction to display an evolution of tile content displayed within the client viewport screen via the touchscreen interface of the device.
98. The medium of embodiment 97, wherein the evolution of the tile content is presented as a video file.
99. The medium of embodiment 97, wherein the wherein the tile content includes at least one of: a remote window object; an audio-visual object; and a multi-page document.
100. The medium of embodiment 93, wherein the rendered client viewport screen depicts tile content of a portion of a tile included in the digital collaborative whiteboarding session.
101. The medium of embodiment 95, wherein the client viewport modification instruction includes an instruction to modify the content of the rendered client viewport screen to depict content of another rendered client viewport screen of another device participating in the digital collaborative whiteboarding session.
102. The medium of embodiment 95, wherein the rendered client viewport screen is customized automatically to an attribute of the touchscreen interface of the device.

In order to address various issues and advance the art, the entirety of this application for DIGITAL WHITEBOARD COLLABORATION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DWC individual and/or enterprise user, database configuration and/or relational model, data type, data transmission and/or network framework, syntax structure, and/or the like, various embodiments of the DWC may be implemented that allow a great deal of flexibility and customization. For example, aspects of the DWC may be adapted for negotiations, mediation, group think studies, crowd-sourcing applications, and/or the like. While various embodiments and discussions of the DWC have been directed to digital collaboration, however, it is to be understood that the embodiments described herein may be readily configured and/or customized for a wide variety of other applications and/or implementations.

What is claimed is:

1. A digital collaborative whiteboarding processor-implemented method, comprising:
    storing a digital whiteboard including content of a collaborative digital whiteboarding session, the content of the collaborative digital whiteboarding session including data associated with a first object and a second object, wherein,
        the first and second objects are each one of a video, an image, a drawing, and text, and
        the data includes location data of the first and second objects within the digital whiteboard;
    in response to a query identifying a first client viewport specification for a client viewport associated with a client device, selecting client viewport content for the client device by querying the stored content of the collaborative digital whiteboarding session to identify a first set of one or more objects, including the first object, associated with location data indicating the first set of one or more objects are within the client viewport of the client device according to the first client viewport specification, wherein the client viewport according to the first client viewport specification includes a first portion of the digital whiteboard including at least a portion of the first object and wherein the client viewport according to the first client viewport specification does not include a second portion of the digital whiteboard, the second portion of the digital whiteboard including the second object;
    obtaining user whiteboard input from the client device;
    identifying a user instruction based on the user whiteboard input;
    modifying the client viewport specification associated with the client device from the first client viewport specification to a second client viewport specification, according to the identified user instruction; and
    in response to modifying the client viewport specification, selecting updated client viewport content by querying the stored content of the collaborative digital whiteboarding session to identify a second set of one or more objects, including the second object, associated with location data according to the second client viewport specification, wherein the client viewport according to the second client viewport specification includes the second portion of the digital whiteboard including at least a portion of the second object;
    wherein the selected updated client viewport content for the client device further includes a map of the digital whiteboard, the map including indications of the position in the whiteboard of the client viewport of the client device connected to the whiteboarding session and a second client viewport of a second client device connected to the whiteboarding session, wherein position of the client viewport is different from the position of the second client viewport.

2. The method of claim 1, further comprising modifying an object included in the digital whiteboard that is part of the digital collaborative whiteboarding session.

3. The method of claim 2, further comprising:
    determining that client viewport content of a second client device should be modified because of modifying the object included in the digital whiteboard; and
    selecting updated client viewport content for the second client device after determining that the client viewport content of the second client device should be modified by querying the stored content of the collaborative digital whiteboarding session to identify one or more objects associated with location data indicating the one or more objects are within a client viewport of the second client device; and
    providing, to the second client device, the updated client viewport content for the second client device.

4. The digital collaborative whiteboarding processor-implemented method of claim 1, wherein modifying the client viewport specification associated with the client device includes one of modifying the shape of the client viewport, modifying zoom level of the client viewport, modifying aspect ratio of the client viewport, and modifying position of the client viewport.

5. The method of claim 1, wherein the user whiteboard input includes data on a touchscreen gesture performed by the user.

6. The method of claim 5, wherein the client device is one of: a multi-user touchscreen device; and a mobile touchscreen-enabled device.

7. The method of claim 1, wherein the user instruction further includes a tile object modification instruction.

8. The method of claim 1, the method further comprising;
    modifying an object of the digital collaborative whiteboarding session; and
    storing the pre-modified object and the modified object, of the digital collaborative whiteboarding session, as different versions of the object;
    wherein the updated client viewport content for the client device further includes a time/version-evolution animation of the versions of the object.

9. A digital collaborative whiteboarding system, comprising:
    a processor; and
    a memory disposed in communication with the processor and storing processor-executable instructions to:
    store a digital whiteboard including content of a collaborative digital whiteboarding session, the content of the collaborative digital whiteboarding session including data associated with a first object and a second object, wherein,
        the first and second objects are each one of a video, an image, a drawing object, and text, and
        the data includes location data of the first and second objects within the digital whiteboard;
    in response to a query identifying a first client viewport specification for a client viewport associated with a client device, select client viewport content for the client device by querying the stored content of the collaborative digital whiteboarding session to identify a first set of one or more objects, including the first object, associated with location data indicating the first set of one or more objects are within the client viewport of the client device according to the first client viewport specification, wherein the client viewport according to the first client viewport specification includes a first portion of the digital whiteboard including at least a portion of the first object and wherein the client viewport according to the first client viewport specification does not include a second portion of the digital whiteboard, the second portion of the digital whiteboard including the second object;

obtain user whiteboard input from the client device;

identify a user instruction based on the user whiteboard input;

modify the client viewport specification associated with the client device from the first client viewport specification to a second client viewport specification, according to the identified user instruction; and in response to modifying the client viewport specification, selecting updated client viewport content by querying the stored content of the collaborative digital whiteboarding session to identify a second set of one or more objects, including the second object, associated with location data according to the second client viewport specification, wherein the client viewport according to the second client viewport specification includes the second portion of the digital whiteboard including at least a portion of the second object;

wherein the selected updated client viewport content for the client device further includes a map of the digital whiteboard, the map including indications of the position in the whiteboard of the client viewport of the client device connected to the whiteboarding session and a second client viewport of a second client device connected to the whiteboarding session, wherein position of the client viewport is different from the position of the second client viewport.

10. A non-transitory processor-readable tangible medium storing processor-executable digital collaborative whiteboarding instructions to:

store a digital whiteboard including content of a collaborative digital whiteboarding session, the content of the collaborative digital whiteboarding session including data associated with a first object and a second object, wherein,
the first and second objects are each one of a video, an image, a drawing object, and text, and
the data includes location data of the first and second objects within the digital whiteboard;

in response to a query identifying a first client viewport specification for a client viewport associated with a client device, select client viewport content for the client device by querying the stored content of the collaborative digital whiteboarding session to identify a first set of one or more objects, including the first object, associated with location data indicating the first set of one or more objects are within the client viewport of the client device according to the first client viewport specification, wherein the client viewport according to the first client viewport specification includes a first portion of the digital whiteboard including at least a portion of the first object and wherein the client viewport according to the first client viewport specification does not include a second portion of the digital whiteboard, the second portion of the digital whiteboard including the second object;

obtain user whiteboard input from the client device;

identify a user instruction based on the user whiteboard input;

modify the client viewport specification associated with the client device from the first client viewport specification to a second client viewport specification, according to the identified user instruction; and in response to modifying the client viewport specification, selecting updated client viewport content by querying the stored content of the collaborative digital whiteboarding session to identify a second set of one or more objects, including the second object, associated with location data according to the second client viewport specification, wherein the client viewport according to the second client viewport specification includes the second portion of the digital whiteboard including at least a portion of the second object;

wherein the selected updated client viewport content for the client device further includes a map of the digital whiteboard, the map including indications of the position in the whiteboard of the client viewport of the client device connected to the whiteboarding session and a second client viewport of a second client device connected to the whiteboarding session, wherein position of the client viewport is different from the position of the second client viewport.

* * * * *